United States Patent [19]
Bruchu

[11] Patent Number: 5,687,519
[45] Date of Patent: Nov. 18, 1997

US005687519A

[54] METHOD OF COMBINING COMPONENTS TO FORM DIFFERENT TYPES OF WINDOWS SUITABLE FOR VARIOUS INSTALLATION SITUATIONS

[75] Inventor: Todd W. Bruchu, Lake Elmo, Minn.

[73] Assignee: Andersen Corporation, Bayport, Minn.

[21] Appl. No.: 490,798

[22] Filed: Jun. 15, 1995

Related U.S. Application Data

[63] Continuation-in-part of Ser. No. 325,995, Oct. 19, 1994, Pat. No. 5,491,940.

[51] Int. Cl.$^6$ .................................. E06B 1/30; E06B 1/36
[52] U.S. Cl. ........................... 52/213; 52/214; 52/730.6; 52/734.1; 52/745.16; 49/504; 49/DIG. 2
[58] Field of Search ........................... 52/2.3, 214, 215, 52/216, 217, 730.2, 730.6, 734.1, 734.2, 745.16; 49/468, 504, 505, DIG. 2

[56] References Cited

U.S. PATENT DOCUMENTS

| 4,328,644 | 5/1982 | Scott et al. | |
|---|---|---|---|
| 4,944,118 | 7/1990 | Biro | 49/DIG. 2 X |
| 5,090,168 | 2/1992 | Fast et al. | |
| 5,491,940 | 2/1996 | Bruchu | 52/213 |

OTHER PUBLICATIONS

Photograph of window profiles of Season–All (#1).
Phpotograph of window profiles of Season–All (#2).
Photograph of window profiles of Certainteed (Bryn Mawr).
Photograph of window profiles of Certainteed (CertaWeld).
Photograph of window profiles of Great Lakes.
Photograph of window profiles of Minnkota/Rehau.
Photograph of window profiles of Norandex.
Photograph of window profiles of Polytex.
Photograph of window profiles of Vinyl Therm.
Photograph of window profiles of Weathershield.
Photograph of window profiles of Milgard.
Photograph of window profiles of Alcoa.
Photograph of window profiles of Louisianna Pacific.

*Primary Examiner*—Christopher T. Kent
*Attorney, Agent, or Firm*—Merchant, Gould, Smith, Edell, Welter & Schmidt, P.A.

[57] ABSTRACT

A universal frame renders a double hung pocket replacement window suitable for window out—window in replacement and/or new construction installation, and likewise, renders a casement pocket replacement window suitable for window out—window in replacement and/or new construction installation, and likewise, renders a picture pocket replacement window suitable for window out—window in replacement and/or new construction installation, and likewise, renders a glider pocket replacement window suitable for window out—window in replacement and/or new construction installation, thereby giving rise to economies of scale in the manufacturing and distributing processes for a variety of windows.

15 Claims, 44 Drawing Sheets

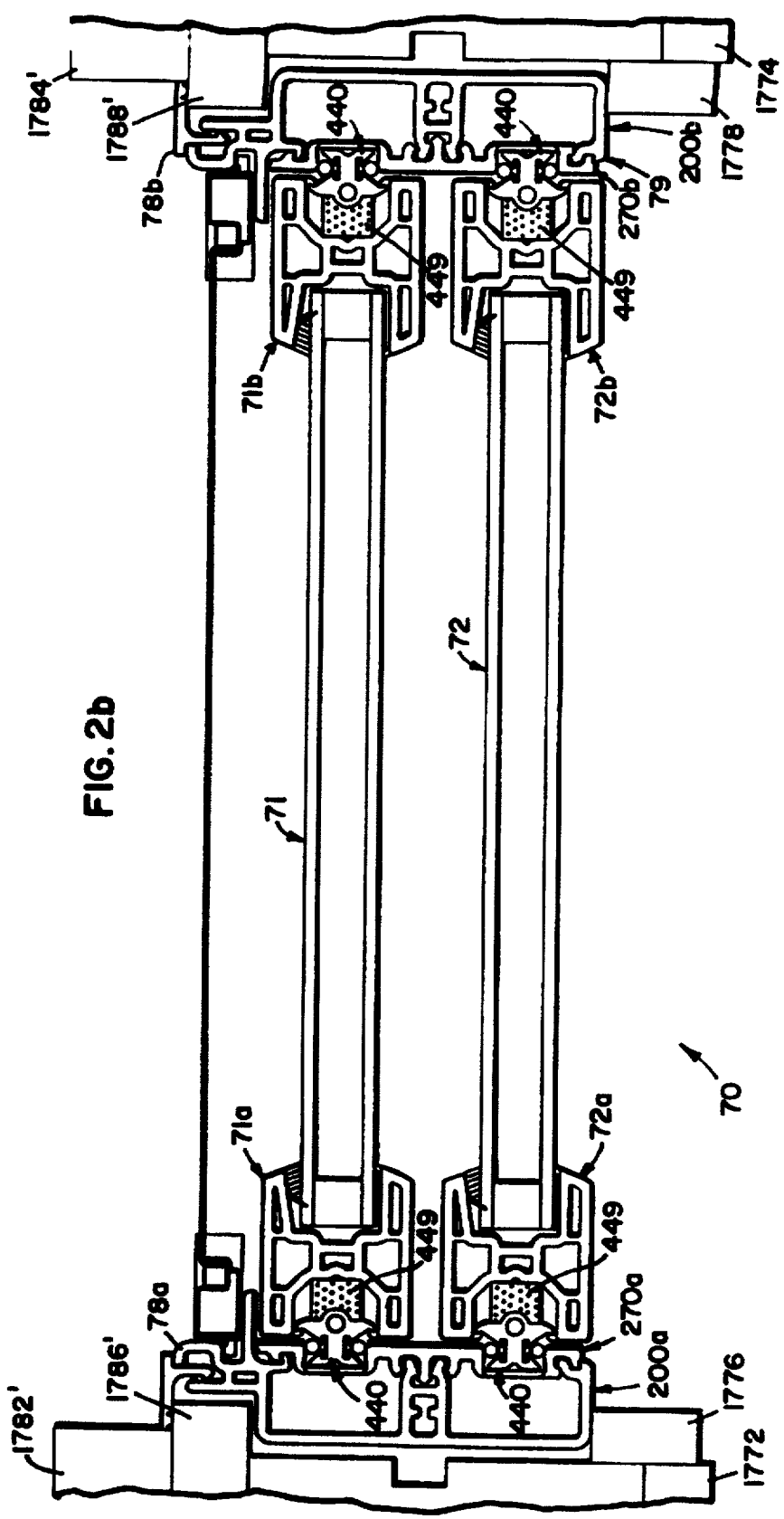

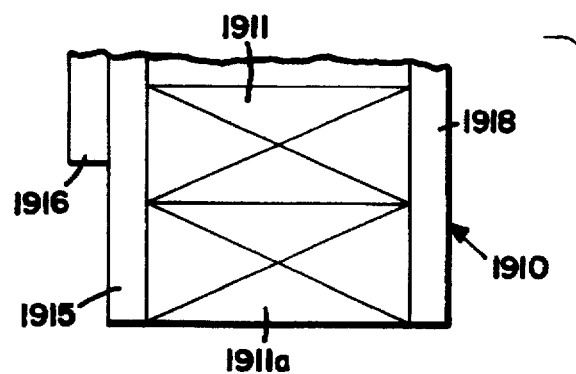
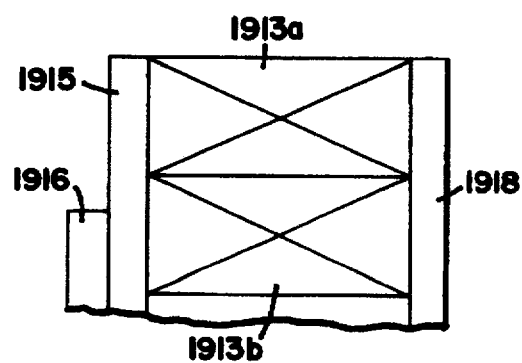
FIG. 3a

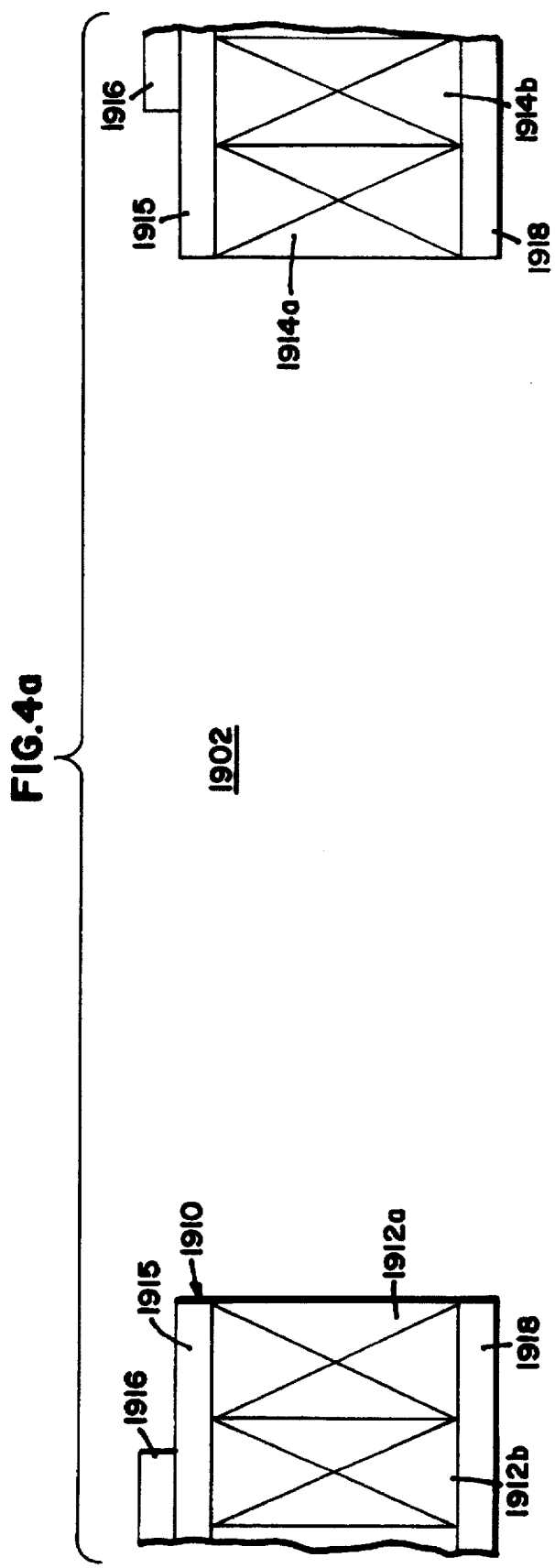

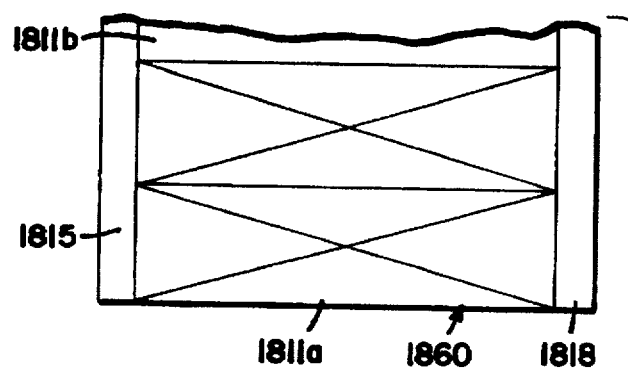
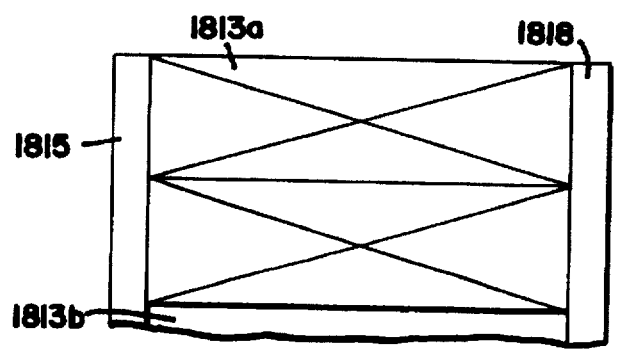
FIG. 5a

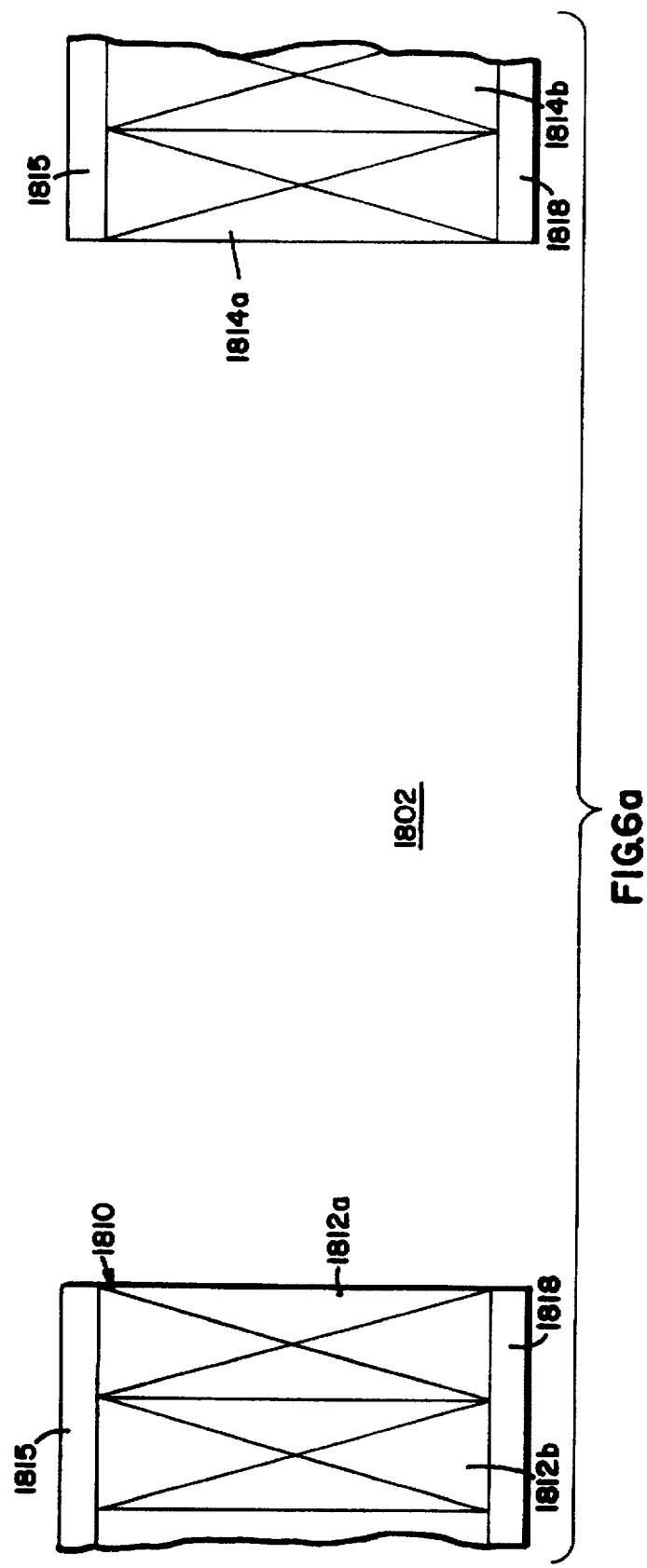

FIG. II

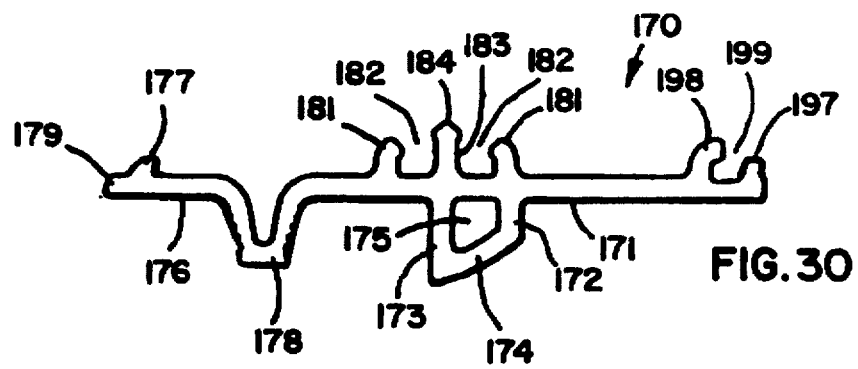
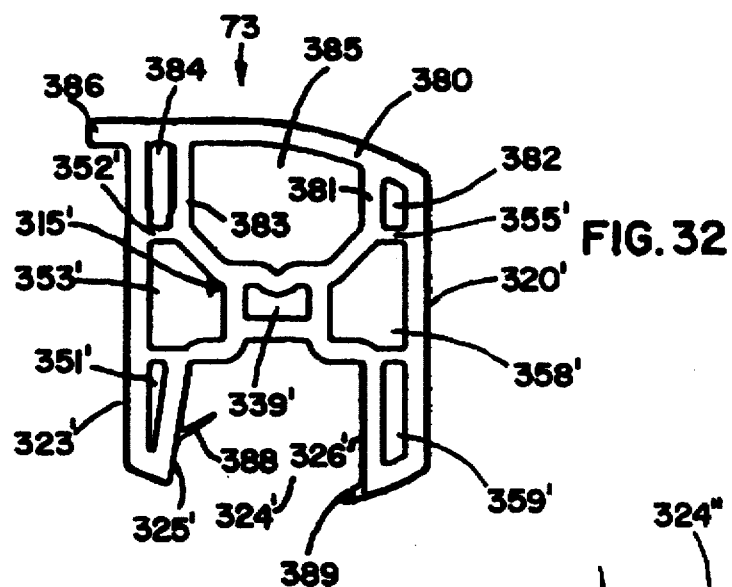
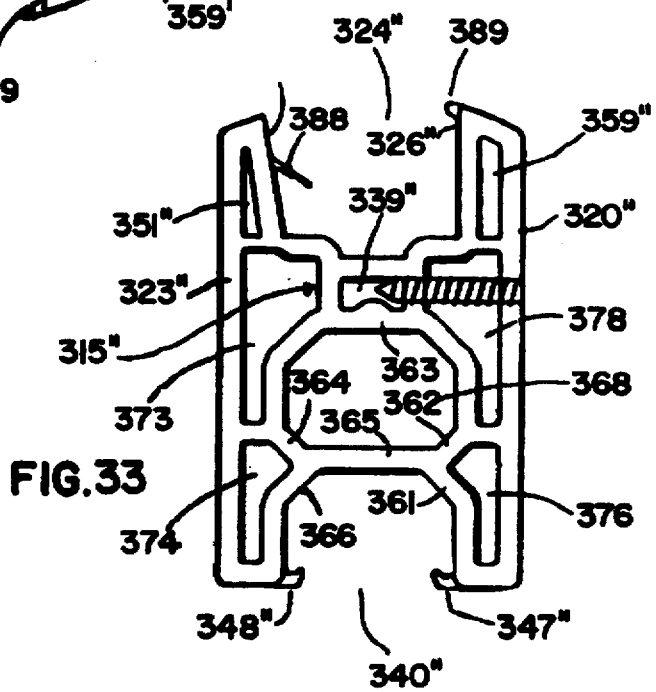

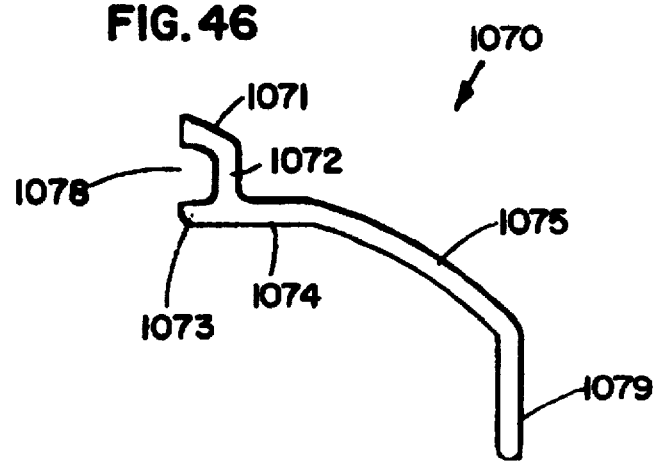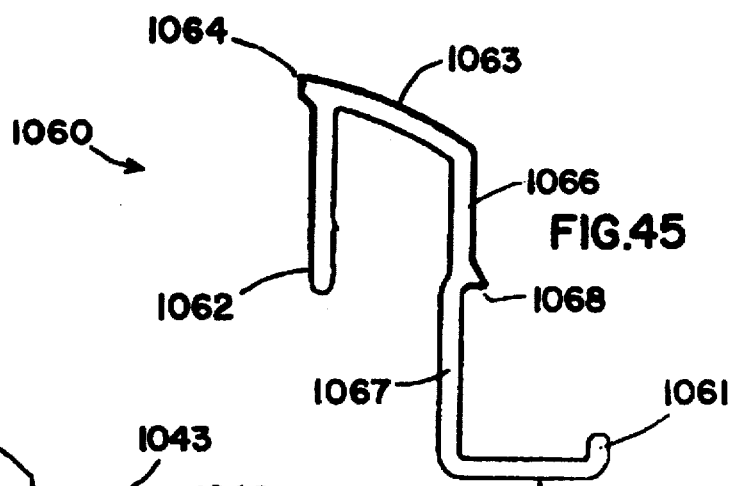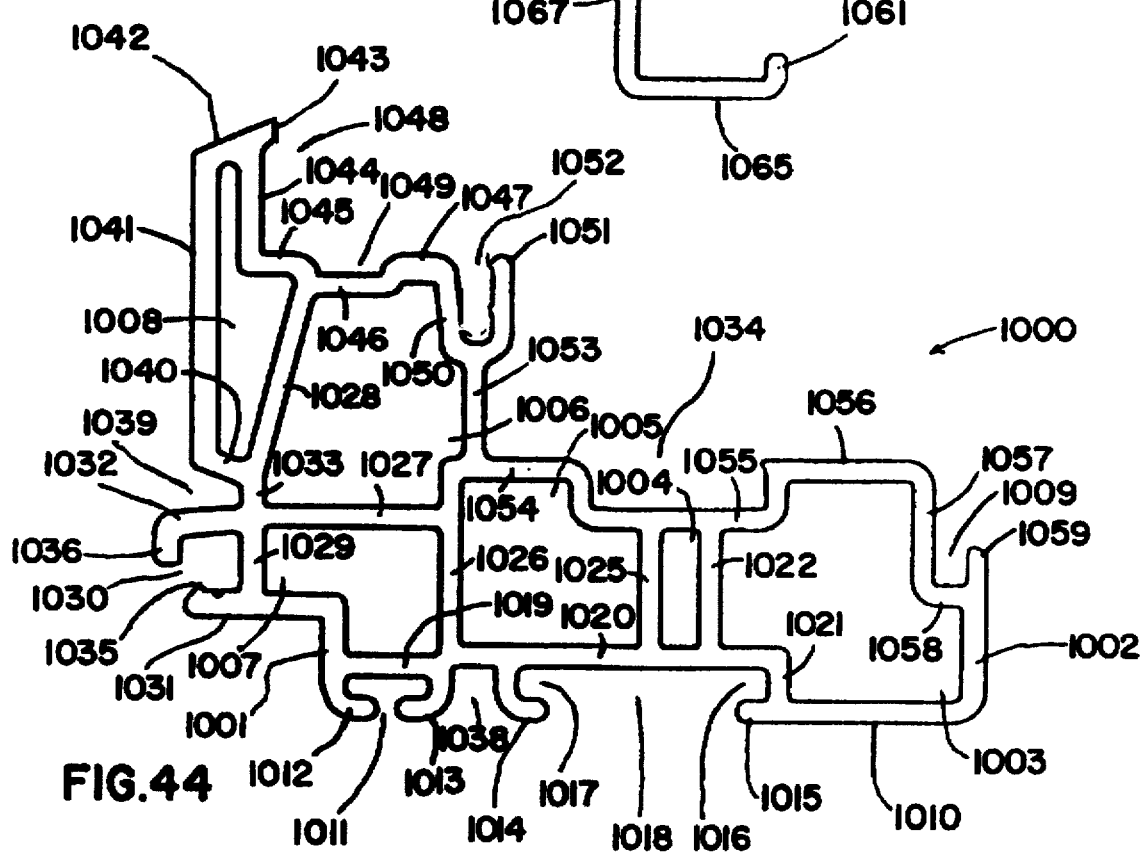

METHOD OF COMBINING COMPONENTS TO FORM DIFFERENT TYPES OF WINDOWS SUITABLE FOR VARIOUS INSTALLATION SITUATIONS

This is a continuation-in-part of U.S. patent application Ser. No. 08/325,995, filed Oct. 19, 1994, now U.S. Pat. No. 5,491,940.

FIELD OF THE INVENTION

The present invention relates to windows and more particularly, to a window manufacturing and component system for making different types of windows suitable for various installation scenarios.

BACKGROUND OF THE INVENTION

Window types common in the industry include double hung windows, casement windows, picture windows, glider windows, and awning windows. For each type of window, several types of installation scenarios present themselves. For example, some windows are made specifically for new construction installation, while others may be suitable only for pocket replacement, and still others are used in window out—window in replacement.

Each type of window and each installation scenario has its own requirements, some of which may be common to many or all of the permutations, and others of which may be limited to only one or relatively few permutations. Economies of scale in manufacturing and distribution would be realized to the extent that components can be used in as many applications as possible.

SUMMARY OF THE INVENTION

The present invention provides a double hung window suitable for pocket replacement, a casement window suitable for pocket replacement, a picture window suitable for pocket replacement, a glider window suitable for pocket replacement, an awning window suitable for pocket replacement, and a universal frame that renders each of these types of windows suitable for window out—window in replacement and new construction installation.

BRIEF DESCRIPTION OF THE DRAWING

With reference to the Figures of the Drawing, wherein like numerals represent like parts and assemblies throughout the several views.

FIG. 1b is a profile or sectioned side view of a preferred embodiment double hung window assembly constructed according to the principles of the present invention for pocket replacement type installation and installed in the wall shown in FIG. 1a;

FIG. 2a is a sectioned top view of the wall shown in FIG. 1a;

FIG. 2b is a sectioned top view of the window assembly shown in FIG. 1b and installed in the wall shown in FIG. 2a;

FIG. 3a is a sectioned side view of a wall in which a double hung window was installed and subsequently removed;

FIG. 3b is a sectioned side view of a preferred embodiment double hung window assembly constructed according to the principles of the present invention for window out—window in type installation and installed in the wall shown in FIG. 3a;

FIG. 4a is a sectioned top view of the wall shown in FIG. 3a;

FIG. 4b is a sectioned top view of the window assembly shown in FIG. 3b and installed in the wall shown in FIG. 4a;

FIG. 5a is a sectioned side view of a rough opening in a newly constructed wall;

FIG. 5b is a sectioned side view of a preferred embodiment double hung window assembly constructed according to the principles of the present invention for new construction type installation and installed in the rough opening shown in FIG. 5a;

FIG. 6a is a sectioned top view of the rough opening shown in FIG. 5a;

FIG. 6b is a sectioned top view of the window assembly shown in FIG. 5b and installed in the wall shown in FIG. 6a;

FIG. 7 is a sectioned side view of an alternative embodiment double hung window assembly constructed according to the principles of the present invention for new construction type installation and installed in the rough opening shown in FIG. 5a;

FIG. 8 is a sectioned top view of the window assembly shown in FIG. 7 and installed in the rough opening shown in FIG. 6a;

FIG. 9 is a sectioned side view of a preferred embodiment casement window assembly constructed according to the principles of the present invention for pocket replacement type installation and installed in the wall shown in FIG. 1a;

FIG. 10 is a sectioned top view of the window assembly shown in FIG. 9 and installed in the wall shown in FIG. 2a;

FIG. 11 is a sectioned side view of a preferred embodiment casement window assembly constructed according to the principles of the present invention for window out—window in type installation and installed in the wall shown in FIG. 3a;

FIG. 12 is a sectioned top view of the window assembly shown in FIG. 11 and installed in the wall shown in FIG. 4a;

FIG. 13 is a sectioned side view of a preferred embodiment casement window assembly constructed according to the principles of the present invention for new construction type installation and installed in the rough opening shown in FIG. 5a;

FIG. 14 is a sectioned top view of the window assembly shown in FIG. 13 and installed in the rough opening shown in FIG. 6a;

FIG. 15 is a sectioned side view of a preferred embodiment picture window assembly constructed according to the principles of the present invention for pocket replacement type installation and installed in the wall shown in FIG. 1a;

FIG. 16 is a sectioned top view of the window assembly shown in FIG. 15 and installed in the wall shown in FIG. 2a;

FIG. 17 is a sectioned side view of a preferred embodiment picture window assembly constructed according to the principles of the present invention for window out—window in type installation and installed in the wall shown in FIG. 3a;

FIG. 18 is a sectioned top view of the window assembly shown in FIG. 17 and installed in the wall shown in FIG. 4a;

FIG. 19 is a sectioned side view of a preferred embodiment picture window assembly constructed according to the principles of the present invention for new construction type installation and installed in the rough opening shown in FIG. 5a;

FIG. 20 is a sectioned top view of the window assembly shown in FIG. 19 and installed in the rough opening shown in FIG. 6a;

FIG. 21 is a sectioned side view of a preferred embodiment gliding window assembly constructed according to the principles of the present invention for pocket replacement type installation and installed in the wall shown in FIG. 1a;

FIG. 22 is a sectioned top view of the window assembly shown in FIG. 21 and installed in the wall shown in FIG. 2a;

FIG. 23 is a sectioned side view of a preferred embodiment gliding window assembly constructed according to the principles of the present invention for window out—window in type installation and installed in the wall shown in FIG. 3a;

FIG. 24 is a sectioned top view of the window assembly shown in FIG. 23 and installed in the wall shown in FIG. 4a;

FIG. 25 is a sectioned side view of a preferred embodiment gliding window assembly constructed according to the principles of the present invention for new construction type installation and installed in the rough opening shown in FIG. 5a;

FIG. 26 is a sectioned top view of the window assembly shown in FIG. 25 and installed in the rough opening shown in FIG. 6a;

FIG. 30 is a sectioned side view of a preferred embodiment head cover constructed according to the principles of the present invention and forming a part of the window assemblies shown in FIGS. 1b and 2b, 3b and 4b, 5b and 6b, and 7-8;

FIG. 32 is a sectioned side view of a preferred embodiment lower check rail constructed according to the principles of the present invention and forming a part of the window assemblies shown in FIGS. 1b and 2b, 3b and 4b, and 5b and 6b;

FIG. 33 is a sectioned side view of a preferred embodiment bottom rail constructed according to the principles of the present invention and forming a part of the window assemblies shown in FIGS. 1b and 2b, 3b and 4b, and 5b and 6b;

FIG. 40a is a sectioned side view of a preferred embodiment exterior trim member constructed according to the principles of the present invention and forming a part of the window out—window in window assemblies shown in FIGS. 3b and 4b;

FIG. 40b is a sectioned side view of an alternative embodiment exterior trim member constructed according to the principles of the present invention and suitable for use on window out—window in and new construction window assemblies proximate window out—window in or new construction double hung windows.

FIG. 44 is a sectioned side view of a preferred embodiment picture window jamb constructed according to the principles of the present invention and forming a part of the window assemblies shown in FIGS. 15-20;

FIG. 45 is a sectioned side view of a preferred embodiment picture window glass stop constructed according to the principles of the present invention and forming a part of the window assemblies shown in FIGS. 15-20;

FIG. 46 is a sectioned side view of a preferred embodiment picture window fastener cover constructed according to the principles of the present invention and forming a part of the window assemblies shown in FIGS. 15-20.

DETAILED DESCRIPTION OF A PREFERRED EMBODIMENT

The present invention provides a method of making various types of windows (i.e. double hung, casement, gliding, awning, and picture windows) for various types of applications (i.e. pocket replacement, window out/window in, and new construction). Regardless of the type of window and/or its intended application, each preferred embodiment window constructed according to the principles of the present invention includes structural components that are extrusions of a composite material of wood and polyvinyl chloride. This composite material is the subject of U.S. patent application Ser. No. 07/938,364, filed by Michael J. Deaner et al. on Aug. 31, 1992, and continued as Ser. No. 08/224,396 on Apr. 7, 1994; U.S. patent application Ser. No. 07/938,365, filed by Michael J. Deaner et al. on Aug. 31, 1992, and continued as Ser. No. 08/224,399 on Apr. 7, 1994; U.S. patent application Ser. No. 08/017,240, filed by Michael J. Deaner et al. on Feb. 12, 1993; and U.S. patent application Ser. No. 07/938,604, filed by Giuseppe Puppin et al. on Sep. 1, 1992, all of which are owned by a common assignee and incorporated herein by reference. This composite material allows for window designs that would not necessarily be feasible if made from wood or plastic alone. Also, many of these extruded structural components are common to more than one type of window and/or more than one type of application, thereby introducing economies of scale into the manufacturing process.

Double Hung Window for Pocket Replacement

Figure 1A:
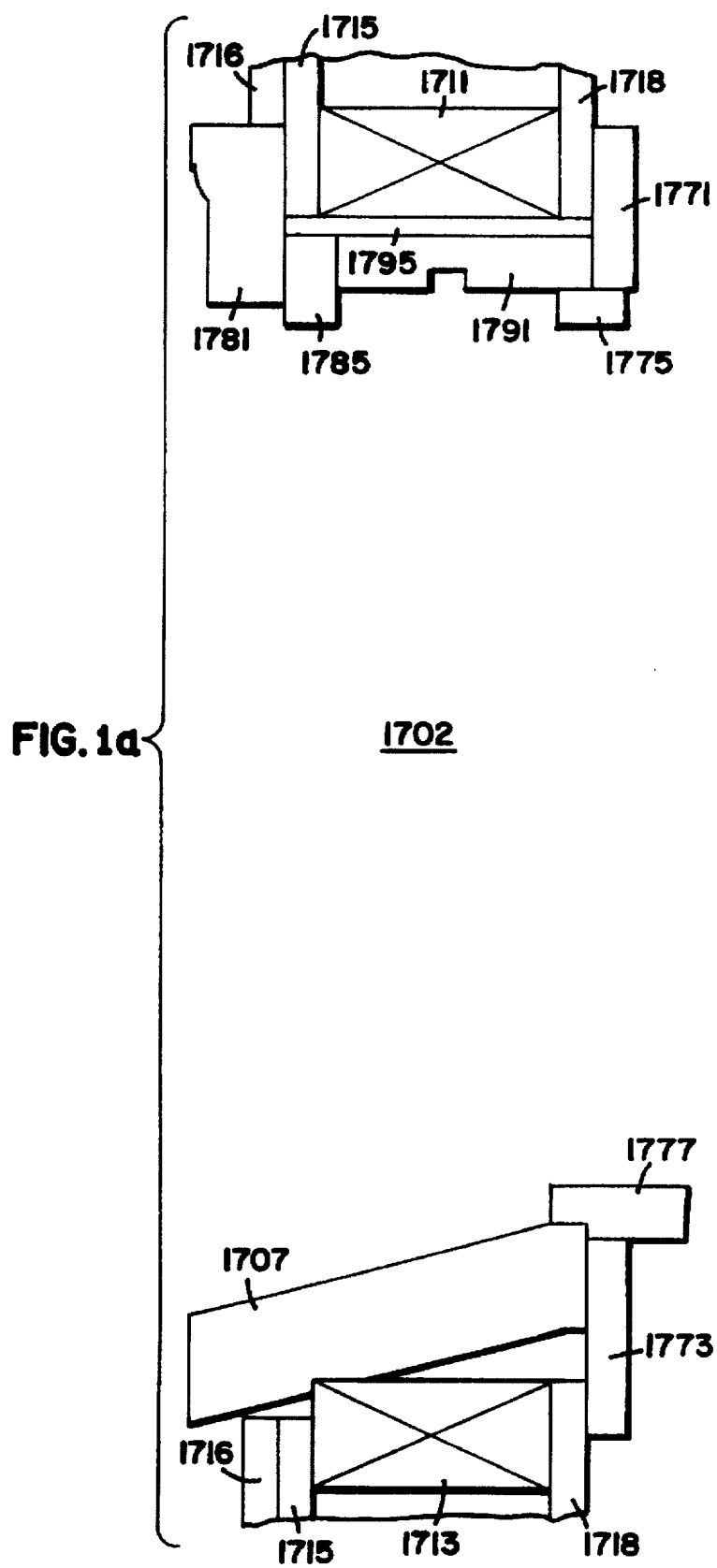
FIG. 1a is a profile or sectioned side view of a wall in which a double hung window was installed and the pocket portion thereof subsequently removed.
Figure 1B:
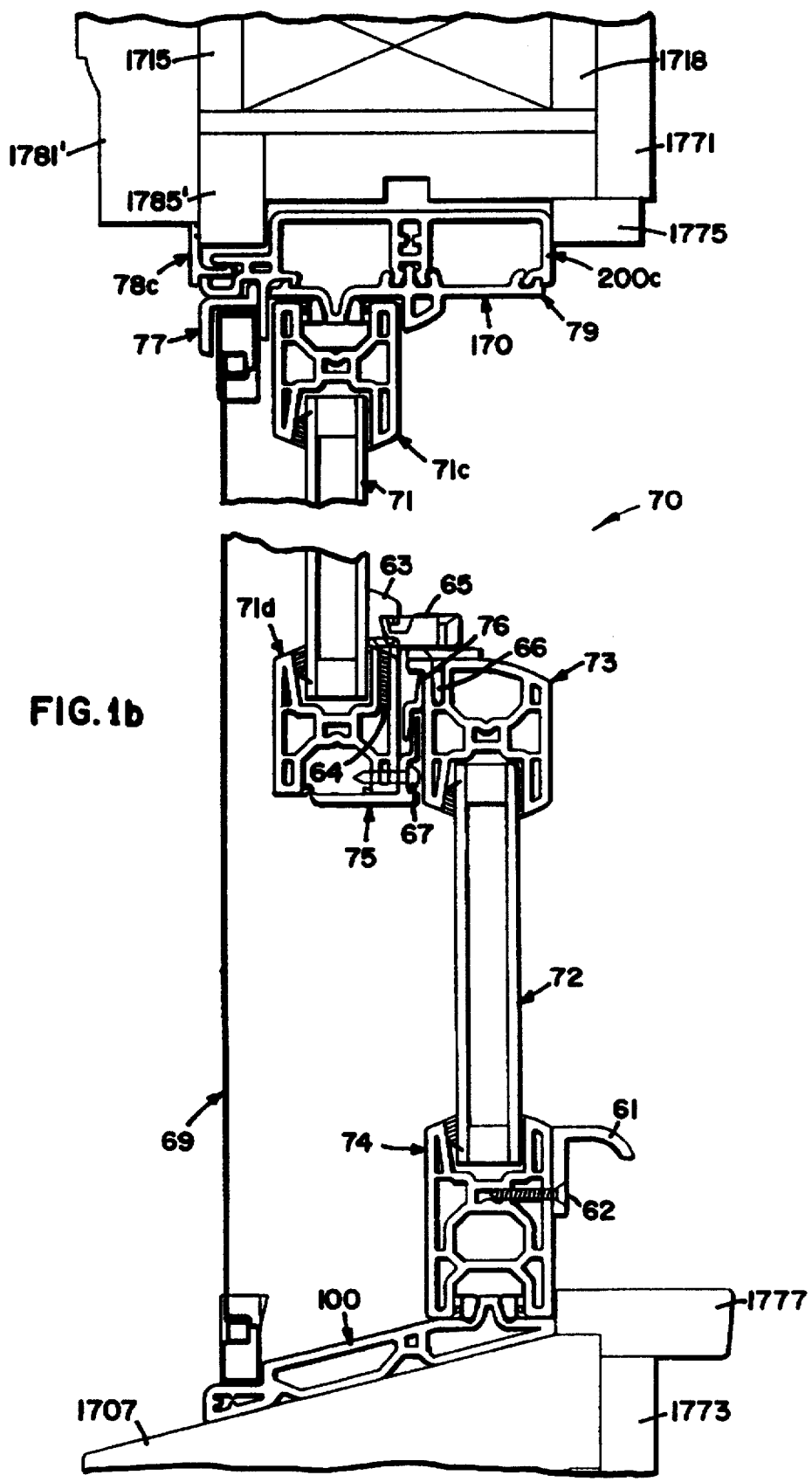

A preferred embodiment double-hung window unit constructed according to the principles of the present invention, and designed for pocket replacement installation, is designated as 70 in FIGS. 1b and 2b. The window 70 generally includes an upper sash 71 and a lower sash 72 which are slideably mounted within a window frame 79. The configuration of the upper sash 71 and the operation of both sashes 71 and 72 relative to the frame 79 are described in U.S. patent application Ser. No. 08/325,995, which is owned by a common assignee and incorporated herein by reference.

Figure 27:
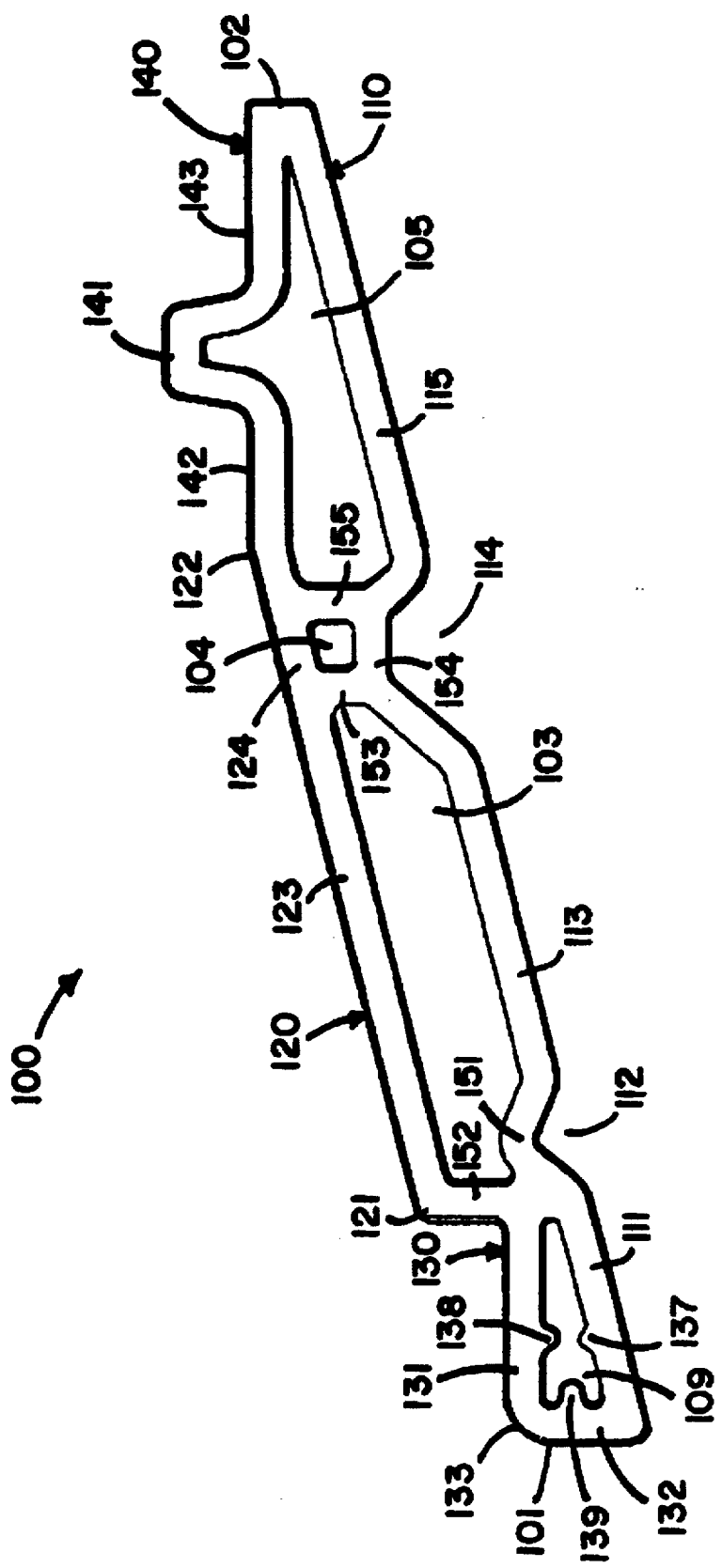
FIG. 27 is a sectioned side view of a preferred embodiment sill jamb constructed according to the principles of the present invention and forming a part of the window assembly shown in FIGS. 1b and 2b.

The fully installed window 70 includes extruded components having eleven distinct profiles. A first profile is present on the sill jamb 100 and is described with reference to FIG. 27. The profile of the sill jamb 100 extends from an outermost end 101 to an innermost end 102. Extending between the extreme ends 101 and 102 is a lower side 110 which is sized and configured to rest upon the sill of an existing window frame (from which an original or existing window was removed, as explained below). The lower side 110 includes a first segment or base 111, a second segment or base 113, and a third segment or base 115, all of which extend generally parallel to one another. A first angular segment or generally V-shaped elbow 151 extends between and integrally interconnects the first base 111 and the second base 113. The angular segment 151 defines a generally V-shaped channel 112 between the first base 111 and the second base 113. The channel 112 extends parallel to the outside blind stops of the original window and receives a bead of silicone for purposes of sealing the lower side 110 of the sill 100 relative to the existing window frame.

A second angular segment or generally U-shaped elbow 154 extends between and integrally interconnects the second base 113 and the third base 115. The angular segment 154 defines a generally U-shaped channel 114 between the second base 113 and the third base 115 which allows screws to be countersunk relative to the lower side 110 of the sill 100 for purposes that will become apparent below. A first segment or bridge 153 and a second segment or bridge 155 are connected to the angular segment 154 and extend from their respective junctures away from the lower side 110. The bridges 153 and 155 define an opening or screw chase 104 therebetween to receive the screws that are countersunk relative to the lower side 110.

Relatively large openings 103 and 105 are disposed on opposite sides of the bridges 153 and 155, respectively, and the bridges 153 and 155 contribute to maintain the integrity of the structure about these openings 103 and 105, particularly as the screws are countersunk and tightened relative to the lower side 110. Generally speaking, the configuration of each compartment within the sill profile is a function of the perimeter of the sill profile and the more or less constant wall thickness of the various segments that comprise the sill profile, which in turn, is a function of the structural characteristics of the composite material from which the window components are extruded.

The first base segment 111 cooperates with a first upper segment 131 and an outermost segment 132 to define a generally triangular lobe 130 having a perimeter 133. These same segments 111, 131, and 132 also cooperate to form a compartment 109 within the lobe 130. The first upper segment 131 is disposed above the first base segment 111 and is designed to extend generally horizontal when the first base segment 111 is supported on the sill of the existing frame. The outermost segment 132 extends generally vertical from an outermost end of the first upper segment 131 to an outermost end of the first base segment 111. A nub 137, 138, 139 extends from each segment 111, 131, 132, respectively, and into the compartment 109 for purposes that will become apparent below.

An angled sill segment 120 is disposed above the second base segment 113 and extends generally parallel thereto from an outermost end 121 to an innermost end 122. An intermediate segment 152 extends generally vertically upward from an innermost end of the first upper segment 131 to the outermost end 121 of the angled sill segment 120. A first portion 123 of the angled sill segment 120 is disposed above and bounds the relative large opening 103. A second portion 124 of the angled sill segment 120 is disposed above and bounds the screw chase 104. In other words, the bridges 153 and 155 extend between and integrally interconnect the angled sill segment 120 and the angular segment 154.

A bottom sash support 140 is disposed above the third base segment 115 and extends generally horizontal when the third base segment 115 is supported on the sill of an existing frame. The innermost end 122 of the angled sill segment 120 is integrally connected to an outermost end of the bottom sash support 140. The bottom sash support includes a generally rectangular rail or track 141 that extends upward between and thereby separates generally horizontal surfaces 142 and 143. The rail 141 engages weatherstrip material, disposed within a channel on the lower sash 72, when the lower sash 72 is moved to a closed position relative to the sill jamb 100.

An innermost end of the bottom sash support 140 is integrally connected to an innermost end of the third base segment 115, and this juncture defines the innermost end 102 of the sill jamb 100. The bottom sash support 140, the third base segment 115, and the second bridge 155 cooperate to bound the relatively large opening 105.

Figure 28:
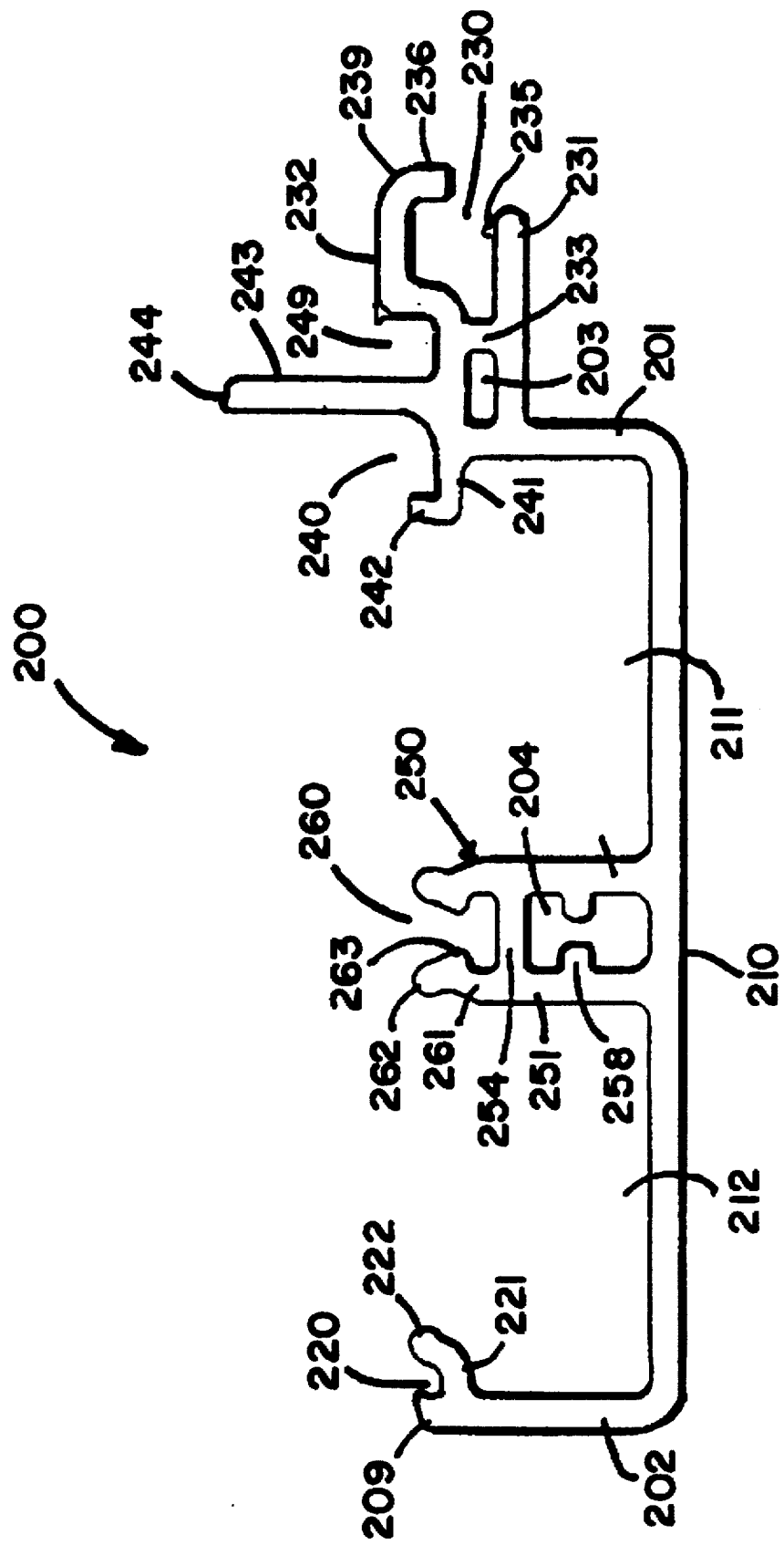
FIG. 28 is a sectioned side view of a preferred embodiment side jamb or head jamb constructed according to the principles of the present invention and forming a part of the window assemblies shown in FIGS. 1b and 2b, 3b and 4b, 5b and 6b, and 7-8.

A second profile is present on the side jambs 200a and 200b and the head jamb 200c and is described with reference to FIG. 28. The commonality of the second profile to both the side jambs 200a and 200b and the head jamb 200c provides manufacturing efficiency and facilitates reliable welded connections therebetween. The profile of these jambs 200a–c includes a linear base wall 210 that extends between an outer channel wall 201 and an inner channel wall 202. A divider 250 extends generally perpendicular from the base wall 210 between the channel walls 201 and 202 and generally parallel relative thereto. An outward wall 252 on the divider 250 cooperates with the outer channel wall 201 and the base wall 210 to define a first or outward channel 211. Similarly, an inward wall 251 on the divider 250 cooperates with the inner channel wall 202 and the base wall 210 to define a second or inward channel 212. Each of the channels 211 and 212 houses hardware (not shown) that facilitates movement of a respective window sash relative to the side jambs 200. Again, the operation of this hardware is described in the '995 application, which is identified above and incorporated herein by reference. The hardware is enclosed within the channels 211 and 212 by means of side covers 270a and 270b.

The divider 250 is symmetrical about a center line drawn perpendicular to the base wall 210 and thus, may described with reference to pairs of structural elements. For example, the outer wall 251 and the inner wall 252 are mirror images of one another relative to the center line. A transverse wall 254 extends between ends of the walls 251 and 252 opposite the base wall 210, and these four walls cooperate to define a generally rectangular compartment 204 therebetween. A nub 258 extends from each of the walls 251 and 252 and toward the other, giving the compartment 204 a configuration that may be said to be shaped generally like an hourglass.

A distal wall 261 extends from each end of the transverse wall 254, generally as an extension of a respective wall 251 and 252, but in slightly convergent manner, toward the center line. Each distal wall 261 terminates in a lip 262 that extends in divergent fashion from the distal wall 261 and relative to the center line. The juncture between each distally extending wall 261 and respective lip 262 includes a shoulder 263 that projects inward toward the center line. The distally extending walls 261, the lips 262, and the shoulders 263 cooperate to define a slot 260 having a profile that may be said to be similar in shape to the lower half of a vase.

A third profile is present on the side covers 270a and 270b and is described with reference to FIG. 29. The profile of the side covers 270a and 270b includes a main segment 271 from which a spike 283 extends. The spike 283 has an oversized or enlarged tip 284 that snaps into the vase-shaped slot 260 in either of the side jambs 200a or 200b. The divergent lips 262 guide the spike 283 into the slot 260, and the shoulders 263 retain the spike 283 therein. To each side of the spike 283, an arcuate segment 281 extends from the main segment 271 and curves toward the spike 283. Each of the arcuate segments 281 cooperates with the spike 283 and the main segment 271 to define a gap 282 into which a respective lip 262 inserts by snap fit to further secure either of the side covers 270a or 270b relative to a respective side jamb 200a or 200b, as shown in FIG. 2b.

With reference back to FIG. 28, the profile of the jambs 200a–c includes additional snap fit structure, connected to an end of the inward channel wall 202 opposite the base wall 210. This additional snap fit structure includes a distal wall segment or protrusion 209 that terminates in a rounded, outwardly directed point 223. Also, an arcuate wall 221 extends away from the channel wall 202 and curves away from the base wall 210, terminating in an end 222 which is opposite and flares away from the rounded point 223. The arcuate wall 221 and the distal wall 209 cooperate to define an angled, generally U-shaped groove 220 for purposes that will become apparent below.

Figure 29:
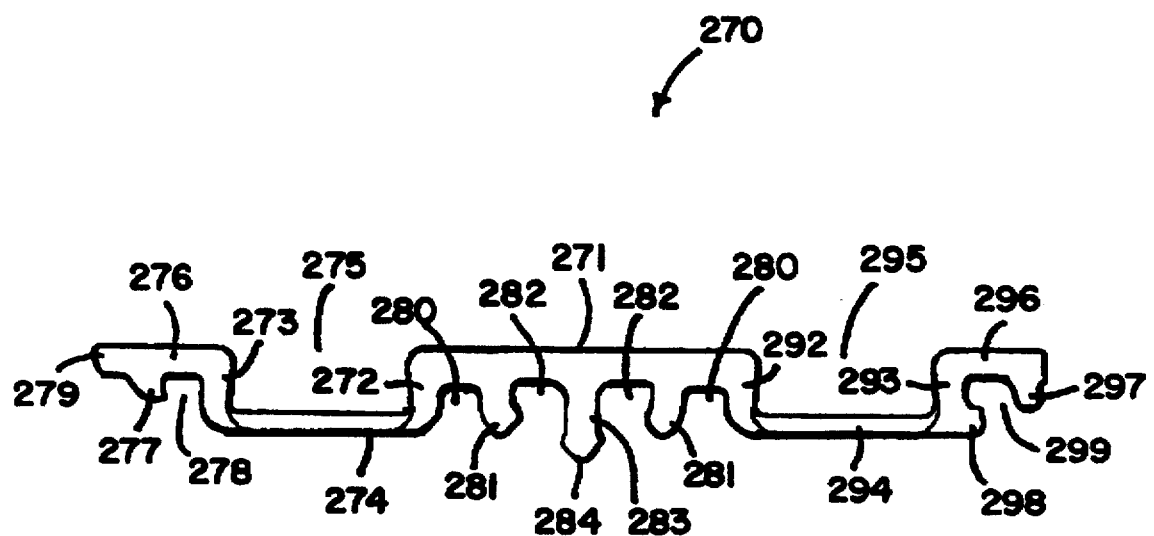
FIG. 29 is a sectioned side view of a preferred embodiment side cover constructed according to the principles of the present invention and forming a part of the window assemblies shown in FIGS. 1b and 2b, 3b and 4b, 5b and 6b, and 7-8.

As shown in FIG. 29, an inward end of the main segment 271 of the side covers 270a and 270b is integrally joined to a first inward channel sidewall 292, which extends generally perpendicular away from the main segment 271. An opposite end of the first sidewall 292 is integrally joined to an inward channel base wall 294, which extends generally perpendicular away from the first sidewall 292 (and generally parallel to the main segment 271). An opposite end of the base wall 294 is integrally joined to a second inward channel sidewall 293, which extends generally perpendicular away from the base wall 294 (and generally parallel to the first sidewall 292). The sidewalls 292 and 293 and the base wall 294 cooperate to define a generally U-shaped, inward channel 295 which cooperates with a compressible stop on the lower window sash to slideably secure the sash relative to the side jambs 200a and 200b. This aspect of the present invention is more fully described below, as well as in the '995 application, which is identified above and incorporated herein by reference.

An opposite end of the second sidewall 293 is integrally joined to an inward end segment 296 which is generally co-planar with the main segment 271. A first nub 297 extends generally perpendicular away from an opposite end of the inward end segment 296. The base wall 294 extends beyond its juncture with the second sidewall 293 to provide a second nub 298. The second sidewall 293, the end segment 296, and the two nubs 297 and 298 cooperate to define a generally L-shaped groove 299. As shown in FIG. 2b, the flared end 222 on the side jambs 200a and 200b inserts by snap fit into the groove 299, and the first nub 297 inserts by snap fit into the groove 220. The base wall 294 and a portion of the main segment 271 effectively span the channel 212 on either of the side jambs 200a or 200b and thereby enclose the sash supporting hardware therein.

A similar, outward channel 275 is disposed on an opposite side of the spike 283 and similarly cooperates with a compressible stop on the upper window sash. The outward channel 275 is defined by a first outward channel sidewall 272 integrally interconnected between (and generally perpendicular to) the main segment 271 and an end of an outward channel base wall 274, and a second outward channel sidewall 273 integrally interconnected between (and generally perpendicular to) an opposite end of the base wall 274 and an outward end segment 276. The outward end segment 276 extends to a distal end 279 and is co-planar with the main segment 271 and the inward end segment 296. A shoulder 277 extends from an intermediate portion of the outward end segment 276 and generally toward the central spike 283. The shoulder 277 and portions of the end segment 276 and the sidewall 273 cooperate to define a generally U-shaped channel 278 for purposes that will become apparent below.

With reference back to FIG. 28, the side jambs 200a and 200b have still more snap fit structure, connected to an end of the channel wall 201 opposite the base wall 210. This additional structure includes three wall portions 241, 242, and 243 which are integrally connected to form what may be described as a J-shaped member, and which cooperate to define that defines a groove 240. The first wall portion 241 extends in opposite directions from its juncture with a distal end of the channel wall 201 and generally perpendicular thereto. The second wall portion 242 extends generally perpendicular from an inward end of the first wall portion 241, though angled somewhat toward the third wall portion 243, which is relatively larger than the second wall portion 242. The third wall portion 243 extends generally perpendicular from an opposite, outward end of the first wall portion 241 and terminates in a distal end 244. The third wall portion 243 functions as a screen support and a sash stop, as further explained below. As shown in FIG. 2b, the second wall portion 242 snaps into the groove 278 and interengages the shoulder 277 on the cover 270, and the remainder of the outward end segment 276 on the covers 270a and 270b is retained within the groove 240 on the side jambs 200a and 200b.

The profile of the side jambs 200a and 200b further includes a first outwardly extending wall 231 that extends generally perpendicular away from the channel wall 201, proximate its juncture with the first wall portion 241. Also, a second outwardly extending wall 232 extends generally perpendicular away from the third wall portion 243, proximate its juncture with the first wall portion 241. A bend or shoulder in the second outwardly extending wall cooperates with the third wall portion 243 to define an opposite, relatively smaller J-shaped slot 249. A connecting wall 233 extends between an intermediate portion of the first wall 231 and the bend in the second wall 232. The first wall 231 extends linearly to a distal end from which a tab 235 extends toward the second wall 232 (and generally parallel to the connecting wall 233). The tab 235 cooperates with the first wall 231 and a portion of the connecting wall 233 to define an aluminum coil stock return suitable for receiving and retaining a zero plus bend.

The second wall 232 extends linearly beyond its juncture with the connecting wall 233 and generally parallel to the first wall 231. At a point opposite the end 234 of the first wall 231, the second wall 232 curves toward the first wall 231, terminating in a distal segment 236, which extends generally perpendicular relative thereto. The walls 231 and 232 cooperate to define a peripheral contour 239, and together with the connecting wall 233, cooperate to define a groove 230 for purposes that will become apparent below.

Figure 48:
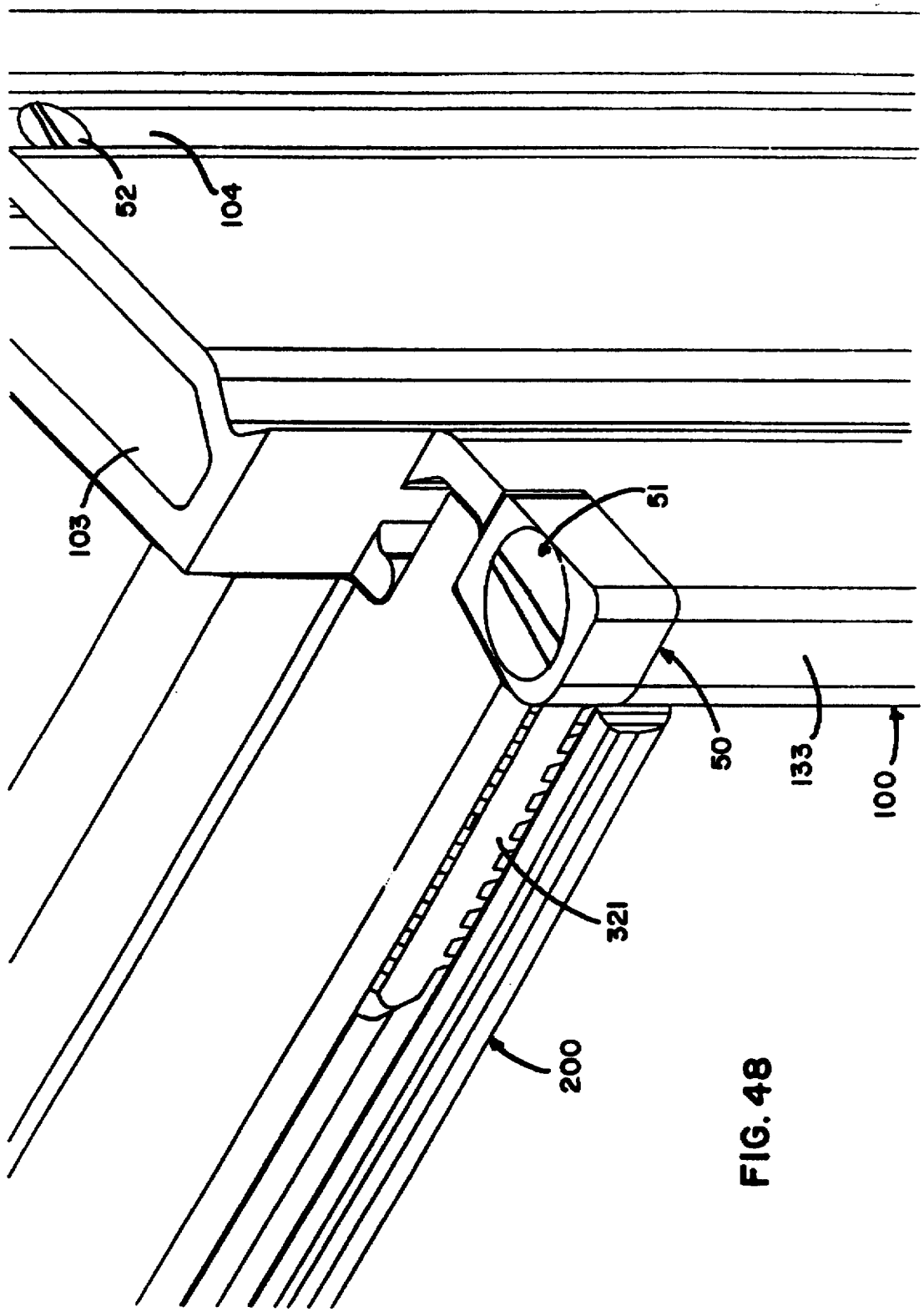
FIG. 48 is a view of a corner construction formed by two distinct jambs.

Connection of the head jamb 200c to the side jambs 200a and 200b is facilitated by the fact that each of these members has the same profile. As a result, when ends of the head jamb 200c and the side jambs 200a and 200b are cut at equal angles relative to one another, the structural components of the head jamb 200c align with and can be readily welded to corresponding structural components of the side jambs 200a and 200b. However, the profile of the sill jamb 100 differs significantly from that of the side jambs 200a and 200b, and thus, various components of the respective profiles do not abut or join one another at a corner formed by the two distinct jambs. Such a corner is shown in FIG. 48, together with additional hardware (a corner lock 50, a screw 51, and a screw 52) designed to effectively interconnect one of the side jambs 200a and 200b to the sill jamb 100. This aspect of the present invention is more fully explained in U.S. patent application Ser. No. 08/490,801 to Bruchu, filed contemporaneously herewith, which is owned by a common assignee and incorporated herein by reference.

A fourth profile is present on the head cover 170 and is described with reference to FIG. 30. The profile of the head cover 170 is similar in some respects to the profile of the side covers 270a and 270b, particularly with regard to the snap fit structure by which the head cover 170 is connected to the head jamb 200c. In this regard, the head cover 170 similarly includes a main segment 171 from which a spike 183 extends. The spike 183 has an oversized or enlarged tip 184 that snaps into the vase-shaped slot 260 in the head jamb 200c. The divergent lips 262 guide the spike 183 into the slot 260, and the shoulders 263 retain the spike 183 therein. To each side of the spike 183, an arcuate segment 181 extends from the main segment 171 and curves toward the spike 183. Each of the arcuate segments 181 cooperates with the spike 183 and the main segment 171 to define a gap 182 into which a respective lip 262 inserts by snap fit to further secure the head cover 270c to the head jamb 200c, as shown in FIG. 1b.

A nub 197 extends generally perpendicular away from an inward, distal end of the main segment 171, in the same general direction as the spike 183. Between the spike 183 and the distal nub 197 and nearer the latter, an arcuate segment 198 extends from the main segment 171 and toward the nub 197. The arcuate segment 198, the nub 197, and the portion of the main segment 171 integrally connected therebetween cooperate to define a generally L-shaped groove 199. The flared end 222 on the head jamb 200c inserts by snap fit into the groove 199, and the distal nub 197 inserts by snap fit into the groove 220. That portion of the main segment 171 extending between the spike 183 and the distal nub 197 effectively spans the channel 212 on the head jamb 200c.

A first, relatively short stop segment 172 extends generally perpendicular away from the main segment 171, opposite the inward arcuate member 181. A second, relatively long stop segment 173 extends generally perpendicular away from the main segment 171, opposite the spike 183. An arcuate stop segment 174 extends from a remote end of the shorter stop segment 172 to a remote end of the longer stop segment 173, thereby defining a generally trapezoidal compartment 175 between the stop segments 172–174 and the main segment 171.

The main segment 171 extends beyond the longer stop segment 173 and forms part of a top sash support. A remote outward end of the main segment 171 is integrally connected to a generally trapezoidal rail or track 178 which extends away from the main segment 171 in the same general direction as the longer stop segment 173. An opposite end of the rail 178 is integrally connected to an outward end segment 176, which is generally co-planar with the main segment 171. A shoulder 177 extends from the outward end segment 176 and generally toward the spike 183. The shoulder 177 interengages the second wall portion 242 on the head jamb 200c, and the remainder of the outward end segment 176 is retained within the groove 240, to further interconnect the head cover 170 and the head jamb 200c. The rail 178 engages weatherstrip material, disposed within a channel on the upper sash 71, when the upper sash 71 is moved to a closed position relative to the head jamb 200c. Also, the rail 178, the outward portion of the main segment 171, and the outward end segment effectively span the channel 211 on the head jamb 200c.

A fifth profile is present on all four upper sash members 71a–71d and two of the four lower sash members 72a and 72b. This fifth profile is shown in and described with reference to FIG. 31. The sash members are secured end to end at right angles relative to one another to support a glass panel 390. Each glass panel 390 includes an exterior pane of glass 391 and an interior pane of glass 392 secured in parallel, side by side relationship to one another by a seal 393 that extends about a perimeter 394 of the glass panel 390. The seal 393 cooperates with the edges 397 and 398 of the glass panes to define a sidewall about the perimeter 394 of the glass panel. The glass panel 390 may also be said to have an exterior face 395, and an interior face 396, which define a thickness T therebetween.

Figure 31:
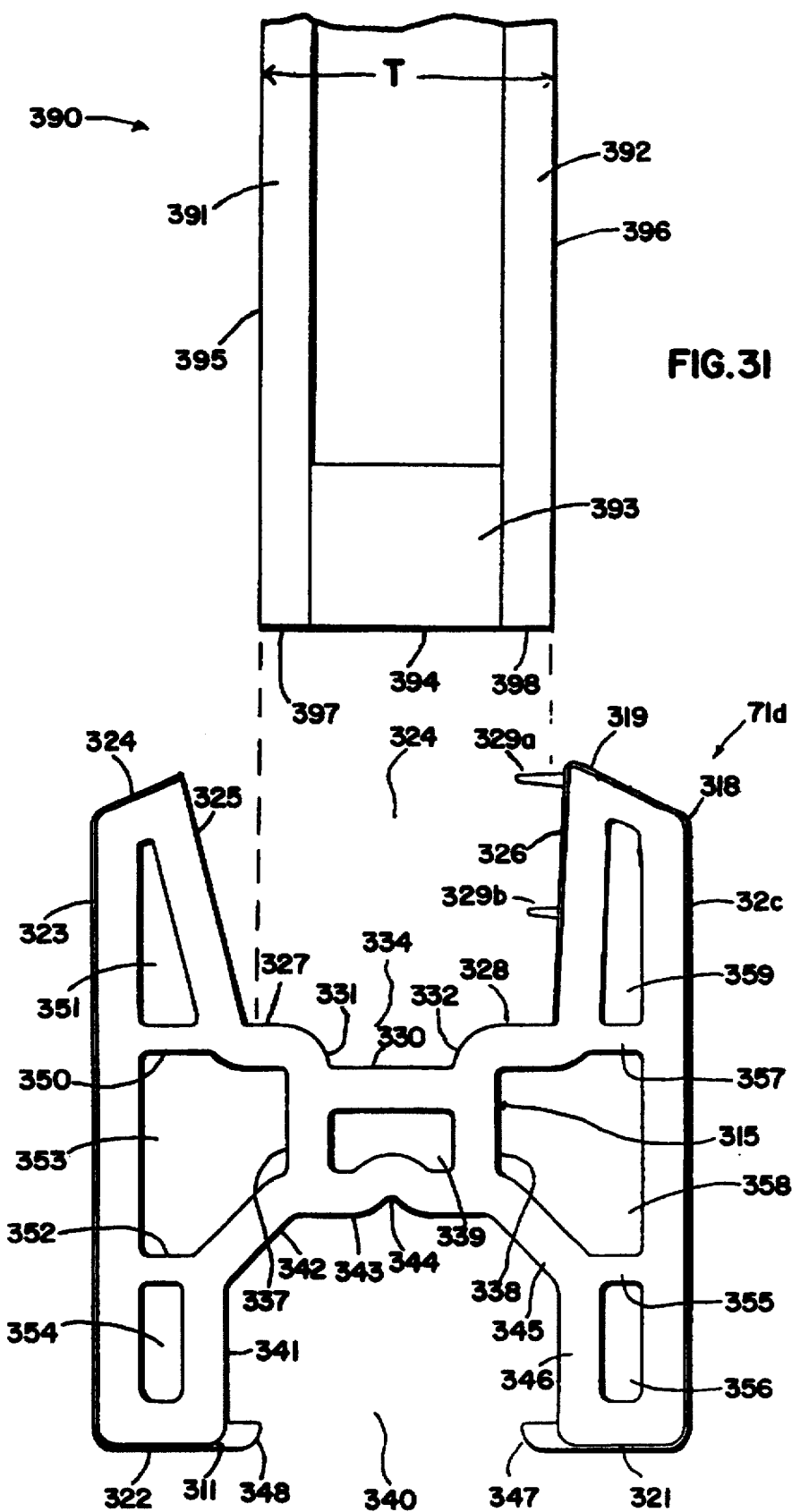
FIG. 31 is a sectioned side view of a preferred embodiment sash rail constructed according to the principles of the present invention and forming a part of the window assemblies shown in FIGS. 1b and 2b, 3b and 4b, 5b and 6b, and 7-8.

The profile of the sash member 71d, which is representative of the other sash members 71a–c and 72a–b, is shown in FIG. 31. The profile is generally H-shaped, having an exterior wall 323, an interior wall 320, and an intermediate structure 315 extending transversely therebetween. These components cooperate to define a substantially U-shaped channel 324 that opens inward, toward the glass panel 390, and a substantially U-shaped channel 340 that opens outward, away from the glass panel 390. The exterior wall 323 and the interior wall 320 extend substantially parallel to the glass panes 391 and 392.

A first internal bridge 350 is integrally joined to the exterior wall 323 nearer an inward end thereof. A second internal bridge 352 is integrally joined to the exterior wall 323 nearer an outward or frameward end thereof. The bridges 350 and 352 are spaced approximately as far apart from one another as from their respective ends of the exterior wall 323. The bridges 350 and 352 extend substantially parallel to one another from the exterior wall 323 toward the interior wall 320. The bridge 350 extends into and integrally joins a glass engaging sidewall 325 that borders the inwardly opening channel 324. The sidewall 325 extends inward from the bridge 350, and at an angle between five and fifteen degrees away from the exterior face 395 of the glass panel 390. An inward wall 324 extends between and integrally joins an opposite end of the sidewall 325 and the inward end of the exterior wall 323. The exterior wall 324 slopes downward away from the glass panel 390. The sidewall 325 and the exterior wall 323 converge toward the inward wall 324 and thereby define a substantially V-shaped member that overlies a portion of the exterior face 395 of the glass panel 390. This V-shaped portion cooperates with the first bridge 350 to define a substantially triangular compartment 351 therebetween.

A shoulder 327 is integrally joined to the juncture between the bridge 350 and the sidewall 325. The shoulder 327 extends from this juncture as a relatively thicker linear extension of the bridge 350. The shoulder 327 extends into and integrally joins a nested sidewall 331, which extends substantially perpendicular from the shoulder 327 and toward the frame 200. The sidewall 331 extends into and integrally joins a first base 330, which extends substantially perpendicular to the sidewall 331 and toward the interior wall 320. A third internal bridge 337 extends beyond the juncture between the sidewall 331 and the first base 330 as a linear extension of the sidewall 331. The third internal bridge 337 extends into and integrally joins a second base 343, which extends substantially perpendicular to the third bridge 337 and toward the interior wall 320.

A channel member 342 is integrally joined to the juncture between the third internal bridge 337 and the second base 343. The channel member 342 extends from this juncture toward the exterior wall 323, at angles of approximately 135 degrees relative to the third bridge 337 and relative to the second base 343. The channel member 342 extends into and integrally joins an end of the second bridge 352 opposite the exterior wall 323. The channel member 342, the second bridge 352, the exterior wall 323, the first bridge 350, the shoulder 327, and the third bridge 337 cooperate to define a second compartment 353.

A sidewall 341 is integrally joined to the juncture between the channel member 342 and the second bridge 352. The sidewall 341 extends from this juncture away from the glass panel 390 and substantially perpendicular to the second bridge 352. The sidewall 341 extends into and integrally joins an outward or frameward wall 322, which integrally interconnects the sidewall 341 and the exterior wall 323 and extends substantially perpendicular to both. The outward wall 322, the exterior wall 323, the second bridge 352, and the sidewall 341 cooperate to define a third, substantially rectangular compartment 354. A weather resistant, aesthetically pleasing coating 311 is disposed on the exteriors of the inward wall 324, the exterior wall 323, and the frameward wall 322. A relatively thicker tab 348 of the coating 311 projects beyond the frameward wall 322 and across a portion of the channel 340.

In several respects, the profile of the sash member 71d is symmetrical about a line centered between the exterior wall 323 and the interior wall 320. In this regard, a fourth internal bridge 357 is integrally joined to the interior wall 320 nearer an inward end thereof, and a fifth internal bridge 355 is integrally joined to the interior wall 320 nearer an outward or frameward end thereof. The bridges 355 and 357 are spaced approximately as far apart from one another as from their respective ends of the interior wall 320. The bridges 355 and 357 extend substantially parallel to one another from the interior wall 320 toward the exterior wall 323. The fourth bridge 357 extends into and integrally joins a glass engaging sidewall 326 that borders the inwardly opening channel 324. The sidewall 326 is not a mirror image of the sidewall 325, but rather, the sidewall 326 extends inward from the fourth bridge 357, toward the glass panel 390, and defines an angle of less than five degrees relative to the exterior face 395 of the glass panel 390.

An interior wall 319 extends between and integrally joins an opposite end of the sidewall 326 and the inward end of the interior wall 320. The interior wall 319 may be described as an extended mirror image of the inward wall 324. The sidewall 326 and the interior wall 320 extend approximately parallel to one another and extend from opposite ends of the interior wall 319 to define a substantially U-shaped member that overlies a portion of the interior face 396 of the glass panel 390. This U-shaped member cooperates with the fourth bridge 357 to define a fourth, substantially rectangular compartment 359 therebetween.

A shoulder 328 is integrally joined to the juncture between the fourth bridge 357 and the sidewall 326. The shoulder 328 extends from this juncture as a relatively thicker linear extension of the fourth bridge 357. The shoulder 328 extends into and integrally joins a nested sidewall 332, which extends substantially perpendicular from the shoulder 328 and away from the glass panel 390. The sidewall 332 extends into and integrally joins the first base 330, which extends substantially perpendicular to the sidewall 332 and toward the corresponding sidewall 331. A sixth internal bridge 338 extends beyond the juncture between the sidewall 332 and the first base 330 as a linear extension of the sidewall 332. The sixth bridge 338 extends into and integrally joins the second base 343, which extends substantially perpendicular to the sixth bridge 338 and toward the corresponding third bridge 337.

A channel member 345 is integrally joined to the juncture between the sixth bridge 338 and the second base 343. The channel member 345 extends from this juncture away from the glass panel 390 and toward the interior wall 320, at angles of approximately 135 degrees relative to the sixth bridge 338 and the second base 343. The channel member 345 extends into and integrally joins an end of the fifth bridge 355 opposite the interior wall 320. The channel member 345, the fifth bridge 355, the interior wall 320, the fourth bridge 357, the shoulder 328, and the sixth bridge 338 cooperate to define a fifth compartment 358.

A sidewall 346 is integrally joined to the juncture between the channel member 345 and the fifth bridge 355. The sidewall 346 extends from this juncture toward the frame and substantially perpendicular to the fifth bridge 355. The sidewall 346 extends into and integrally joins an outward wall 321, which integrally interconnects the sidewall 346 and the outward end of the interior wall 320 and extends substantially perpendicular to both. The outward wall 321, the interior wall 320, the fifth bridge 355, and the sidewall 346 cooperate to define a sixth, substantially rectangular compartment 356. A weather resistant, aesthetically pleasing coating 311 is disposed on the exteriors of the sidewall 326, the interior wall 319, the interior wall 320, and the outward wall 321. A relatively thicker tab 347 of the coating 311 projects beyond the frameward wall 321 and across a portion of the channel 340.

The substantially rectangular compartments 354, 356, and 359 provide surprisingly effective chases for screws that secure hardware relative to the sash members, particularly since the composite material from which the sash members are made is relatively rigid and thus, is generally not well suited for receiving nails or screws transverse to its surface. Tests have shown that screws threaded into the length of such a compartment are more secure than identical screws threaded into pine wood.

The third bridge 337 and the sixth bridge 338 are equal in length and extend parallel to one another. The first base 330 and the second base 343 are equal in length and extend parallel to one another. The third bridge 337, the first base 330, the sixth bridge 338, and the second base 343 cooperate to define a seventh, substantially rectangular compartment 339 which interconnects the exterior and interior portions of the sash profile 310. A dimple 344 is formed at the midpoint of the second base 343 to serve as a pilot for receiving the pointed ends of screws.

The nested sidewalls 331 and 332 and the first base 330 cooperate to define a substantially U-shaped channel 334. The sidewalls 325 and 326 and the shoulders 327 and 328 cooperate with the U-shaped channel 334 to define the larger U-shaped channel 324. The sidewall 325 functions to retain the exterior face 395 of the glass panel 390. The sidewall 326 functions to retain the interior face 396 of the glass panel 390.

The width of the channel 324 is defined by the distance between the sidewalls 325 and 326, which are spaced sufficiently far apart to receive the glass panel 390. In other words, the width of the channel 324 is greater than the thickness T of the glass panel 390. A pair of weather strips 329a and 329b project from the interior sidewall 326 into the channel 324. The weather strips 329a and 329b provide a means for sealing whatever gap exists between the interior face engaging sidewall 326 and the interior face of the glass panel 396. The sidewall 325 extends from the shoulder 327 at an angle of approximately 95 to 105 degrees to facilitate insertion of the glass panel into the channel 324. A sealant functions to seal the gap and provides a gap between the exterior face engaging sidewall 325 and the exterior face 395 of the glass panel 390.

The width of the channel 334, as defined between the sidewalls 331 and 332, is less than the thickness T of the glass panel 390. Rubber spacers are interspersed along the channel 324 and span the nested channel 334. A peripheral edge 397 of the exterior glass pane 391 rests against portions of the spacers supported by the shoulder 327 extending from the exterior sidewall 325 and perpendicular relative to the glass pane 391. A peripheral edge 398 of the interior glass pane 392 rests against portions of the spacers supported by the shoulder 328 extending from the interior sidewall 326 and perpendicular relative to the glass pane 392. The glass panel 390 spans the channel 334 and cooperates with the sidewalls 331 and 332 and the first base 330 to define a condensation cavity 335.

A sixth profile is present on the upper rail of the lower sash, which may be referred to as the lower check rail 73. This sixth profile, which is similar in many respects to the fifth profile, is shown in and described with reference to FIG. 32. In particular, the profile of the lower check rail 73 is generally C-shaped, having an exterior wall 323', an interior wall 320', an upper wall 380, and intermediate structure 315' extending transversely therebetween. These segments cooperate to define a substantially U-shaped channel 324' that opens inward, toward the glass panel 390. The exterior wall 323' and the interior wall 320' extend substantially parallel to the glass panes 391 and 392. The profile further includes compartments 339', 351', 353', 358', and 359' and surrounding structure comparable to compartments 339, 351, 353, 358, and 359 and surrounding structure, respectively, on the sash members 72a–b.

Distinguishing features on the profile of the lower check rail 73 include a weatherstrip 388 extending from the glass engaging sidewall 325' and into contact with the glass panel 390 within the channel 324', and only a single weatherstrip 389 extending from the glass engaging sidewall 326' and into contact with the glass panel 390 within the channel 324'. These weatherstrip variations constitute an alternative approach and due to economies of scale, would apply to all or none of the sash members 71a–d, 72a–b, and 73–74. Also, the interior wall 320' is slightly shorter, and the exterior wall 323' is slightly longer than their respective counterparts on the sash members 72a–b, thereby accommodating the upper wall or arcuate transverse member 380 which extends between and integrally interconnects outward ends of thereof. A relatively shorter sidewall 381 cooperates with a fifth internal bridge 355' and portions of the transverse member 380 and the interior wall 320' to define a sixth compartment 382, and a relatively longer sidewall 383 cooperates with a second internal bridge 352' and portions of the transverse member 380 and the exterior wall 323' to define a third compartment 384. The transverse member 380 also extends between the shorter sidewall 381 and the longer sidewall 383, thereby sealing off an eighth compartment 385. The transverse member 380 extends beyond the exterior wall 323' to a distal end 386.

Enough commonality exists between the profile of the lower check rail 73 and that of the side rails 72a–b to facilitate interconnection of ends thereof by welding. The interior wall 320' of the lower check rail 73 overlaps the side rails 72a–b to provide a mortise and tenon look and avoid difficulties that might otherwise arise due to the presence of the arcuate transverse member 380. The method by which this joint is formed is described more fully in the '995, which is identified above and incorporated herein by reference.

A seventh profile is present on the lower rail of the lower sash, which may be referred to as the bottom rail 74. This seventh profile, which is similar in many respects to the fifth profile, is shown in and described with reference to FIG. 33. In particular, the profile of the bottom rail 74 is generally H-shaped, having an exterior wall 323", an interior wall 320", and intermediate structure 315" extending transversely therebetween. These segments cooperate to define a first substantially U-shaped channel 324" that opens inward, toward the glass panel 390, and a second substantially U-shaped channel 340" that opens outward, away from the glass panel 390. The exterior wall 323" and the interior wall 320" extend substantially parallel to the glass panes 391 and 392. The profile further includes compartments 339", 351", and 359" and surrounding structure comparable to compartments 339, 351, and 359 and surrounding structure, respectively, on the sash members 72a–b.

Distinguishing features on the profile of the bottom rail 74 include a weatherstrip 388 extending from the glass engaging sidewall 325" and into contact with the glass panel 390 within the channel 324", and only a single weatherstrip 389 extending from the glass engaging sidewall 326" and into contact with the glass panel 390 within the channel 324". Also, the interior wall 320" and the exterior wall 323" are substantially longer than their respective counterparts on the sash members 72a–b, thereby giving the window 70 a more traditional look. The lengthier walls 320" and 323" necessarily create longer compartments 373, 374, 376, and 378 than their respective counterparts 353, 354, 356, and 358, respectively on the sash members 72a–b. Internal segment 363 no longer requires a dimple or screw pilot because additional internal segments 362, 364, and 365 seal off the internal segment 363 and together with other segments that remain unchanged from those on the sash members 72a–b, form an octagonal compartment 368. Still more additional segments 361 and 366 extend from opposite ends of the segment 365 to segments that remain unchanged from those on the sash members 72a–b and cooperate to bound the channel 340". Tabs 347" and 348" extend partially across the mouth of the channel 340" and retain a weatherstrip which engages the rail 141 on the sill member 100 when the lower sash 72 is moved to a closed position.

Figure 34:
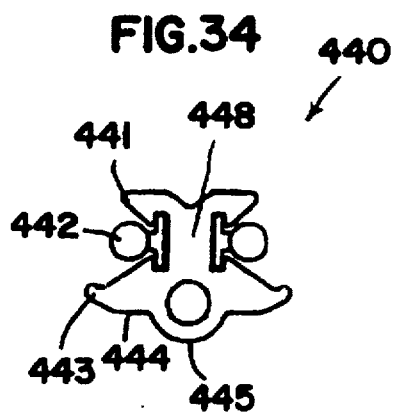
FIG. 34 is a sectioned side view of a preferred embodiment compressible stop constructed according to the principles of the present invention and forming a part of the window assemblies shown in FIGS. 1b and 2b, 3b and 4b, 5b and 6b, 7-8.

An eight profile is present on the upper sash interlock 75 and is shown in and described with reference to FIG. 34. The profile of the upper sash interlock 75 includes a main segment 401 that extends linearly from a first end 402 to a second end 403. A curved member 404 extends generally perpendicular away from the second end 403 and curves away from the first end 402 to form a hook. A second segment 405 extends perpendicularly away from the main segment 401 proximate the first end 402 and in the same general direction as the curved member or hook 404. An opposite end of the second segment is integrally connected to an offset or shoulder 407, which in turn, is integrally connected to a distal, tapered segment 409. The first end 402 of the main segment 401, the second segment 405, and the offset 407 cooperate to define a relatively shallow U-shaped channel 408. A hole 406 is formed through the second segment 405 parallel to the main segment 401 and generally centered within the channel 408.

The hook 404 engages the tab 348 on the upper check rail 71d, and a fastener 67 inserts through the hole 406 and the compartment 356 to secure the interlock 75 to the upper check rail 71d. The channel 408 allows the head of the fastener 67 to be countersunk relative to the distal segment 409 and the first end 402. The main segment 401 spans the channel 340, thereby sealing same and providing a more finished appearance.

Figure 35A:
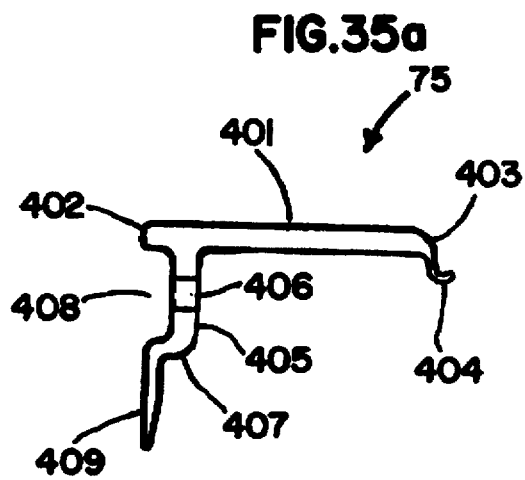
FIG. 35a is a sectioned side view of a preferred embodiment reversible interlock constructed according to the principles of the present invention and forming a part of the window assemblies shown in FIGS. 1b and 2b, 3b and 4b, 5b and 6b, 7-8, and 21-26.
Figure 35B:
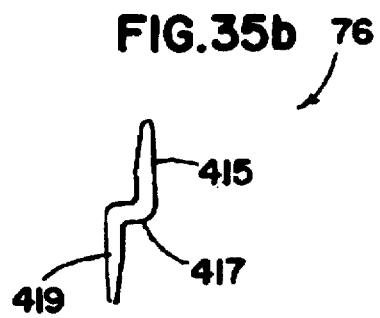
FIG. 35b is a sectioned side view of a preferred embodiment lower check rail interlock constructed according to the principles of the present invention and forming a part of the window assemblies shown in FIGS. 1b and 2b, 3b and 4b, and 5b and 6b.

A ninth profile is present on the lower sash interlock 76 and is shown in and described with reference to FIG. 35. The profile of the lower sash interlock 76 includes a first distal, tapered segment 415, a second distal, tapered segment 419, and an offset or shoulder 417 integrally interconnected therebetween. The first segment 415 is secured (by ultrasonic welding) to the exterior wall 323' of the lower check rail 73 immediately beneath the distal end 386 of the arcuate segment 380. The arrangement of the interlocks 75 and 76 and their respective sashes 71 and 72 is such that the distal segments 409 and 419 interengage or interlock when the sashes 71 and 72 are moved to their respective closed positions within the frame 79. At least one weatherstrip is disposed between the interlocks 75 and 76 proximate one or both of the offsets 407 and 417 and/or between the overlapping distal ends 409 and 419.

Figure 37:
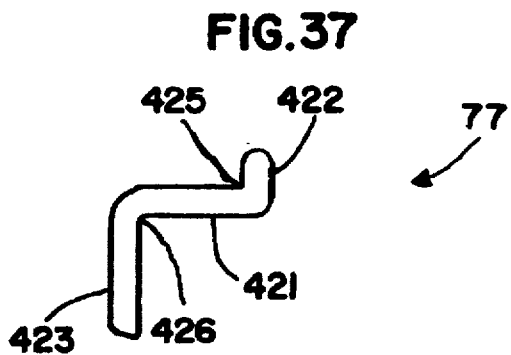
FIG. 37 is a sectioned side view of a preferred embodiment screen retainer constructed according to the principles of the present invention and forming a part of the window assemblies shown in FIGS. 1b and 2b, 3b and 4b, 5b and 6b, 7-8, and 21-26.

A tenth profile is present on the screen retainer 77 and is described with reference to FIG. 37. The profile of the screen retainer 77 includes an intermediate segment 421 extending linearly between a first end and a second end. A relatively shorter distal segment 422 extends generally perpendicular away from the first end of the intermediate segment 421, thereby defining a first interior corner 425 therebetween. A relatively longer distal segment 423 extends generally perpendicular away from the second, opposite end of the intermediate segment 421, thereby defining a second interior corner 426 therebetween. The shorter segment 422 is secured (by ultrasonic welding) within the J-shaped slot 249 on the upper jamb 71c, and the intermediate segment 421 and the longer segment 423 cooperate with the second outwardly extending wall 232 on the upper jamb 71c to define a substantially U-shaped slot that retains an upper end of a screen 69 relative to the window frame 79.

An eleventh profile is present on the compressible stops 440 and is described with reference to FIG. 34. This component is extruded from vinyl alone, as opposed to the composite material. The profile of the compressible stops 440 may be described with reference to human anatomy. Two feet 441 extend in generally opposite directions from one end of a main body 448, and a head 445 extends from an opposite end of the main body 448. Two shoulders 444 extend in generally opposite directions from opposite sides of the head 445 and terminate in arms 443. A cylindrical weatherstrip 442 extends from each side of the main body's waist. The arms 443 span a relatively greater distance and retain the stop within a channel 340 on one of the rails 71a–b or 72a–b. The feet 441 retain the stop 440 within a channel 275 or 295 on either of the side covers 270a or 270b but can be withdrawn therefrom to facilitate pivoting of the respective sash. The operation of the stops 440 is described in greater detail in the '995 application, which is identified above and incorporated herein by reference.

Figure 36:
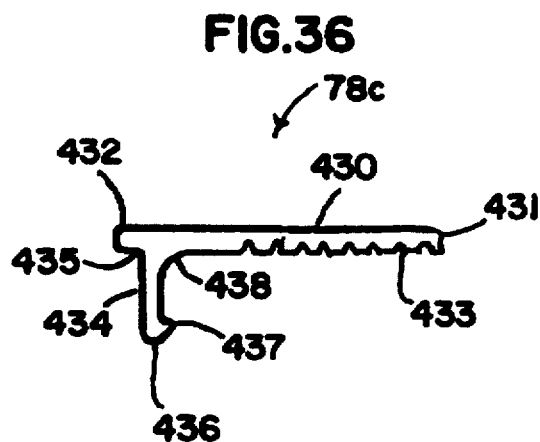
FIG. 36 is a sectioned side view of a preferred embodiment exterior trim member constructed according to the principles of the present invention suitable for use as an optional accessory in installing any of the pocket window assemblies shown in FIGS. 1b and 2b, 9-10, 15-16, and 21-22.

An additional, twelfth profile is present on the outside trim 78a–c and is described with reference to FIG. 36. The outside trim 78a–c may be used as an alternative to aluminum coil stock according to the preferences of the consumer and/or the window installer. The profile of the outside trim 78a–c includes a main segment 430 that extends between a first end 431 and a second end 432. Successive grooves 433 are formed in the main segment 430, toward the first end 431 thereof, to extend along the length of the trim members (perpendicular to the profile). A second segment 434 extends perpendicular away from the main segment 430 proximate the second end 432, thereby defining complementary interior corners 435 and 438. The second segment 434 extends to a distal end 436 having a catch or shoulder 437 formed thereon and extending generally toward the first end 431.

Assembly of Double Hung Pocket Window

Assembly of the double hung pocket window 70 is described in the '995 application, which is identified above and incorporated herein by reference. In general, the sash rails are welded about the glass panels 390. A handle 61 is secured to the lower sash 72 by means of a screw 62 that threads into the compartment 339" of the bottom rail 74. The interlock 76 is welded to the lower check rail 73, and the catch portion 65 of a latch is secured to the lower check rail 73 by means of a screw 66 that threads into the compartment 384. The interlock 75 is connected to the lower rail 71d on the upper sash 71 by means of a screw 67 that threads through the compartment 356. The keeper portion 63 of the latch is secured to lower rail 71d on the upper sash 71 by means of a screw 64 threaded into the compartment 359. Tests have shown that the compartments function as surprisingly reliable screw chases.

The screen retainer 77 is secured to the head jamb 200c. Foam strips 449 are secured to the compressible stops 440, and the arms 443 are snapped into the channels 340 on the sash side rails 71a–b and 72a–b. Operating hardware (not shown) is placed within the channels 211 and 212 on the side jambs 200a and 200b and connected to respective sashes. The side covers 270a and 270b are snapped onto respective side jambs 200a and 200b, and the head cover 170 is snapped onto the head jamb 200c. The feet 441 on the stops 440 are snapped into respective channels 275 and 295 on the side covers 270a and 270b. Finally, the side jambs 200a–b are secured between the sill jamb 100 and the head jamb 200c, slideably retaining the sashes 71 and 72 therebetween.

Installation of Double Hung Pocket Window

Figure 2A:
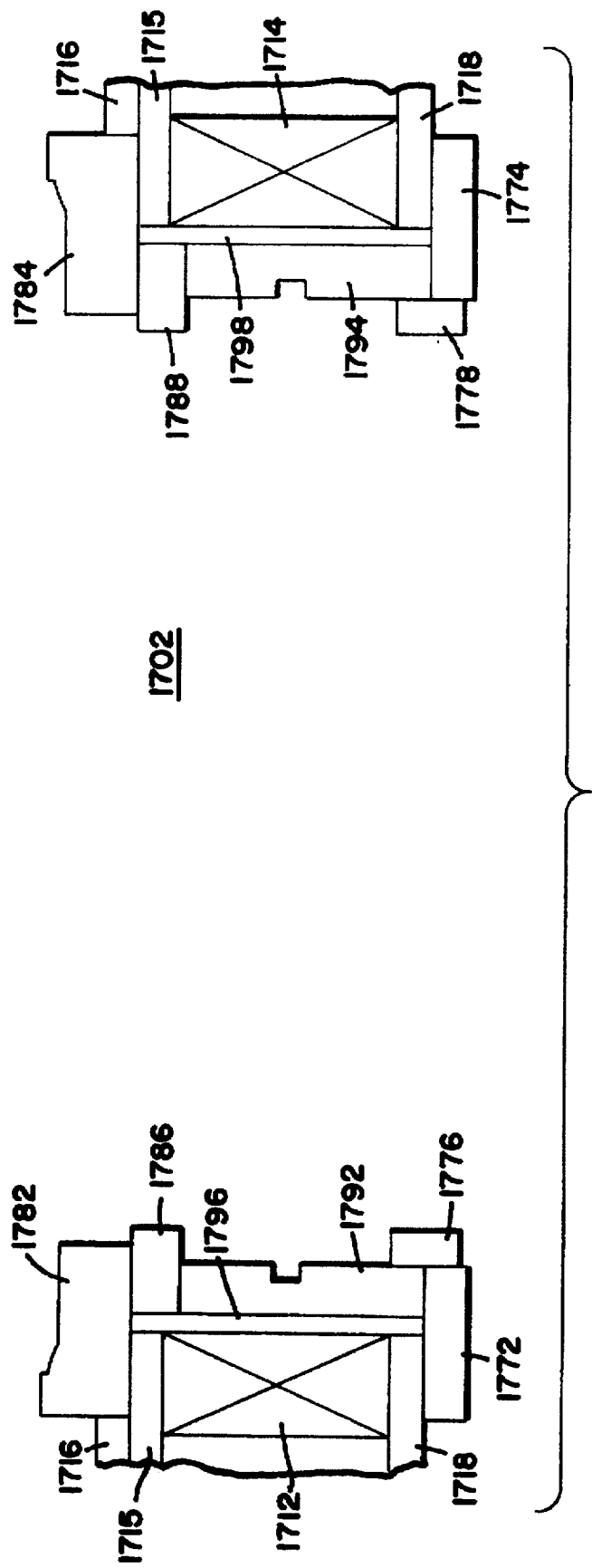

In pocket replacement window installation, the existing window is typically removed from its frame by removing the molding on only one side of the window. For example, as shown in FIGS. 1a and 2a, only the exterior molding pieces 1781, 1782, and 1784 and the stops 1785, 1786, and 1788 need be removed in order to gain sufficient access to the rough opening 1702 from the exterior of the building. The interior finish 1718, the interior trim pieces 1771–1778, the existing frame elements (such as the sill 1707), and the exterior finish 1716 are left intact.

With reference to FIGS. 1b and 2b, the window assembly 70 is positioned within the opening 1702 and on the existing sill 1707. The inwardly facing walls 102 and 202 of the jambs 100 and 200a–c, respectively, contact respective interior trim members 1775–1778. The window assembly 70 is then secured within the opening 1702 by means of screws through respective side covers 270a and 270b side jambs 200a and 200b, and pre-existing side liners 1792 and 1794, and into respective side jambs 1712 and 1714. These screws are directed through the slot 260 and the compartment 204 on the side jambs 200a and 200b. Additional screws may be threaded through the head cover 170, the head jamb 200c, and the pre-existing head liner 1791, and into the head jamb 1711. These screws are directed through the main segment 271 and just outside the outward wall 252 on the head jamb 200c. Still more screws may be threaded through the sill 100 and into the existing sill 1707. These screws are directed through the screw chase 104.

Exterior trim members, such as the pieces 1785', 1786', and 1788', such as the pieces which were previously removed, are secured to respective pre-existing liners 1791, 1792, and 1794, just outside the outwardly facing walls 101 and 102 on the jambs 100 and 200a–c, respectively. Next, exterior trim members, 1781', 1782', 1784', such as the pieces which were previously removed, are secured relative to the wall and respective trim pieces 1785', 1786', and 1788', and extruded trim members 78a–c are secured in place. The trim members 78a–c are cut to length to abut the trim members 1781', 1782', and 1784', respectively, Alternatively, aluminum coil stock may be secured within the channel 230, behind the tab 235, and wrapped over the trim members 1785', 1786', and 1788' Then the exterior trim members 1781', 1782', and 1784' are secured relative to the wall, over distal portions of the aluminum coil stock. In either case, caulk may be added at key locations.

Double Hung Window for Window Out—Window In Replacement

Figure 3B:
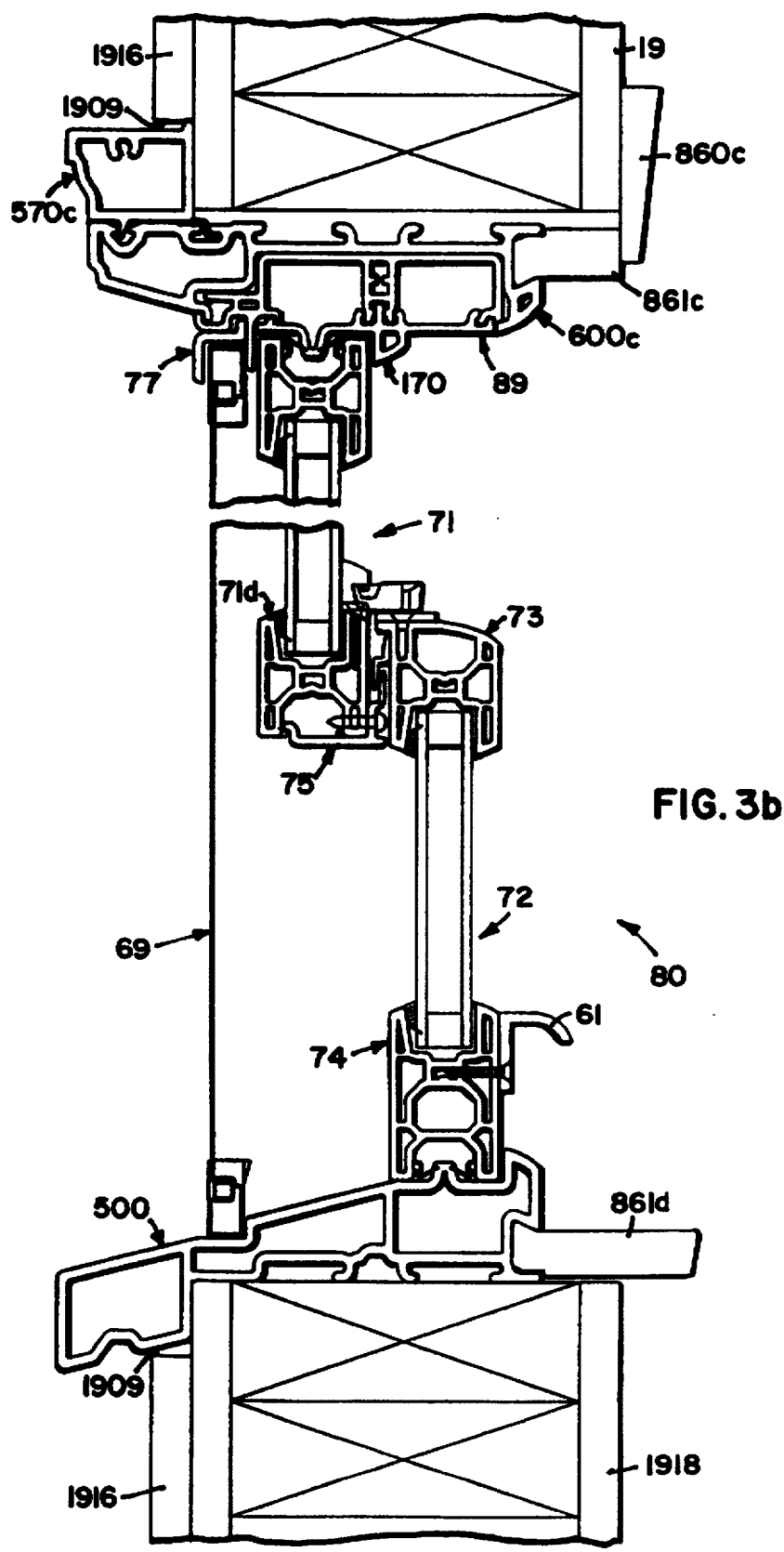
Figure 4B:
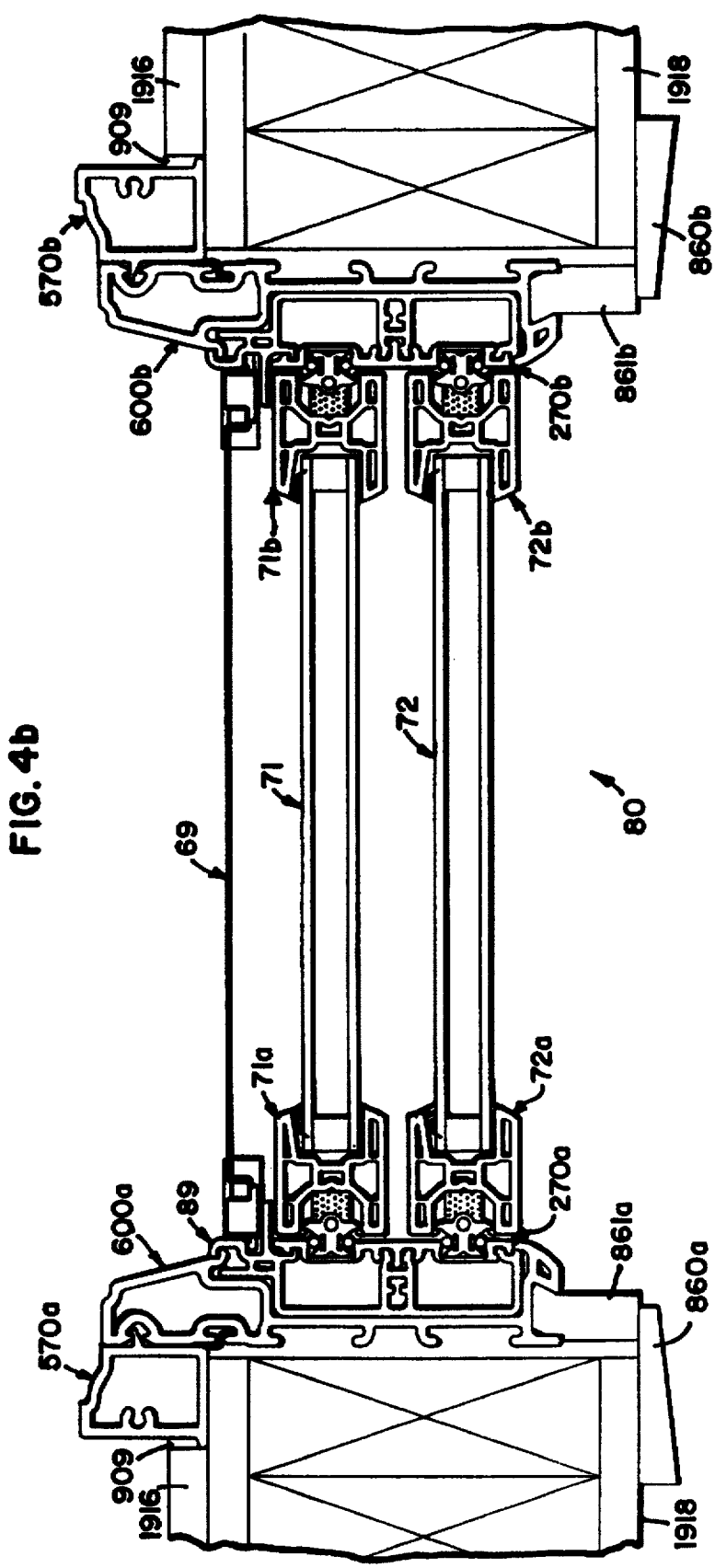

A preferred embodiment double-hung window unit constructed according to the principles of the present invention, and designed for window out—window in (WOWI) replacement installation, is designated as 80 in FIGS. 3b and 4b. As evidenced by the common reference numerals, the window 80 is functionally similar to the pocket window 70 shown in and described with reference to FIGS. 1b and 2b.

Figure 38:
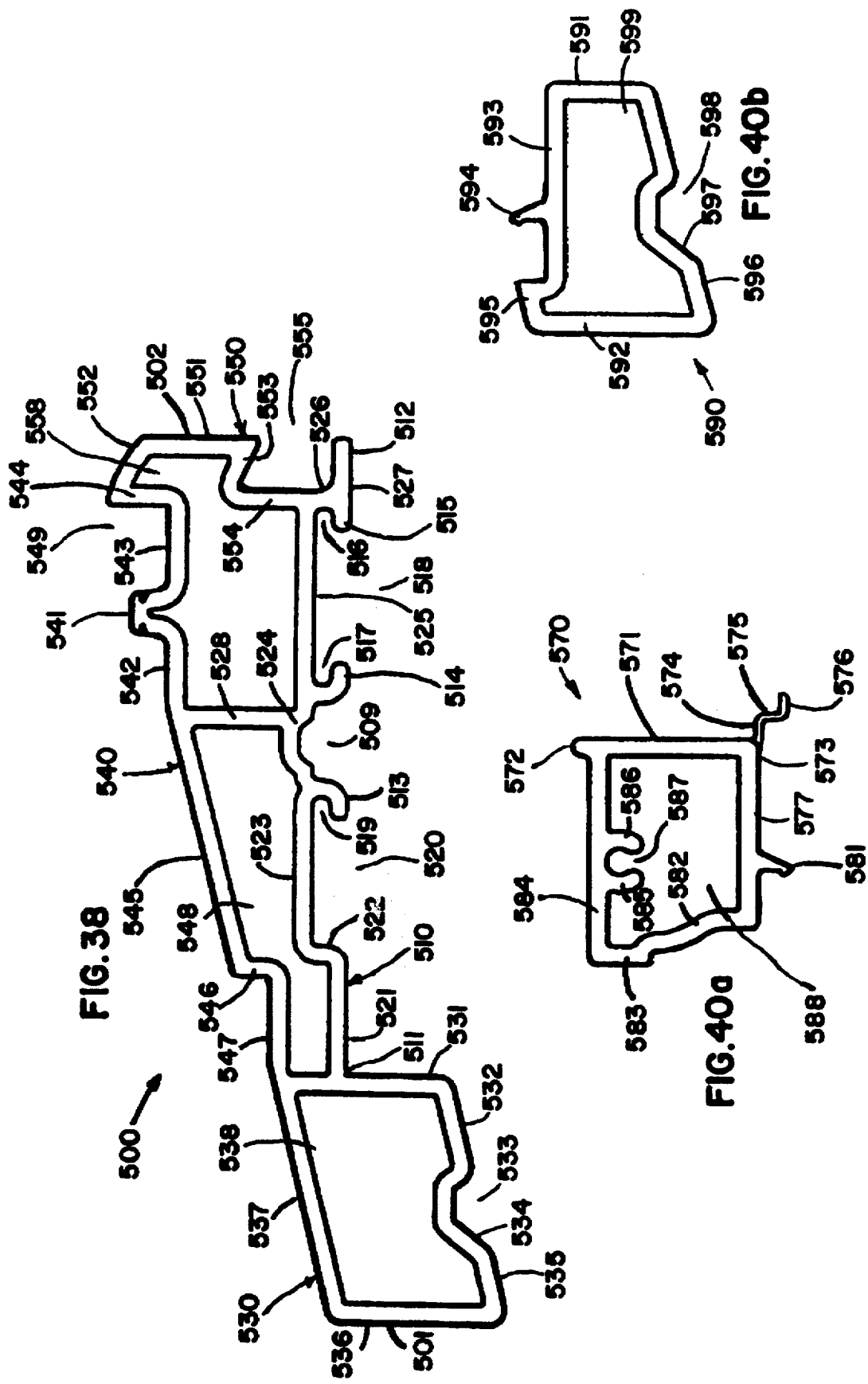
FIG. 38 is a sectioned side view of a preferred embodiment sill constructed according to the principles of the present invention and forming a part of the window assemblies shown in FIGS. 3b and 4b, 5b and 6b, and 7-8.

The fully installed window 80 requires extruded components having three distinct profiles in addition to those discussed above with reference to the double hung window 70 suitable for pocket replacement. A first of these additional profiles is present on the sill jamb 500 and is described with reference to FIG. 38. The profile of the sill jamb 500 extends from an outermost end 501 to an innermost end 502, and generally includes a base portion 510, an external trim portion 530, a sill portion 540, and an internal trim portion 550.

The base portion 510 extends from an outermost end 511 to an innermost end 512. A first base segment 521 extends linearly inward from the outermost end 511 to an offset or shoulder 522 extending generally perpendicular thereto. The offset 522 integrally joins a second base segment 523 that extends parallel to the first base segment 521. An opposite end of the second base segment 523 integrally joins a curved central segment 524, which in turn integrally joins a third base segment 525 that is co-planar with the second base segment 523. An opposite end of the third base segment 525 integrally joins a leg 526 that extends perpendicular thereto and in the same general direction as the offset 522. An opposite end of the leg 526 integrally joins a foot 527 that is co-planar with the first base segment 521. The foot 527 extends in opposite directions from the leg 526 terminating in a first distal end that defines the innermost end 512 of the base portion 510, and a second, relatively outward distal end 515 which cooperates with the leg 526 and a portion of the third base segment 525 to define a first substantially U-shaped groove 516.

A first arcuate segment 514 extends generally perpendicular away from the third base segment 525, proximate its juncture with the curved central segment 524, and curves toward the outward distal end 515 of the foot 527. The first arcuate segment 514 cooperates with third base segment 525 to define a second substantially U-shaped groove 517 which is similar in size and shape and opens toward the first groove 516. In other words, the foot 527, the leg 526, the third base segment 525, and the first arcuate segment 514 cooperate to define a relatively shallow channel 518 having a generally T-shaped profile.

Similarly, a second arcuate segment 513 extends generally perpendicular away from the second base segment 523, proximate its juncture with the curved central segment 524, and curves toward the offset 522. The second arcuate segment 513 cooperates with second base segment 523 to define a third substantially U-shaped groove 519 which is similar in size and shape and opens away from the second groove 517 and toward the offset 522. In other words, the second arcuate segment 513, the second base segment 523, and the offset 522 cooperate to define a relatively shallow channel 520 having a generally L-shaped profile.

The exterior trim portion 530 includes a first substantially vertical segment 531 connected to the outermost end 511 of the base portion 510 and extending in opposite directions generally perpendicular thereto. A lower end of the first segment 531 integrally joins a first lower segment, which in turn, integrally joins a second, generally U-shaped lower segment 533 that opens downward. An opposite end of the U-shaped segment 533 integrally joins a third lower segment 535 which is substantially co-planar with the first lower segment 532. A second substantially vertical segment 536 extends between an outermost end of the third lower segment 535 and an outermost end of an upper segment 537. An opposite end of the upper segment 537 integrally joins the upper end of the first vertical segment 531 to complete a border about a compartment 538.

The sill portion 540 includes a generally horizontal segment 547 that is integrally connected to and extends inward from the juncture between the vertical segment 531 and the upper segment 537 on the exterior trim portion 530. An offset or shoulder 546 extends generally perpendicular between an opposite end of the horizontal segment 547 and a relatively outward end of an angled segment 545, which in turn, extends inward and upward to a horizontal, first sash engaging segment 542. A generally rectangular rail or track 541 extends upward between the first sash engaging segment 542 and a horizontal, second sash engaging segment 543. An innermost end of the second sash engaging segment 543 integrally joins a sash wall 544, which together with the second sash engaging segment 543 and the rail 541, borders a substantially U-shaped channel 549. When the lower sash 82 is moved to a closed position within the frame 89, the interior face 323" of the bottom rail 74 assumes a position adjacent the sash wall 544, and the rail 541 engages weatherstrip within the channel 340".

The interior trim portion 550 includes a vertical, inward facing segment 551, and a curved upper segment 552 that extends between respective upper ends of the inward facing segment 551 and the sash wall 544. An opposite, lower end of the inward facing segment 551 integrally joins a sidewall 553 which extends generally toward the segment 543. An opposite end of the sidewall 553 integrally joins a base wall 554 which extends frameward therefrom and is co-linear with the leg 526. The sidewall 553 and the base wall 554 cooperate with the leg 526 and the inward portion of the foot 527 to define a channel 555 having a trapezoidal cross-section suitable for receiving and retaining an extension jamb or functioning as a sheet rock return. This aspect of the invention is described in greater detail in the '995 application, which is identified above and incorporated herein by reference.

Figure 39:
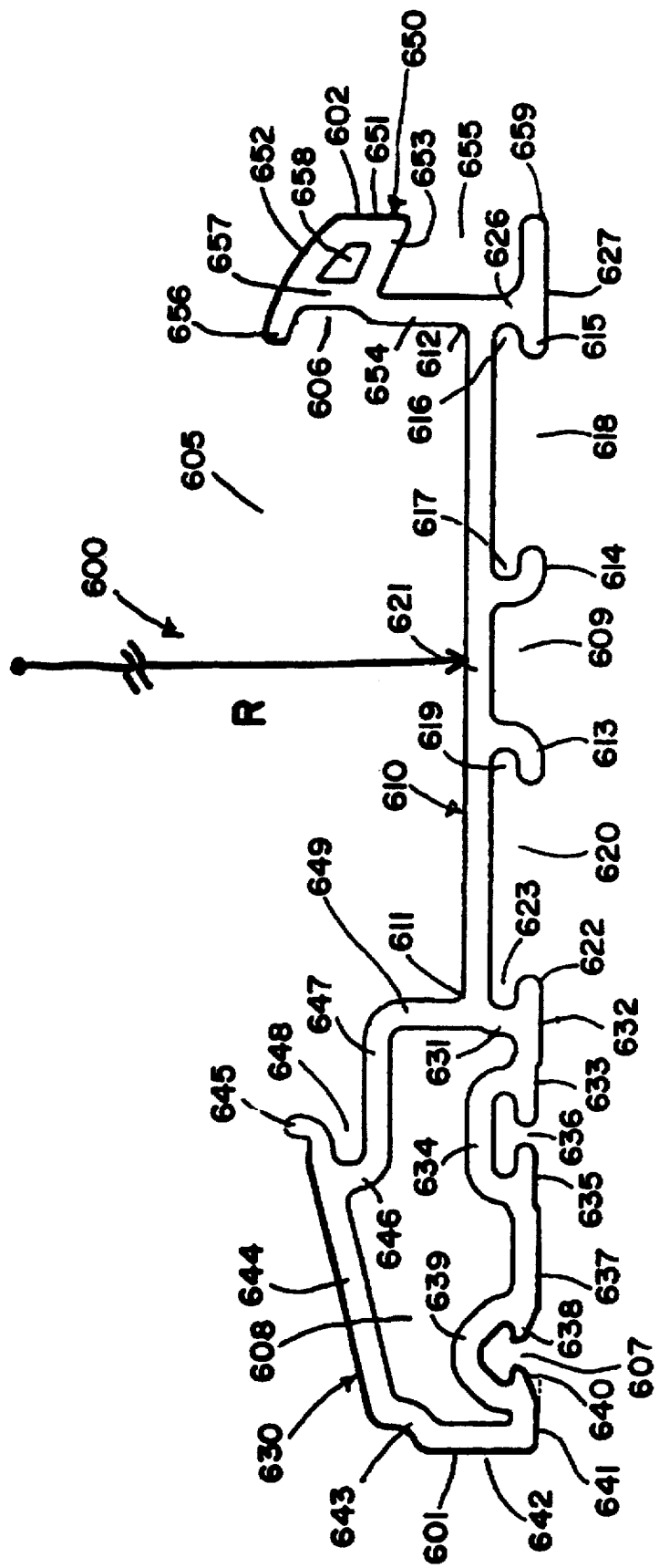
FIG. 39 is a sectioned side view of a preferred embodiment frame constructed according to the principles of the present invention and forming a part of the window out—window in and new construction window assemblies shown in FIGS. 3b and 4b, 5b and 6b, 7-8, 11-14, 17-20, and 23-26.

The second additional profile (associated with the WOWI window 80) is present on the left and right frame members 600a–b and the upper frame member 600c and is described with reference to FIG. 39. The profile of the frame members 600a–c extends from an outermost end 601 to an innermost end 602, and generally includes a base portion 610, an external trim portion 630, and an internal trim portion 650.

The base portion 610 includes a main segment 621 that extends from an outermost end 611 to an innermost end 612. A first arcuate segment 614 extends generally perpendicular away from an intermediate portion of the main segment 621 and curves inward (toward the interior trim portion 650). The first arcuate segment 614 cooperates with the main segment 621 to define an inwardly opening, substantially U-shaped groove 617. In similar fashion, a second arcuate segment 613 extends generally perpendicular away from the main segment 621 and curves outward (toward the exterior trim portion 630). The second arcuate segment 613 cooperates with the main segment 621 to define an outwardly opening, substantially U-shaped groove 619. Also, both of the arcuate segments 613 and 614 combine with the main segment 621 to define a generally U-shaped channel therebetween.

The innermost end 612 of the main segment 621 integrally joins a leg 626 that extends perpendicular thereto and in the same general direction as the arcuate segments 613 and 614. An opposite end of the leg 626 integrally joins a foot 627 that is co-planar with distal portions of the arcuate segments 613 and 614. The foot 627 extends in opposite directions from the leg 626, terminating in a first, relatively inward distal end 659, and a second, relatively outward distal end 615. The outward distal end 615 cooperates with the leg 626 and a portion of the main segment 621 to define another outwardly opening, substantially U-shaped groove 616 which is similar in size and shape to and opens toward the inwardly facing groove 617. In other words, the foot 627, the leg 626, the main segment 621, and the first arcuate segment 614 cooperate to define a relatively shallow channel 618 having a generally T-shaped profile.

The exterior trim portion 630 includes a curved leg 631 connected to the outermost end 611 of the main segment 621 and extending in the same general direction as the first arcuate segment 614. The curved leg 631 terminates in a second foot 632 having a relatively inward, distal end 622 and an opposite, relatively outward end. The inward distal end 622 cooperates with the curved leg 631 and the main segment 621 to define another inwardly opening, substantially U-shaped groove 623 which is similar in size and shape to and opens toward the outwardly facing groove 619. In other words, the foot 632, the curved leg 631, the main segment 621, and the second arcuate segment 613 cooperate to define a relatively shallow channel 620 having a generally T-shaped profile.

The opposite end of the foot 632 integrally joins a first slightly nested segment 633 which extends parallel thereto. A generally C-shaped segment 634 extends generally perpendicular away from an intermediate portion of the nested segment 633, in a direction generally opposite the first arcuate member 614, and curves outward. An opposite end of the C-shaped segment 634 integrally joins a second slightly nested segment 635 which is co-planar with the first nested segment 633. The second nested segment 635 extends in opposite directions from its juncture with the C-shaped segment 634 and generally perpendicular thereto. A relatively inward end of the second nested segment 635, the relatively outward end of the first nested segment 633, and the C-shaped member 634 cooperate to define a relatively shallow slot 636 having a substantially T-shaped profile and opening in the same direction as the channels 618 and 620.

An opposite, relatively outward end of the second nested segment 635 integrally joins a third foot 637 which is co-planar with the second foot 632. The third foot 637 extends outward to a tapered end 638. A substantially U-shaped segment 639 extends generally perpendicular away from the third foot 637, just inward from the tapered end 638 and in the same general direction as the C-shaped member 634, and curves outward. An opposite end of the U-shaped segment 639 integrally joins a fourth, outermost foot 641 which is co-planar with the other feet 637, 632, and 627. A tapered end 640 of the foot 641 extends inward from the juncture between the foot 641 and the U-shaped segment 639. The tapered ends 638 and 640 and the U-shaped segment 639 cooperate to define a relatively shallow slot 607 having a substantially mushroom-shaped profile and opening in the same direction as the T-shaped slot 636.

An opposite, relatively outward end of the foot 641 integrally joins an outermost segment 642 which extends perpendicular thereto and in a direction generally opposite that of the curved leg 631. An opposite end of the outermost segment 642 integrally joins an outwardly concave corner segment 643 which in turn, integrally joins an angled segment 644. The outermost segment 642 and the angled segment 644 define an angle therebetween which is greater than ninety degrees and less than one hundred and twenty degrees.

A relatively inward, distal end 645 of the angled segment 644 is generally L-shaped and includes a first portion extending generally parallel to the main segment 621 and a second, distal portion extending generally perpendicular and away from the main segment 621. A curved segment 646 extends away from the angled segment 644, just outward from its juncture with the L-shaped end 645, and toward the main segment 621. An opposite end of the curved segment 646 integrally joins a plateau segment 647 which extends parallel to the main segment 621 generally adjacent the C-shaped segment 634 and the foot 632. The plateau segment 647, the curved segment 646, and the L-shaped end 645 cooperate to form a generally J-shaped configuration that borders a receiving channel 648.

An offset or shoulder segment 649 extends perpendicular between a relatively inward end of the plateau segment 647 and the outward end 611 of the main segment 621. The juncture between the shoulder segment 649 and the plateau segment 647 may be described as a rounded corner. The juncture between the shoulder segment 649 and the main segment 621 generally coincides with the juncture between the main segment 621 and the curved leg 631. The segments 631, 632, 633, 634, 635, 637, 639, 641, 642, 643, 644, 646, 647, and 649 cooperate to form a closed curve about an irregular shaped compartment 608.

The interior trim portion 650 of the frame 600 includes the innermost leg 626 and the foot 627 extending perpendicular thereto. The foot 627 extends between the relatively outward, distal end 615 and a relatively inward, distal end 659. A base wall 654 extends from the main segment 621 in a direction opposite that of the leg 626. The base wall 654 and the leg 626 are co-linear and cooperate to define the base of a channel 655 having a trapezoidal cross-section. An opposite end of the base wall 654 angles inward and integrally joins an angled segment 653 which extends inward and frameward, somewhat toward the foot 627, and thereby defines an acute angle relative to the base wall 654. The angled segment 653 and the foot 627 form the sidewalls of the trapezoidal channel 655 that may be said to have convergently extending sidewalls suitable for receiving an extension jamb or functioning as a sheet rock return. The channel 655 is similar in shape and function to that on the sill jamb 500. Again, this aspect of the present invention is disclosed in the '995 application, which is owned by a common assignee and incorporated herein by reference.

A slightly recessed segment 657 extends from the juncture between the end wall 654 and the angled segment 653, just inward from and parallel to the end wall 654. An opposite end of the recessed segment 657 integrally joins an intermediate portion of a gently curved segment 652 which extends from a relatively inward end to a relatively outward, distal end 656. The recessed segment 657, the distal end 656, and the end wall 654 cooperate to define a relatively shallow, trapezoidal channel 606 that may be said to have divergently extending sidewalls.

An innermost segment 651 extends between the inward end of the curved segment 652 and the inward end of the angled segment 653. The innermost segment 651 extends parallel to and is approximately as long as the recessed segment 657. The segments 651, 653, 657, and 652 cooperate to form a closed curve about a generally trapezoidal shaped compartment 658.

The third additional profile (associated with the WOWI type double hung window) is present on outside trim members or brick molding 570a–c and is described with reference to FIG. 40. The profile of the outside trim members 570a–c is generally trapezoidal. An innermost segment 571 extends from a first, distal end 572 to a second, opposite end which integrally joins a frameward segment 577 extending perpendicular thereto. A contoured segment 582 extends non-linearly and at an angle from an opposite, relatively outward end of the frameward segment 577 to a frameward end of an outermost segment 583. The outermost segment 583 is relatively short and extends parallel to the innermost segment 571. An opposite end of the outermost segment 583 integrally joins a remote segment 584 which extends parallel to the frameward segment 577 and integrally joins the innermost segment 571 just frameward of its distal end 572. The segments 571, 577, 582, 583, and 584 cooperate to form a closed curve about a compartment 588.

A first strip 574 extends inward from the corner formed by the innermost segment 571 and the frameward segment 577, perpendicular to the innermost segment 571. A slight offset, designated as 573, exists between the first strip 574 and the frameward segment 577. A second strip 575 extends frameward from an opposite end of the first strip 574, generally perpendicular thereto. A third strip 576 extends inward from an opposite end of the second strip 575, generally perpendicular thereto and thus, generally parallel to the first strip 574.

A finger 581 extends generally frameward and outward from the frameward segment 577, nearer the contoured segment 582 than the innermost segment 571. A distal end of the finger 581 is approximately co-planar with the third strip 576. Generally opposite the finger 581, a substantially C-shaped groove 587 is formed by arcuate members 585 and 586 extending frameward from the remote segment 584, into the compartment 588 and toward one another.

Assembly of Double Hung WOWI Window

Assembly of the double hung WOWI window 80 is similar in many respects to assembly of the double hung pocket window 70, which was described above. However, the jambs 200a–c are snapped into respective frames 600a–c prior to cutting or welding thereof, so that each mating jamb and frame will be cut to a common, identical length. In particular, each jamb 200a–c is positioned relative to a respective frame 600a–c in such a manner that the relatively inward, distal end 645 inserts into the groove 230. Each jamb is then rotated so that the inwardly facing wall 202 bears upon the distal end segment 656 as the first outwardly extending segment 231 rotates into alignment with the receiving channel 648. The base portion 610 and/or the base wall 654 resiliently deflect to allow relatively inward movement of the distal end segment 656, which in turn, allows passage of the inwardly facing wall 202. Once the distal end 209 clears the distal end segment 656, the resilience of the base segment 610 and/or the base wall 654 snaps the distal end segment 656 over the distal end 209, the distal ends 645 and 236 overlap, and the walls 649 and 654 on the frame engage the inwardly facing and outwardly facing walls 202 and 201 on the jamb, respectively, thereby capturing the jamb within the frame. The base portion 610 is pre-formed to be concavely bowed relative to the respective jamb 200a–c (see radius of curvature R in FIG. 39) to ensure a reliable snap fit.

Due to the existence of the sill jamb 500, as opposed to the pocket sill 100, all of the jambs may be welded together to form the frame about the sashes.

Installation of Double Hung WOWI Window

Installation of the WOWI window 80 varies somewhat from that of the pocket window 70. In WOWI installation, the existing window, including the frame and molding, is typically removed from a wall leaving a rough opening 1902 in a wall 1910 as shown in FIGS. 3a and 4a. The rough opening 1902 is bounded by structural members, in this case "2×4" boards approximately three and one-half inches wide and one and one-half inches thick. Boards 1911a and 1911b form a head jamb; boards 1912a and 1912b form a side jamb; boards 1913a and 1913b form a sill jamb; and boards 1914a and 1914b form an opposite side jamb. The exterior of the wall 1910 is covered by a first sheet of material 1915, such as fiber board, which in turn is covered by a finish material 1916, such as wood siding. The interior of the wall 1910 is covered by an interior sheet of material 1917, such as sheet rock, which in turn is covered by a finish material 1918, such as paint.

The brick molding members 570a–c are snapped into place on respective frames 600a–c, and the window 80 is positioned within the rough opening 1902 in such a manner that the inwardly facing segments 531 and 571 on the sill 500 and the molding members 570a–c, respectively, engage the sheet material 1915. The window 80 is then secured in place by means of screws similar to those described with reference to the pocket window 70. In other words, screws are driven through the side jamb covers 270a and 270b, side jambs 200a and 200b, and frame members 600a and 600b, and into the side jambs 1912a and 1914a. Additional screws may be threaded through the head cover 170, the head jamb 200c, and the frame 600c, and into the head jamb 1711. These screws are directed through the main segment 271 and just outside the outward wall 252 on the head jamb 200c.

Caulk 909 is disposed in slots defined between the trim members 570a–c and the exterior sheet of material 1916, and between the exterior sheet of material 1916 and the first lower segment 532 on the sill. Extension jambs 861a–d are secured in channels 555 on frame members 600a–c and the sill member 500, respectively. The extension jambs 861a–d are notched to accommodate the distal end 512 of the foot 527 and the distal ends 659 of the feet 627 on the sill jamb 500 and the frame members 600a–c, respectively. Interior molding pieces 860a–c are secured across respective portions of the extension jambs 861a–c and the sheet material 918 to finish off the installed unit.

Double Hung Window for New Construction

Figure 5B:
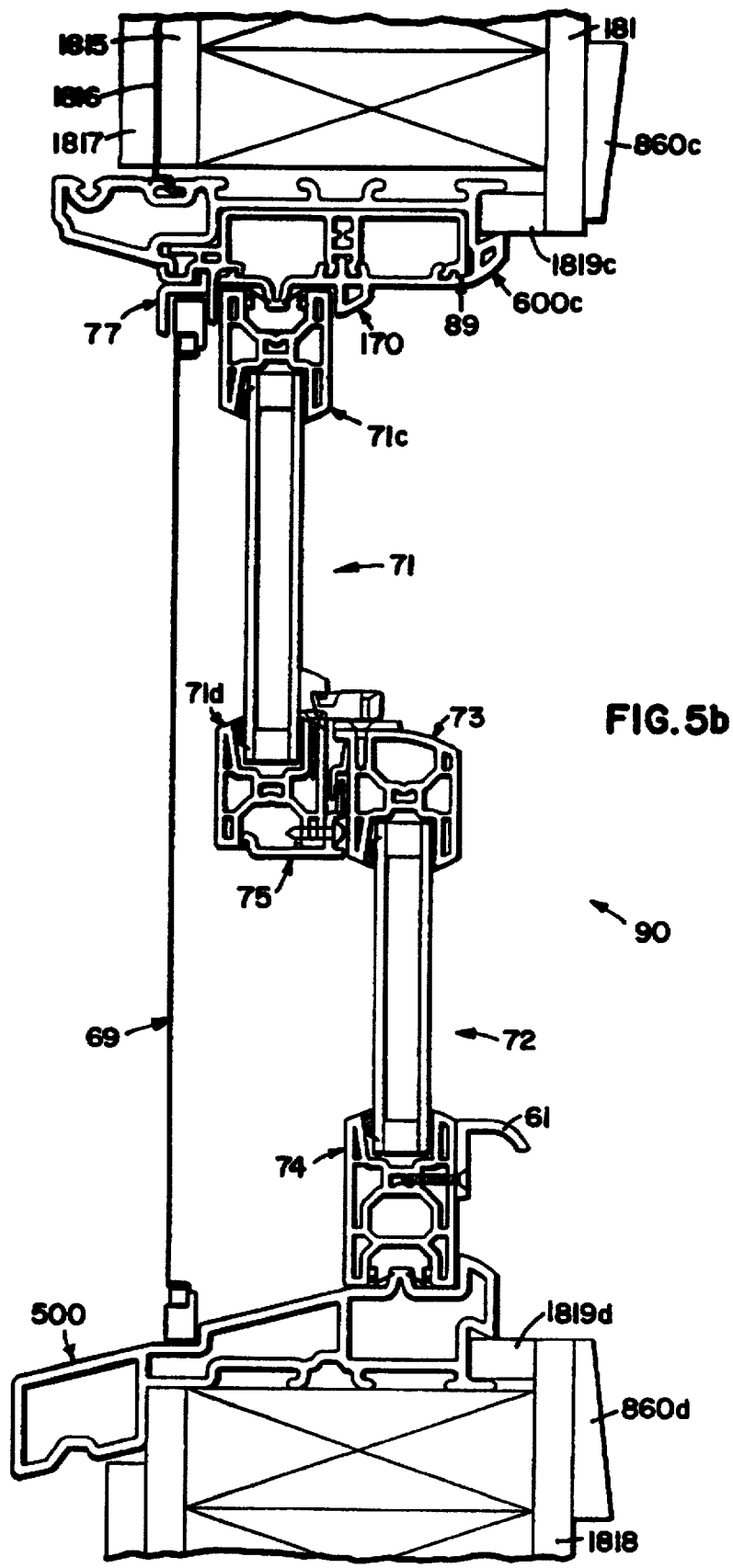
Figure 6B:
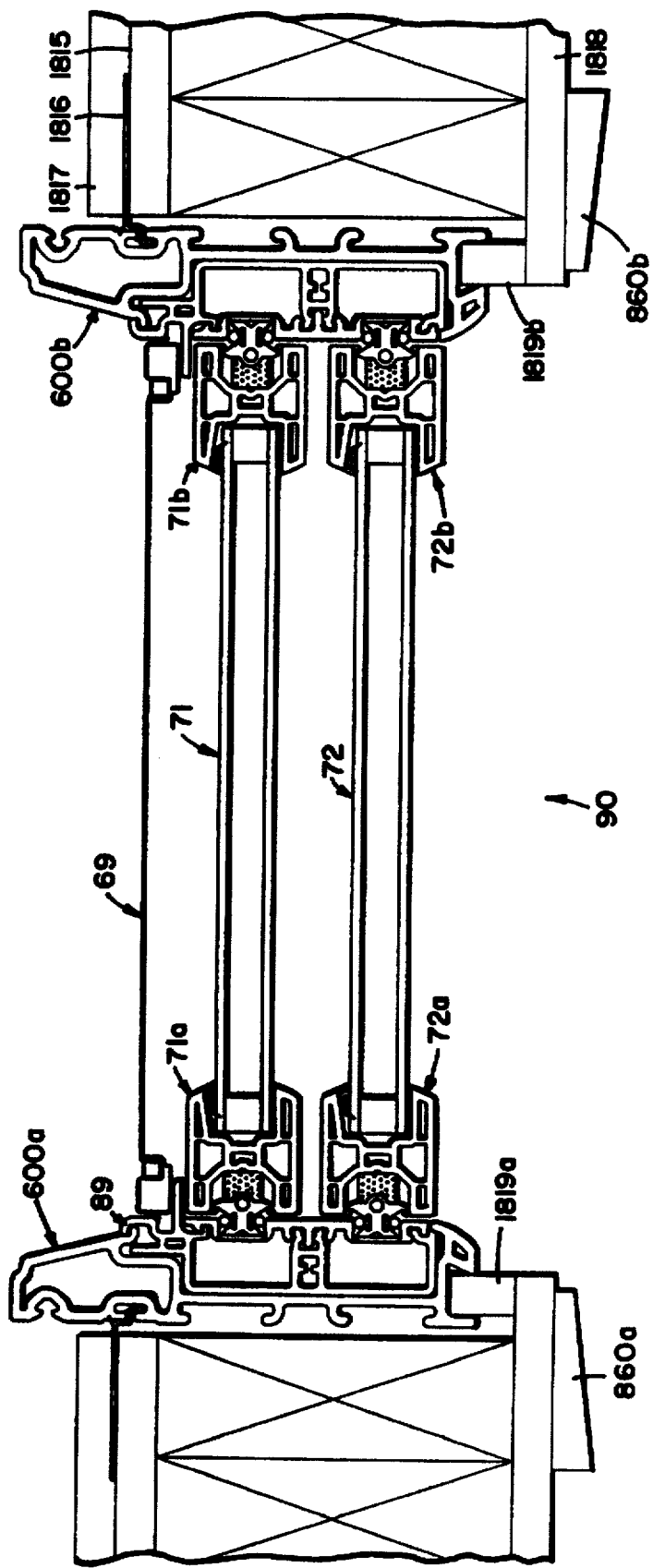

A preferred embodiment double-hung window unit constructed according to the principles of the present invention, and designed for new construction installation, is designated as 90 in FIGS. 5b and 6b. As evidenced by the common reference numerals, the window 90 is functionally similar to the WOWI window 80 shown in and described with reference to FIGS. 3b and 4b.

The fully installed window 90 does not require extruded components having any profiles in addition to those already discussed above with reference to the double hung window 70 suitable for pocket replacement and the double hung window 80 suitable for window out—window in replacement.

Assembly/Installation of Double Hung "New Construction" Window

Assembly of the "new construction" double hung window 90 is identical to that of the "window out—window in" double hung window 80. However, installation varies somewhat and is described below.

A wall 1810 is built to have a rough opening 1802 bounded by structural members, in this case "2×6" boards approximately five and one-half inches wide and one and one-half inches thick. More specifically, boards 1811a and 1811b form a head jamb; boards 1812a and 1812b form a side jamb; boards 1813a and 1813b form a sill jamb; and boards 1814a and 1814b form an opposite side jamb. The exterior of the wall 1810 is covered by a first sheet of material 1815, such as fiber board. The interior of the wall 1810 is covered by an interior sheet of material 1817, such as sheet rock.

Nailing flanges 1816 are snapped into place on respective frames 600a–c and arranged to extend outward from the frame members 600a–c and lie substantially flush against the first exterior sheet 1815. An example of suitable nailing flanges 891–894, is shown and described in U.S. Pat. No. 4,958,469 to Plummer, which is owned by a common assignee and incorporated herein by reference. With the window 90 positioned within the rough opening 1802 in such a manner that the nailing flanges 1816 and the inwardly facing segment 531 on the sill 500 engage the sheet material 1815, nails or other fasteners are used to secure the nailing flanges 1816 to the first exterior sheet 1815. A second exterior sheet 1817, such as wood siding, is then placed over the nailing flanges 1816 and the first exterior sheet 815. The nailing flanges 1816 span and thereby seal any gap between the jambs 200a–c and the wall 1810. Caulk 909 is disposed between the second exterior sheet 817 and the first lower segment 532 on the sill 500.

The window 90 may be further secured in place by means of screws similar to those described with reference to the WOWI window 80. In other words, screws are driven through the side jamb covers 270a and 270b, side jambs 200a and 200b, and frames 600a and 600b, and into the side jambs 1912a and 1914a. Additional screws may be threaded through the head cover 170, the head jamb 200c, and the frame 600c, and into the head jamb 1711. These screws are directed through the main segment 271 and just outside the outward wall 252 on the head jamb 200c.

As an alternative to the extension jambs 861a–d on the WOWI window 80, sheet rock returns 1819a–d are used in connection with the installed new construction window 90. The interior sheet rock 1818 extends across the width of the returns 1819a–d, and interior trim members 860a–d finish off the installed unit. A fourth trim member 860d is needed in the absence of the protruding stool 861d which was present on the WOWI window 80.

Alternative Embodiment Double Hung Window

Figure 7:
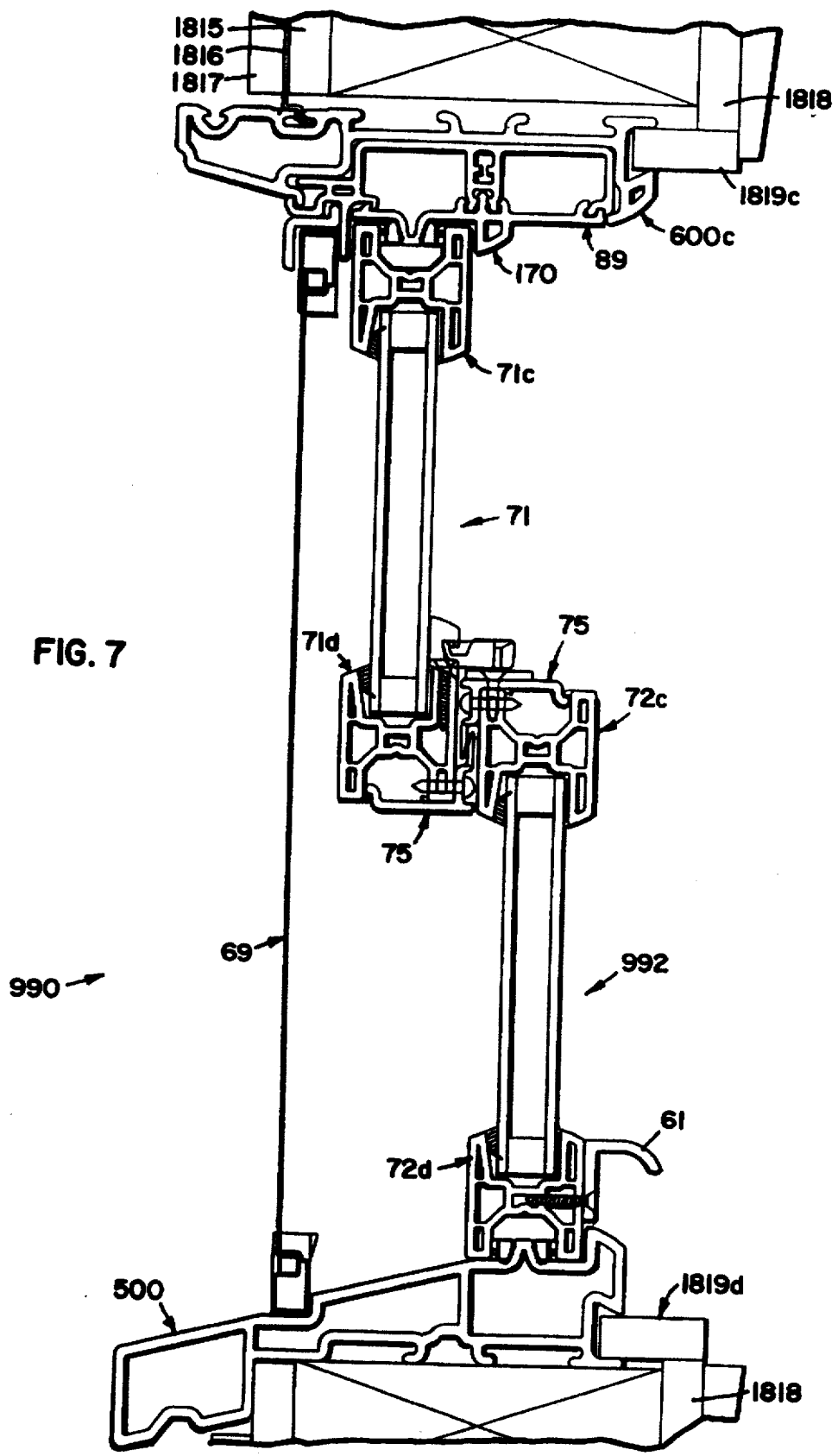
Figure 8:
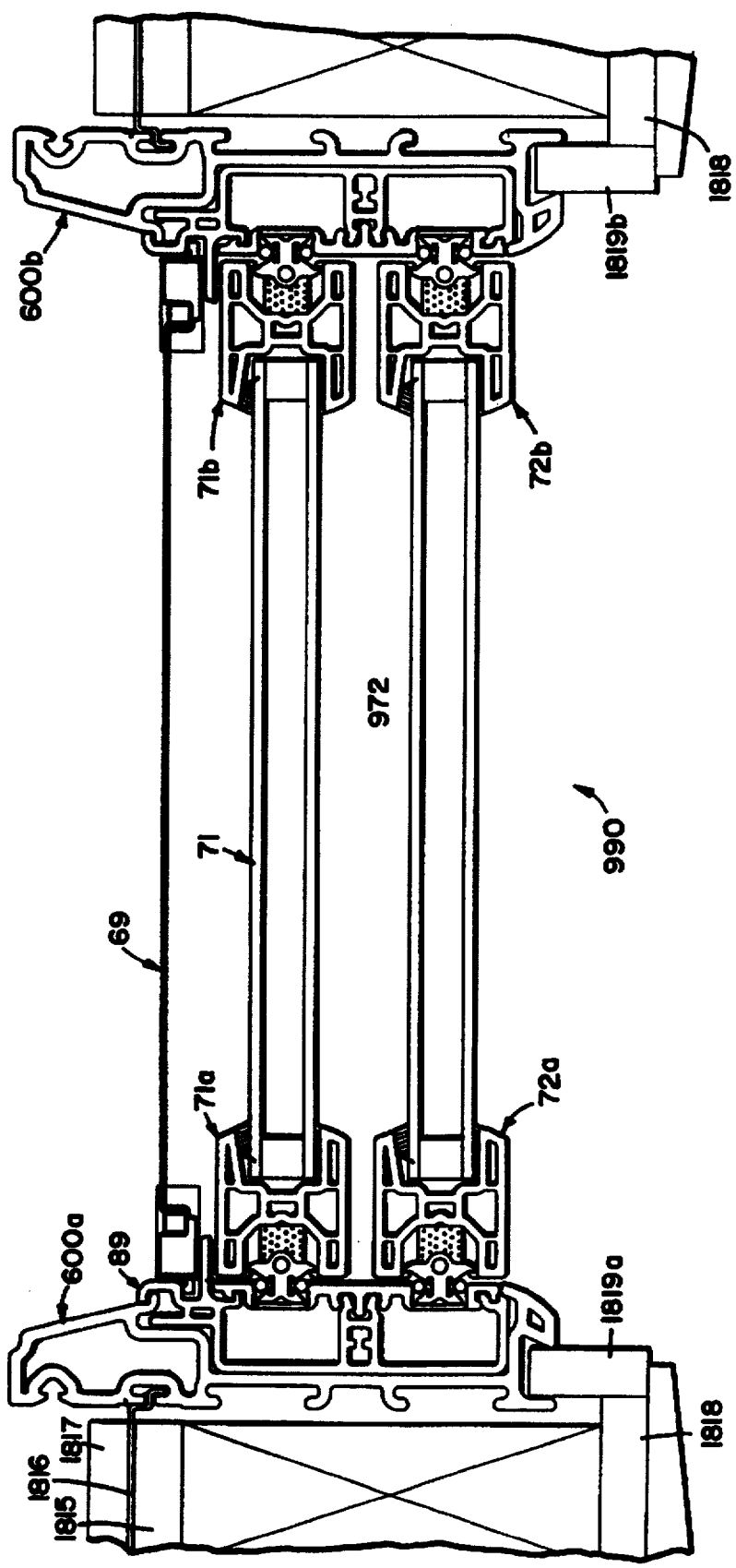

An alternative embodiment double hung window, suitable for new construction installation, is designated as 990 in FIGS. 7–8. As evidenced by the common reference numerals, the window 990 is functionally similar to the new construction window 90 shown in and described with reference to FIGS. 5b and 6b.

The fully assembled and installed window 990 does not require extruded components having any profiles in addition to those already discussed above with reference to the preferred embodiment double hung window 90 suitable for new construction installation. The differences in the alternative embodiment window 990 reside in the check rail 72c and the bottom rail 72d on the lower sash 992 and the interlock 75 associated with the check rail 72c. In particular, the lower check rail 72c and the bottom rail 72d have the same profile as that of the other sash members 72a–b and 71a–d, thereby giving the alternative embodiment window 990 a more contemporary look and requiring three fewer extrusion profiles than the preferred embodiment window 90.

The alternative embodiment window 990 is assembled in much the same manner as the preferred embodiment window 90, except that the sash corners can now be mitered, not only structurally but also in appearance. The alternative embodiment window 990 is installed just like the preferred embodiment window 90. Those skilled in the art will also recognize that these "contemporizing" modifications of the check rail and bottom rail, which are relatively more efficient from a manufacturing perspective, can be applied to the pocket and WOWI windows, as well. In other words, the lower sash 972 on the alternative embodiment 990 can be substituted for the lower sash 72 on either of the preferred embodiment windows 70 or 80.

Casement Window for Pocket Replacement

Figure 9:
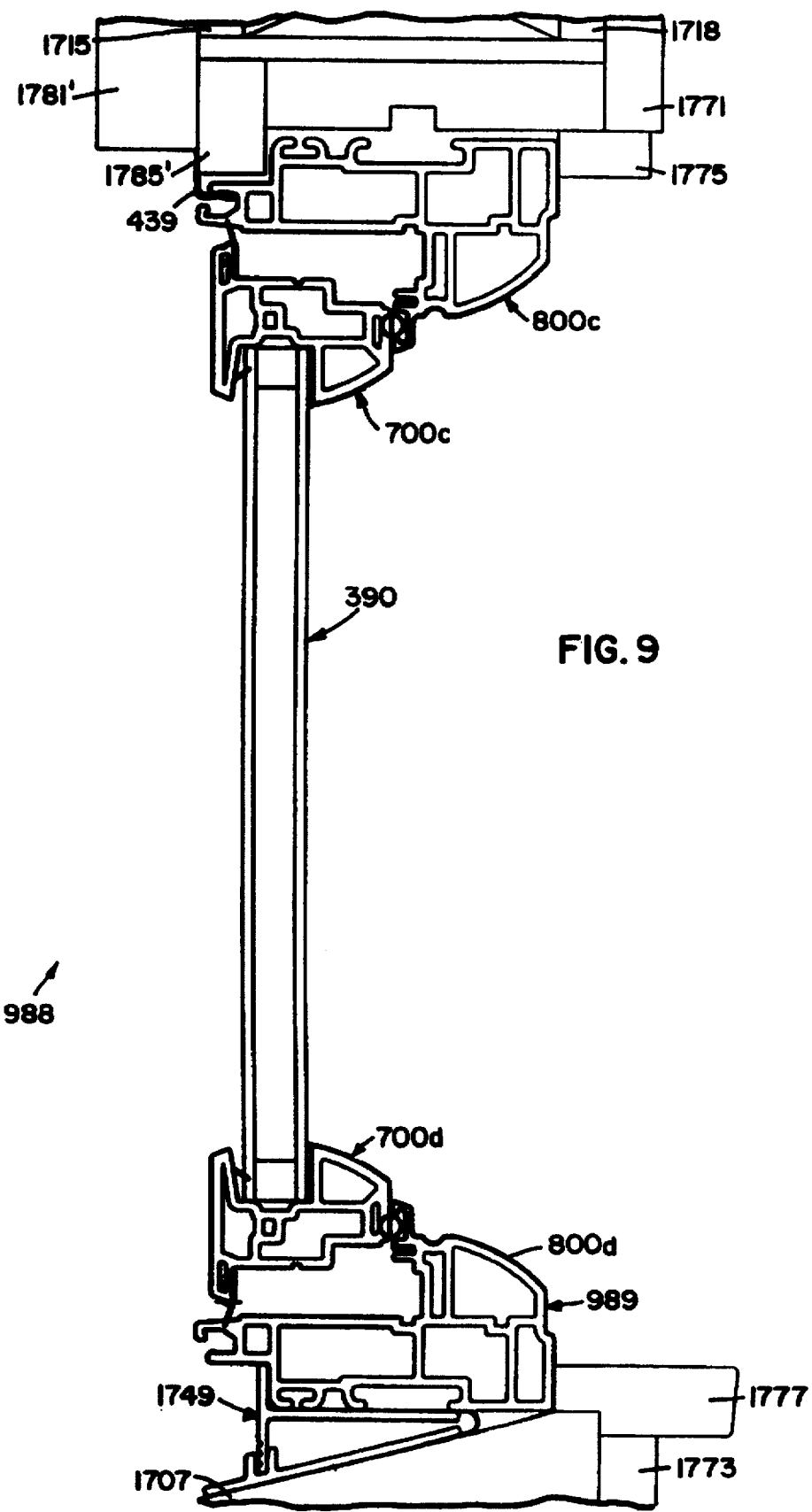
Figure 10:
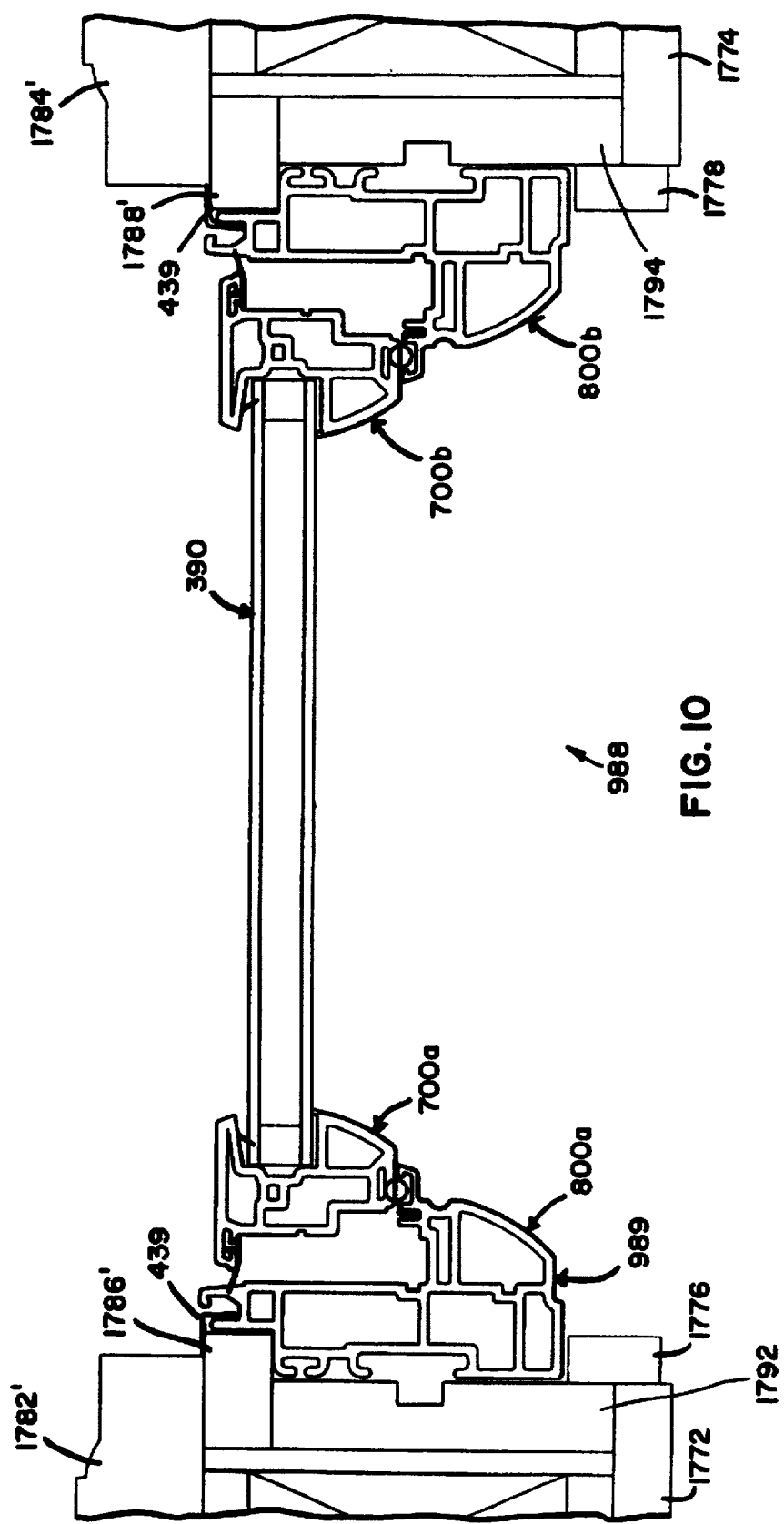

A preferred embodiment casement window unit constructed according to the principles of the present invention, and designed for pocket replacement installation, is designated as 988 in FIGS. 9-10. The window 988 generally includes a sash (comprising members 700a–d) pivotally mounted within a jamb or frame 989 (comprising members 800a–d). The configuration of the sash and the operation thereof relative to the frame are described in U.S. patent application Ser. No. 08/490,222 to Plummer filed contemporaneously herewith, which is owned by a common assignee and incorporated herein by reference.

Figure 41:
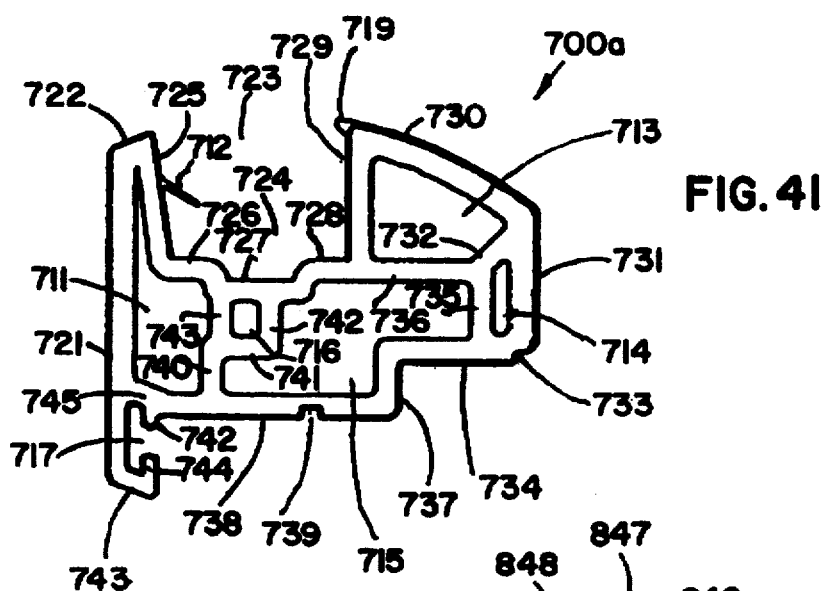
FIG. 41 is a sectioned side view of a preferred embodiment casement sash rail constructed according to the principles of the present invention and forming a part of the window assemblies shown in FIGS. 9-14.

The fully assembled and installed window 988 requires extruded components having three distinct profiles in addition to the fifteen profiles discussed above with reference to the three types of double hung windows 70, 80, and 90. A first of these additional profiles is present on all four of the sash rails 700a–d and is described with reference to FIG. 41. The profile 700a includes an outermost segment 721, an innermost segment 731, and glass supporting structure integrally connected therebetween.

The outermost segment 721 extends from a first end, relatively nearer the window frame 989, to a second, opposite end, relatively nearer the glass panel 390. A relatively short, angled segment 722 interconnects the second end of the outermost segment 721 and a remote end of a first channel sidewall 725 which extends frameward from this juncture, almost parallel to the outermost segment 721. An opposite end of the first channel sidewall 725 integrally joins a first shoulder portion 726 which extends inward and perpendicular to the outermost segment 721. An opposite, relatively inward end of the first shoulder portion 726 integrally joins a base portion 727 which is offset to the frameward side of the first shoulder portion 726 and extends inward, parallel thereto. An opposite, relatively inward end of the base portion 727 integrally joins a second shoulder portion 728 which is a mirror image of the first shoulder portion 726 relative to a mirror line extending perpendicular through a midpoint of the base portion 727. In other words, the second shoulder portion 728 is offset to the glass panel side of the base portion 727 and extends parallel thereto. The shoulder portions 726 and 728 and the base portion 727 cooperate to define a relatively shallow U-shaped channel 724.

An opposite, relatively inward end of the second shoulder portion 728 integrally joins a second channel sidewall 729 which extends toward the glass panel 390 and perpendicular to the second shoulder portion 728. The channel sidewalls 725 and 729 and the relatively shallow U-shaped channel 724 cooperate to define a relatively deeper and wider U-shaped channel 723. The relatively outward sidewall 725 functions to retain the exterior face 395 of the glass panel 390, and the relatively inward sidewall 726 functions to retain the interior face 396 of the glass panel 390. The width of the channel 723 is defined by the distance between the sidewalls 725 and 726, which are spaced sufficiently far apart to receive the glass panel 390. A weatherstrip 712 projects from the relatively outward sidewall 725 into the channel 723, and a tab 719 projects from a remote end of the relatively inward sidewall 729 into the channel 723.

The width of the channel 724, as defined between the shoulder portions 726 and 728, is less than the thickness of the glass panel 390. Rubber spacers are interspersed along the channel 723 and span the nested channel 724 and support peripheral edges of the glass panel 390. The glass panel 390 spans the relatively smaller U-shaped channel 724 and cooperates therewith to define a condensation cavity 335.

The remote end of the second channel sidewall 729 integrally joins an outwardly convex segment 730 which extends inward, generally perpendicular thereto, and curves frameward. An opposite, relatively inward end of the convex segment 730 integrally joins an end of the innermost segment 731. A first interior segment 732 extends from the juncture between the convex segment 730 and the innermost segment 731, generally perpendicular to the relatively inward end of the convex segment 730. An opposite, relatively frameward end of the first interior segment 732 integrally joins a second interior segment 736 which extends co-linearly with the second shoulder segment 728 and integrally joins the juncture between the second shoulder segment and the second channel sidewall 729. The second interior segment 736, the first interior segment 732, the convex segment 730, and the second channel sidewall 729 cooperate to form a closed curve about a first, generally wedge-shaped compartment 713.

A third interior segment 735 frameward from the juncture between the first interior segment 732 and the second interior segment 736, perpendicular to the latter. An opposite, relatively frameward end of the third interior segment 735 integrally joins a stepped segment 734 which extends perpendicular thereto in opposite directions. An outwardly concave corner segment 733 integrally joins a relatively inward end of the stepped segment 734 and relatively frameward end of the innermost segment 731 at right angles to one another. The corner segment 733, the stepped segment 734, the third interior segment 735, the second interior segment 732 and the innermost segment 731 cooperate to form a closed curve about a second, relatively narrow compartment 714.

An opposite, relatively outward end of the stepped segment 734 integrally joins an intermediate segment 737 which extends frameward, perpendicular to the stepped segment 734. An opposite, relatively frameward end of the intermediate segment 737 integrally joins a frameward segment 738 which extends outward, perpendicular to the intermediate segment 737. A square notch 739 is formed in a frameward side of an intermediate portion of the frameward segment 738. An opposite, relatively outward end of the frameward segment 738 integrally joins a first angled segment 745 which extends outward, generally parallel to the convex segment 730. An opposite, relatively outward end of the first angled segment 745 integrally joins the outermost segment 721, somewhat nearer the frameward end thereof.

A nub 742 extends frameward from the juncture between the frameward segment 738 and the first angled segment 745. A second angled segment 743 extends inward and frameward from the relatively frameward end of the outermost segment 721, generally parallel to the first angled segment 745. A distal segment 744 extends from an opposite, relatively inward end of the second angled segment 745, co-linear with and toward the nub 742. The distal segment 744, the second angled segment 743, the outermost segment 721, the first angled segment 745, and the nub 742 cooperate to define a slot 717 having a substantially T-shaped profile.

A fourth interior segment 740 extends from the frameward segment 738, proximate its relatively outward end and perpendicular thereto, toward the glass panel 390. An opposite end of the fourth interior segment 740 integrally joins an outward and frameward corner of a third, generally square compartment 716. A fifth interior segment 741 extends inward from the end of the fourth interior segment 740 and perpendicular thereto. A sixth interior segment 742 extends from an opposite, relatively inward end of the fifth interior segment 741, perpendicular thereto, and integrally joins the base segment 727. The relatively outward end of the base segment 727 integrally joins a seventh interior segment 743 which extends frameward, perpendicular thereto, and integrally joins the juncture between the fourth interior segment 740 and the fifth interior segment 741.

Figure 42:
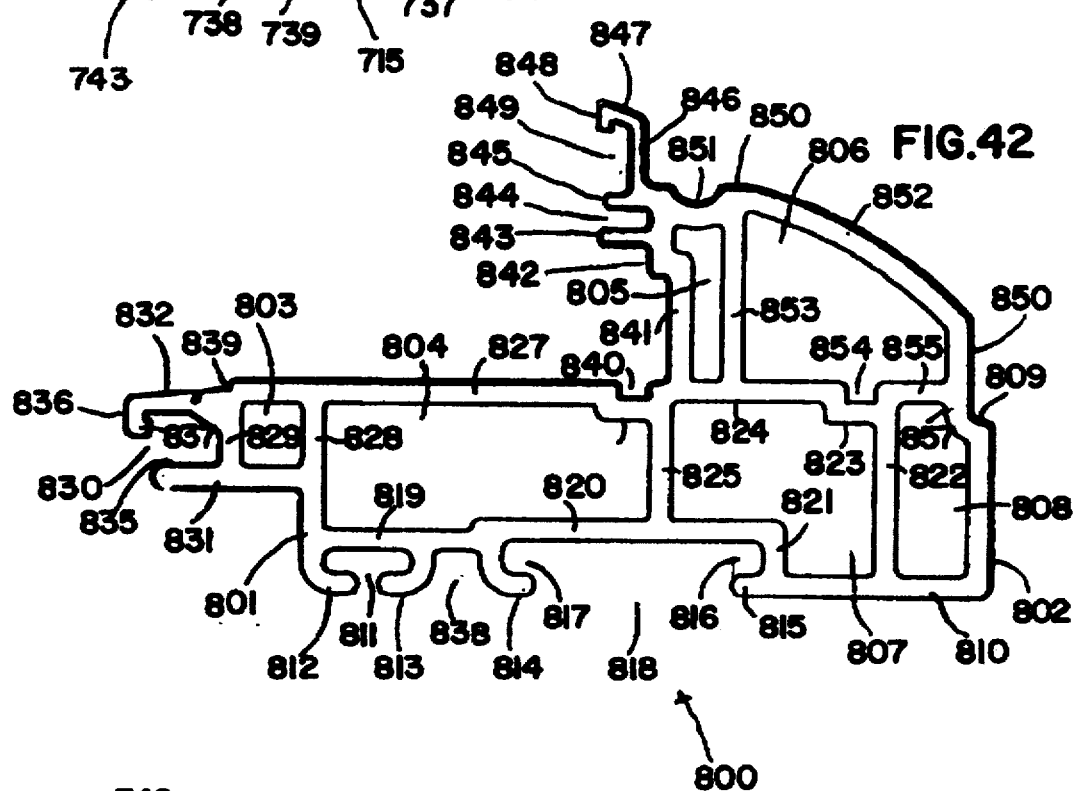
FIG. 42 is a sectioned side view of a preferred embodiment casement jamb constructed according to the principles of the present invention and forming a part of the window assemblies shown in FIGS. 9-14.
Figure 43:
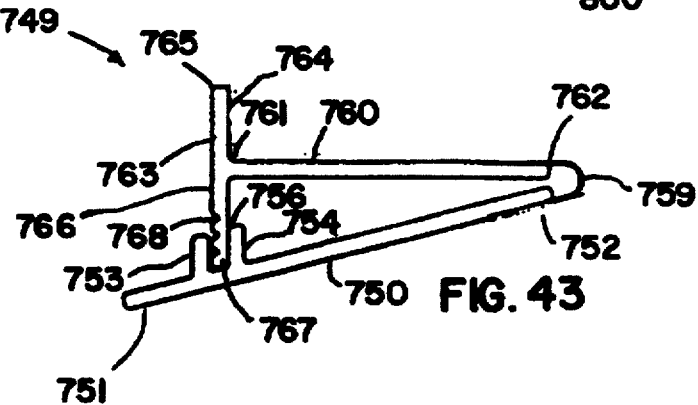
FIG. 43 is a sectioned side view (on a different scale relative to FIGS. 41-42) of a preferred embodiment sill angle constructed according to the principles of the present invention and forming a part of the pocket replacement window assemblies shown in FIGS. 9-10, 15-16, and 21-22.

The fifth interior segment 741, the sixth interior segment 742, the base segment 727, and the seventh interior segment 743 cooperate to form a closed curve about the square compartment 716. Also, the fourth interior segment 740, the fifth interior segment 741, the sixth interior segment 742, the base segment 727, the second shoulder segment 728, the third interior segment 736, the second interior segment 735, the stepped segment 734, the intermediate segment 737, and the frameward segment 738 cooperate to form a closed curve about a fourth compartment 715 having a generally Z-shaped profile. Additionally, the fourth interior segment 740, the seventh interior segment 743, the first shoulder segment 726, the first channel sidewall 725, the angled segment 722, the outermost segment 721, the first angled segment 745, and the frameward segment 738 cooperate to form a closed curve about a fifth compartment 711 having a profile that may be seen as similar in some respects to that of a closed fist and pointing forefinger. The second additional profile (associated with the preferred embodiment pocket replacement type of casement window 988) is present on the casement jamb 800 and is described with reference to FIG. 42. The profile of the casement jamb 800 includes an outwardly facing segment 801, an inwardly facing segment 802, and interconnecting structure integrally interconnected therebetween. An end of the inwardly facing segment 802 is integrally joined to an outwardly concave corner segment 857 which extends outward therefrom and curves into an offset segment 856. The inwardly facing segment 802 is slightly inward from the offset segment 856 and extends parallel thereto. The offset segment 856 and the corner segment 857 cooperate to provide an inwardly accessible shoulder 809 at the end on the inwardly facing segment 802.

An opposite end of the offset segment 856 integrally joins an outwardly convex segment 852 having curvature similar to that of the outwardly convex segment 730 on the sash rail 701a. An opposite end of the outwardly convex segment 852 integrally joins an end of a first interior segment 853 which extends frameward, generally parallel to the offset segment 856. An opposite, relatively frameward end of the first interior segment 853 integrally joins a second interior segment 824 which extends in opposite directions, perpendicular thereto. A relatively inward end of the second interior segment 824 integrally joins a relatively outward end of a third interior segment 823, which may be described as substantially U-shaped and extends frameward. An opposite, relatively inward end of the third interior segment 823 integrally joins a relatively outward end of a fourth interior segment 855, which is co-linear with the second interior segment 824. An opposite, relatively inward end of the fourth interior segment 855 integrally joins the offset segment 856 just beyond its juncture with the corner segment 857. Thus, the offset segment 856 extends parallel to the relatively longer, first interior segment 853. The U-shaped third interior segment 854 effectively defines a notch 854 in the extended segment formed by the fourth interior segment 855 and the second interior segment 824. The first interior segment 853, the second interior segment 824, the third interior segment 823, the fourth interior segment 855, the offset segment 856, and the outwardly convex segment 852 cooperate to form a closed curve about a first compartment that may be described as generally wedge-shaped.

A fifth interior segment 822 extends frameward from the relatively inward end of the U-shaped segment 823, parallel to the inwardly facing segment 802. An opposite, relatively frameward end of the fifth interior segment 822 integrally joins a base segment 810 which extends in opposite directions, perpendicular thereto. A relatively inward end of the base segment 810 integrally joins a relatively frameward end of the inwardly facing segment 802 and defines a square corner therewith. The base segment 810, the inwardly facing segment 802, the corner segment 857, the fourth interior segment 855, the third interior segment 823, and the fifth interior segment 822 cooperate to form a closed curve about a second compartment 808 that may be said to be substantially rectangular.

The base segment 810 extends outward to a distal end 815, proximate which a leg 821 extends from the base segment 810 and toward the first interior segment 824. An opposite end of the leg 821 integrally joins a relatively inward end of a intermediate segment 820 which extends perpendicular thereto. The base segment 810 is frameward from the intermediate segment 820 and extends parallel thereto. The relatively outward, distal end 815 of the base segment 810, the leg 821, and the intermediate segment 820 cooperate to define a first, generally U-shaped channel that opens outward. A first arcuate segment 814 extends frameward from a relatively outward end of the intermediate segment 820, generally perpendicular thereto, and curves inward and aligns with the base segment 810. The first arcuate segment 814 and the intermediate segment 820 cooperate to define a second, generally U-shaped channel that opens inward. In other words, the first arcuate segment 814, the intermediate segment 820, the leg 821, and the distal end 815 of the base segment 810 cooperate to define a relatively wide T-shaped channel 818.

A relatively inward end of a nested segment 819 integrally joins an outward end of the intermediate segment 820. The nested segment 819 is slightly frameward of the intermediate segment 820 and extends parallel thereto. The nested segment 819 extends outward and integrally joins the outwardly facing segment 801 which extends perpendicular thereto. A second arcuate segment 812 extends frameward from the juncture between a frameward end of the outwardly facing segment 801 and the outward end of the nested segment 819 and curves inward in much the same manner as the first arcuate segment 814. A third arcuate segment 813 extends frameward from an intermediate portion of the nested segment 819 and curves outward toward the second arcuate segment 812. Distal portions of the arcuate segments 812–814 are co-planar with the base segment 810.

The third arcuate segment 813 is a mirror image of the second arcuate segment 812 and cooperates therewith to define a relatively small channel 811 having a T-shaped profile. The third arcuate segment 813 is also a mirror image of the first arcuate segment 814 and cooperates therewith to define a relatively small channel 839 having a profile that may be described as lamp shade-shaped. Both of the channels 839 and 811 open frameward. The channels 811, 838, and 818 provide structure suitable for mulling and nailing flange interconnections.

An opposite end of the outwardly facing segment 801 integrally joins an inward end of a first outwardly directed segment 831 which extends perpendicular thereto. A connecting segment 829 extends from an intermediate portion of the first outwardly directed segment 831 and perpendicular thereto. An opposite end of the connecting segment 829 integrally joins an inward end of a second outwardly directed segment 832 which extends outward, perpendicular thereto. As a result of additional material in the fillet, this juncture is relatively thicker than the other junctures on the casement frame 800. An opposite, outward end of the second outwardly directed segment 832 integrally joins an outermost segment 836 which extends frameward, perpendicular thereto. An opposite, frameward end of the outermost segment 836 integrally joins a nub 837 which extends inward therefrom. Also, a small tab 835 extends from a distal, outward end of the first outwardly directed segment 801 and generally toward the second outwardly directed segment 832. The tab 835, the first outwardly directed segment 831, the connecting segment 829, the second outwardly directed segment 832, the outermost segment 836, and the nub 837 cooperate to define a channel 830 that is functionally similar to the channel 230 on the double hung window jamb 200.

An outward end of a main segment 827 is integrally connected to and extends inward from the relatively large juncture between the connecting segment 829 and the second outwardly directed segment 832. A outwardly accessible lip 839 is created at the juncture between the main segment 827 and the second outwardly directed segment 832 which is slightly frameward from the main segment 827 and extends substantially parallel thereto. A sixth interior segment 828 extends from an intermediate portion of the main segment 827, relatively nearer the outward end thereof, and integrally joins the outwardly facing segment 801 at its juncture with the first outwardly directed segment 831. The sixth interior segment 828 is co-linear with the outwardly facing segment 801 and cooperates with the first outwardly directed segment 831, the connecting segment 829, and the main segment 827 to form a closed curve about a third compartment 803 that is substantially square in profile.

An opposite, inward end of the main segment 827 integrally joins an outward end of another substantially U-shaped segment 826 which extends frameward. An opposite, inward end of the U-shaped segment 826 integrally joins the second interior segment 824 which is co-linear with the main segment 827. The U-shaped segment 826 provides a substantially U-shaped groove 840 in the extended segment defined by the main segment 827 and the second interior segment 824. A seventh interior segment 825 extends frameward from the juncture between the U-shaped segment 826 and the second interior segment 824, to an intermediate portion of the intermediate segment 820 and perpendicular thereto. The seventh interior segment 825, the intermediate segment 820, the nested segment 819, the outwardly facing segment 801, the sixth interior segment 828, the main segment 827, and the U-shaped segment 826 cooperate to form a closed curve about a fourth compartment 804 which is generally rectangular in profile. Also, the seventh interior segment 825, the intermediate segment 820, the leg 821, the base segment 810, the fifth interior segment 822, the U-shaped segment 823, and the second interior segment 824 cooperate to form a closed curve about a fifth compartment having a generally L-shaped profile.

A countersink segment 841 extends perpendicularly from the second interior segment 824 just inside its juncture with the U-shaped segment 826. An opposite end of the countersink segment 841 integrally joins a frameward end of an interface segment 842 which is slightly outward from and extends parallel to the countersink segment 841. A first finger 843 extends outward from an intermediate portion of the interface segment 842, perpendicular thereto. A second finger 845 extends outward from an opposite end of the interface segment 842, also perpendicular thereto. The fingers 843 and 845 cooperate with the interface segment 842 to define a relatively narrow U-shaped channel 844 which opens outward.

A relatively short segment 850 extends inward from the juncture between the interface segment 842 and the second finger 845, generally parallel to the latter. An opposite, inward end of the segment 850 integrally joins the juncture between the outwardly convex segment 852 and the first interior segment 853. An approximately semi-circular depression 851 is formed into the segment 850 and functions to center slots to be cut into the compartment 805 to facilitate connection of a screen to the window 988. The segment 850, the first interior segment 853, the second interior segment 824, the countersink segment 841, and the interface segment 842 cooperate to form a closed curve about a sixth compartment 805 having a generally rectangular profile.

An arm 846 extends from an intermediate portion of the second finger 845 and generally perpendicular thereto. An opposite end of the arm 846 integrally joins an angled segment 847 which extends generally outward and somewhat away from the second finger 845. An opposite, relatively outward end of the angled segment 847 integrally joins a distal segment 848 which extends frameward and parallel to the arm 846. The distal segment 848, the angled segment 847, and the second finger 845 cooperate to define a generally L-shaped channel 849.

The third additional profile (associated with the preferred embodiment pocket replacement type of casement window 988) is present on a sill angle member 749 that is described in the '995 application, which is owned by a common assignee and incorporated herein by reference. The sill angle 749 includes a first panel or base 750 and a second panel or beam 760 integrally interconnected by a "living hinge" 759 extending the width of the sill 707. The first panel 750 extends from a living hinge end 752 to a distal end 751. The second panel 760 extends from a living hinge end 762 to an opposite end 761. The first panel 750 is secured to the pre-existing sill 707 by caulk and or fasteners. A pair of flanges 753 and 754 extend upward from the first panel 750 proximate the distal end 751 and define a channel 756 therebetween.

The opposite end 761 of the second panel 760 is integrally joined to a wall or flange 763 that cooperates with the second panel 760 to define a substantially T-shaped structure. In other words, an upper portion 764 of the wall 763 extends perpendicularly up from the second panel 760 to a distal end 765, and a lower portion 766 of the wall 763 extends perpendicularly down from the second panel 760 to a distal end 767. The distal end 767 of the lower portion 766 inserts into the channel 756 to establish a second interconnection between the base 750 and the beam 760. The lower portion 766 cooperates with the base 750 and the beam 760 to define a triangular or wedge-shaped support for the sill jamb 800d of the window 700.

A series of parallel lines or grooves 768 are formed into the lower portion 766, and the parallel lines 768 extend parallel to the base 750. A cut made along any of the parallel lines 768 effectively shortens the length of the lower portion 766 and thus, decreases the angle defined between the base 750 and the beam 760 when the distal end of the lower portion 766 interengages the channel 756. Accordingly, by cutting along an appropriate one of the lines 768, one can configure the sill angle member 740 so that the angle between the base 750 and the beam 760 approaches the angle defined between the existing sill 707 and the sill jamb 800d, which should extend substantially horizontally when the window assembly 700 is properly installed.

Assembly of Casement Pocket Window

The frame members 800a–d are welded together to form the frame, and the sash members 700a–d are welded to one another about the glass panel 390 to form the sash. The sash is then connected by a hinge or other means to the frame, and operating hardware is also connected to the frame. A locking bar is secured relative to the groove 840 on the frame member 800a opposite the hinge connection. The locking bar is described in U.S. patent application Ser. No. 08/490, 222 to Plummer filed contemporaneously herewith, which is owned by a common assignee and incorporated herein by reference. A snugger is secured relative to the notch 739 on the sash member 700a opposite the hinge connection. Weatherstrips are connected to the slot 717 on the sash member 700a and the channel 844 on the frame member 800a. The outwardly concave corner segment 733 provides a recessed and relatively inconspicuous point at which to terminate an aesthetic coating disposed about the segments 730 and 731.

Installation of Casement Pocket Window

As evidenced by the reference numerals common to FIGS. 1b and 2b and FIGS. 9–10, installation of the casement pocket window 988 is similar to that of the double hung pocket window 70. The sill angle 749 is installed on the existing sill 1707, and the window 988 is positioned within the opening 1702 and on the sill angle 749. The inwardly facing walls 802 on the jamb members 800a–d contact respective interior trim members 1775–1778. The window 988 is then secured within the opening 1702 by means of screws through respective side jambs 800a and 800b, and pre-existing side liners 1792 and 1794, and into respective side jambs 1712 and 1714. These screws are directed through the channel 838 on the side jambs 800a and 800b.

As an alternative to the trim members 78a–c on the double hung pocket window 70, zero degree bends in aluminum coil stock 439 are tucked in the channels 830 and behind the tabs 835 on the jambs 800a–c. The coil stock is then bent around the trim pieces 1785', 1786', and 1788' and secured behind the trim pieces 1781', 1782', and 1784'.

Casement Window for WOWI Replacement

Figure 11:
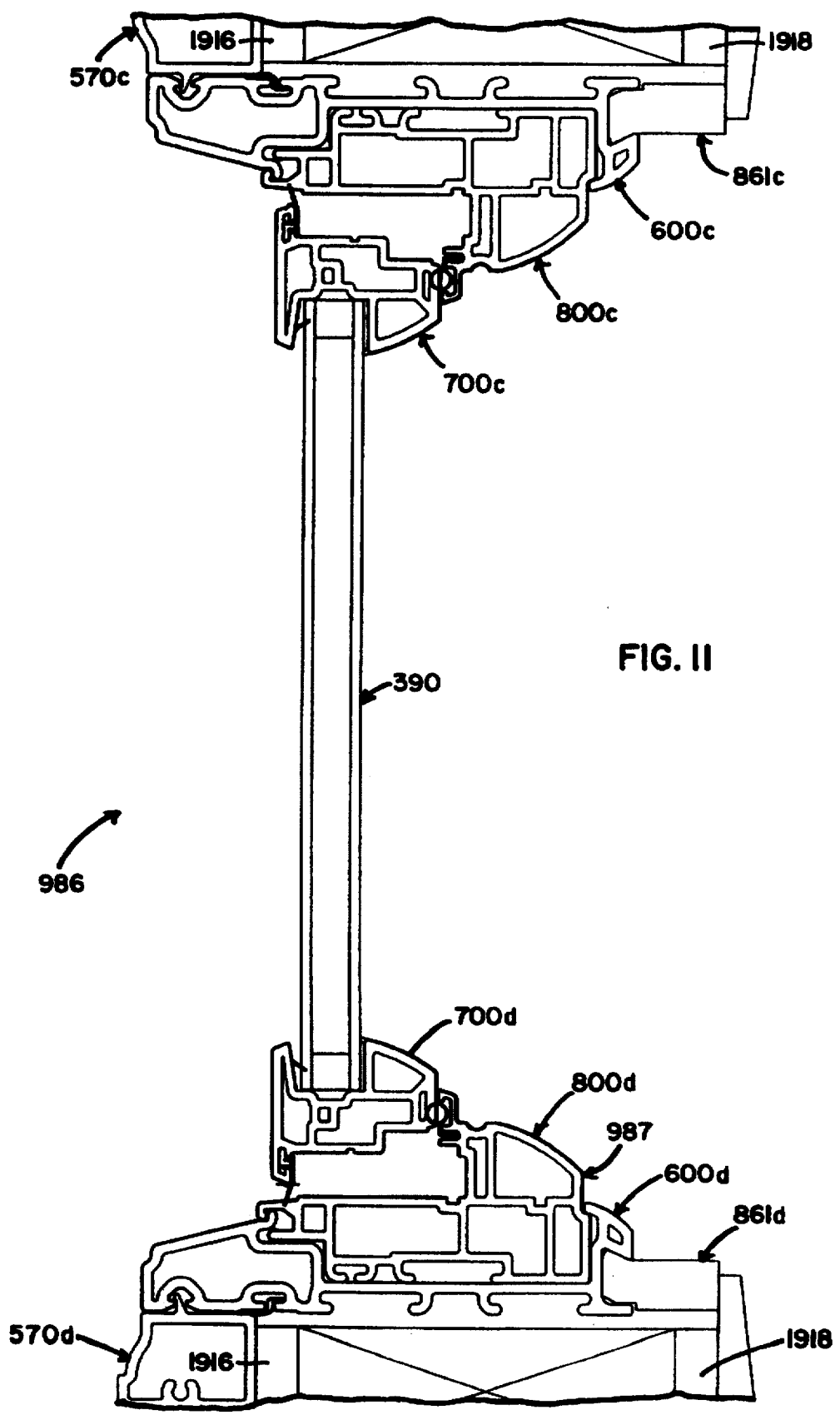
Figure 12:
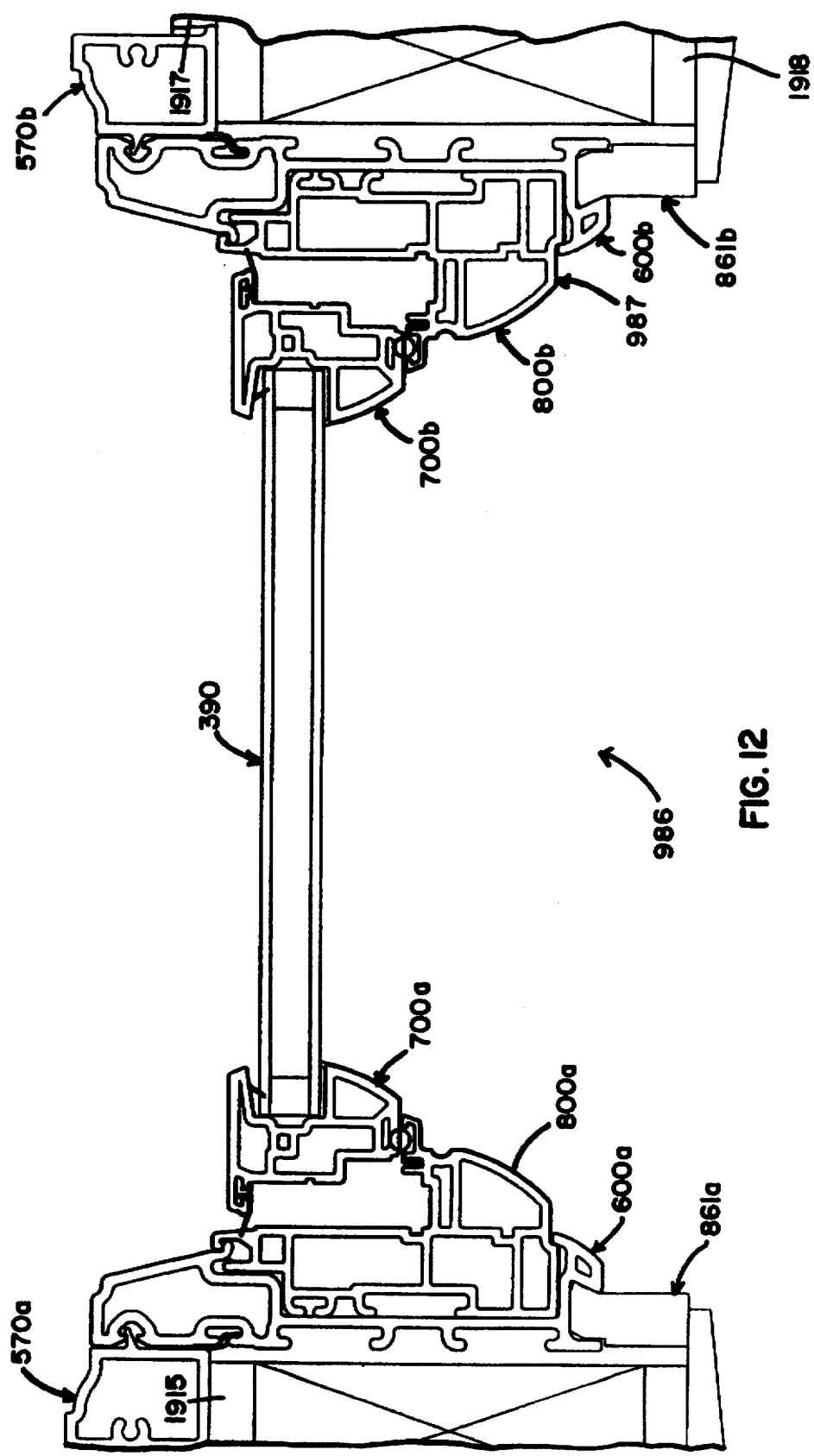

A preferred embodiment casement window unit constructed according to the principles of the present invention, and designed for window out/window in replacement installation, is designated as 986 in FIGS. 11–12. The initial stages of assembly of the casement WOWI window 986 are identical to the assembly of the casement pocket window 988. Subsequently, the casement WOWI window 986 is the result of modifications to the casement pocket window 988 which are identical to those undertaken to convert the double hung pocket window 70 into the double hung WOWI window 80, as described above. In general, each of the casement jamb members 800a–d is snapped into a respective frame member 600a–d by first inserting the channel 830 on the jamb over the relatively inward, distal end 645 on the frame, and then forcing the inwardly facing segment 802 on the jamb past the distal end 656 on the frame until the shoulder 809 snaps into place, frameward of the distal 656. As a result of this manipulation, the first outwardly directed segment 831 abuts the plateau segment 647, and the base segment 810 and distal portions of the arcuate segments 812–814 abut the base portion 610, and the inwardly facing segment 802 abuts the base wall 654. As evidenced by the common reference numerals used in FIGS. 11–12 and 3b and 4b, installation is identical, as well, except that an exterior molding member 570d is connected to a sill frame member 600d on the casement window in lieu of the exterior trim portion 530 integrally formed on the sill jamb 500 of the double hung window 80. Thus, the fully installed window 986 does not require extruded components having any profiles in addition to those already discussed above.

Casement Window for New Construction

Figure 13:
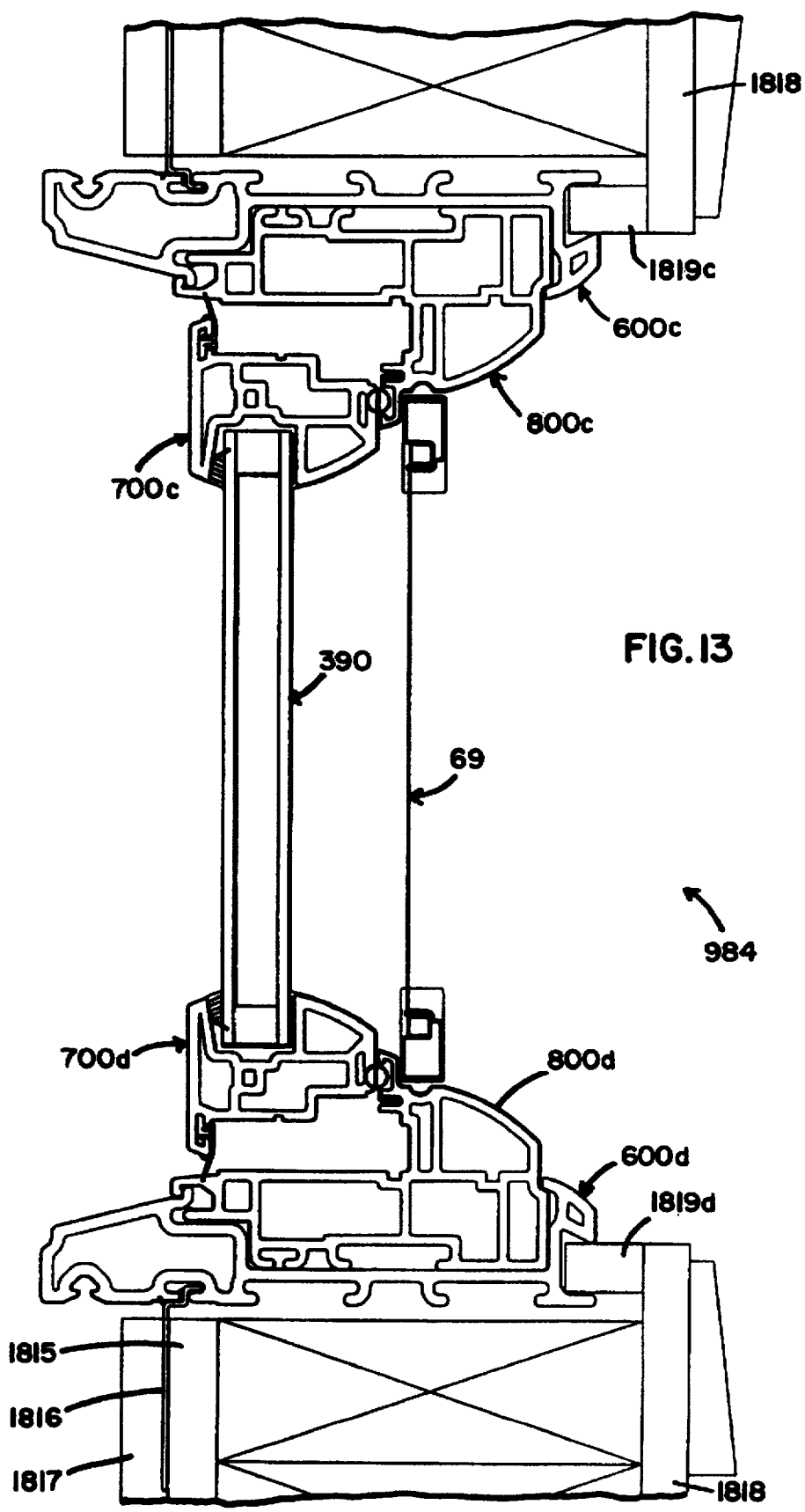
Figure 14:
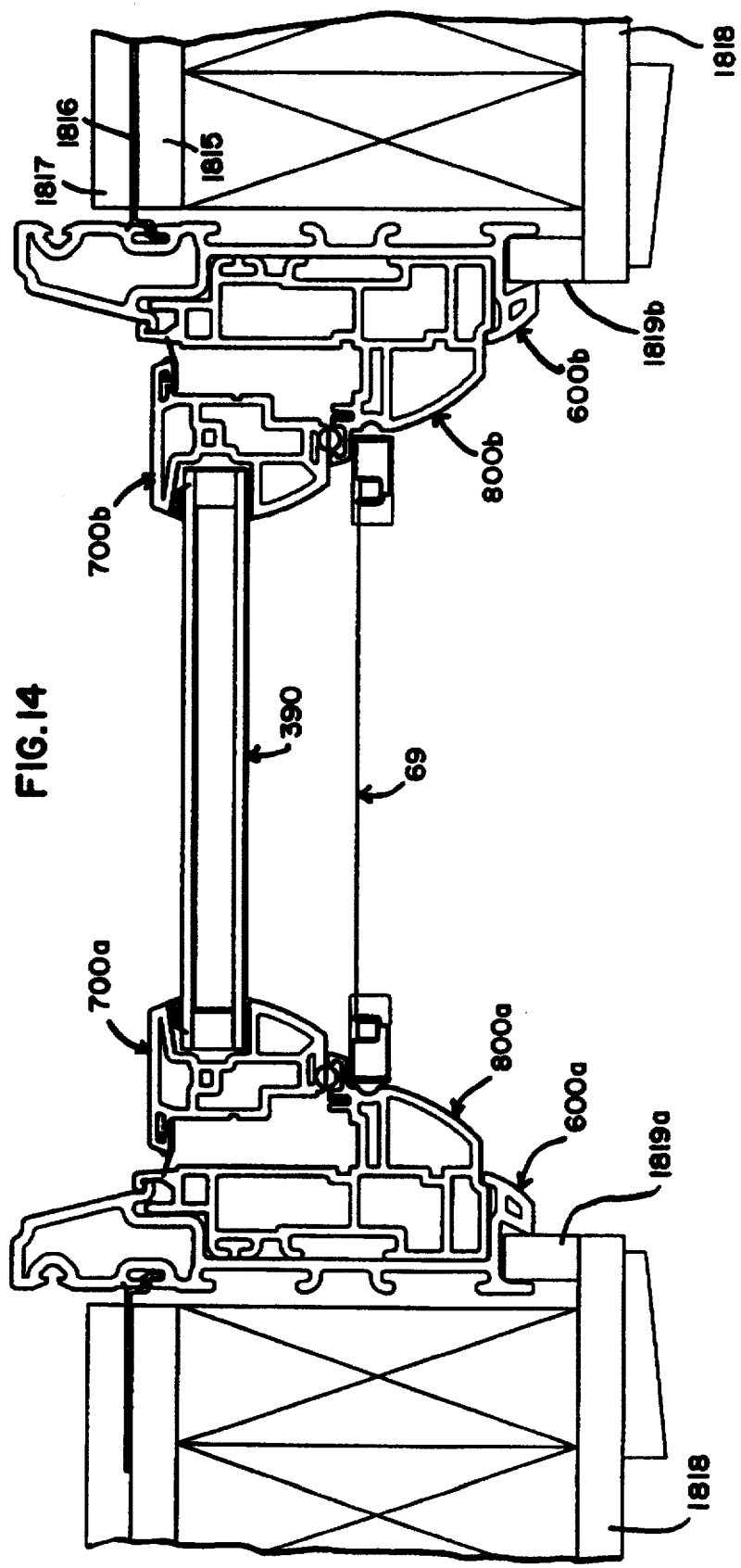

A preferred embodiment casement window unit constructed according to the principles of the present invention, and designed for new construction, is designated as 984 in FIGS. 13–14. The casement new construction window 984 is assembled in the same manner as the casement WOWI window 986. Also, differences between installation of the casement new construction window 984 and the casement WOWI window 986 are identical to those differences between installation of the double hung WOWI window 80 and the double hung new construction window 90, as described above. Thus, the fully installed window 986 does not require extruded components having any profiles in addition to those already discussed above.

Picture Window for Pocket Replacement

Figure 15:
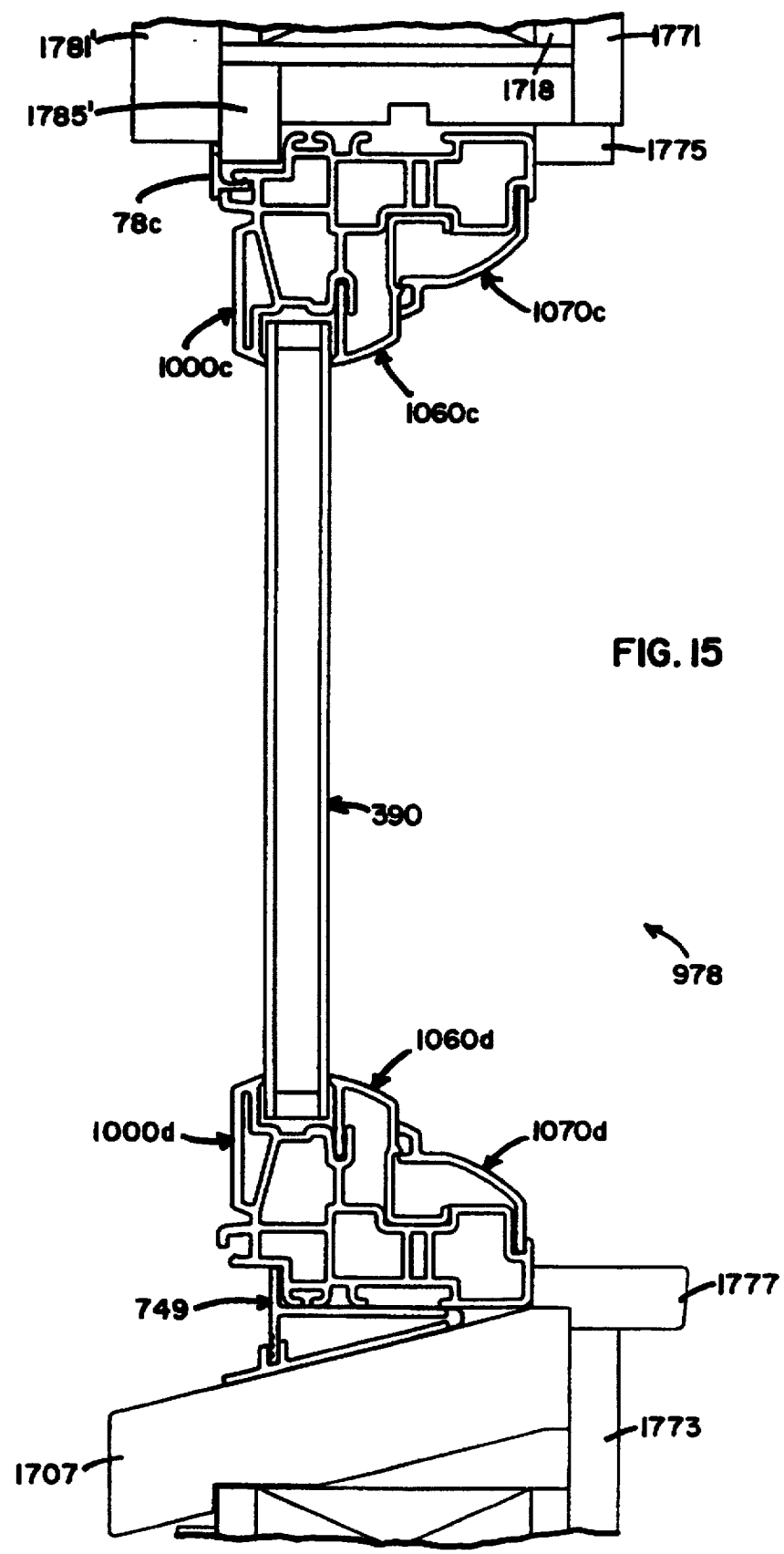
Figure 16:
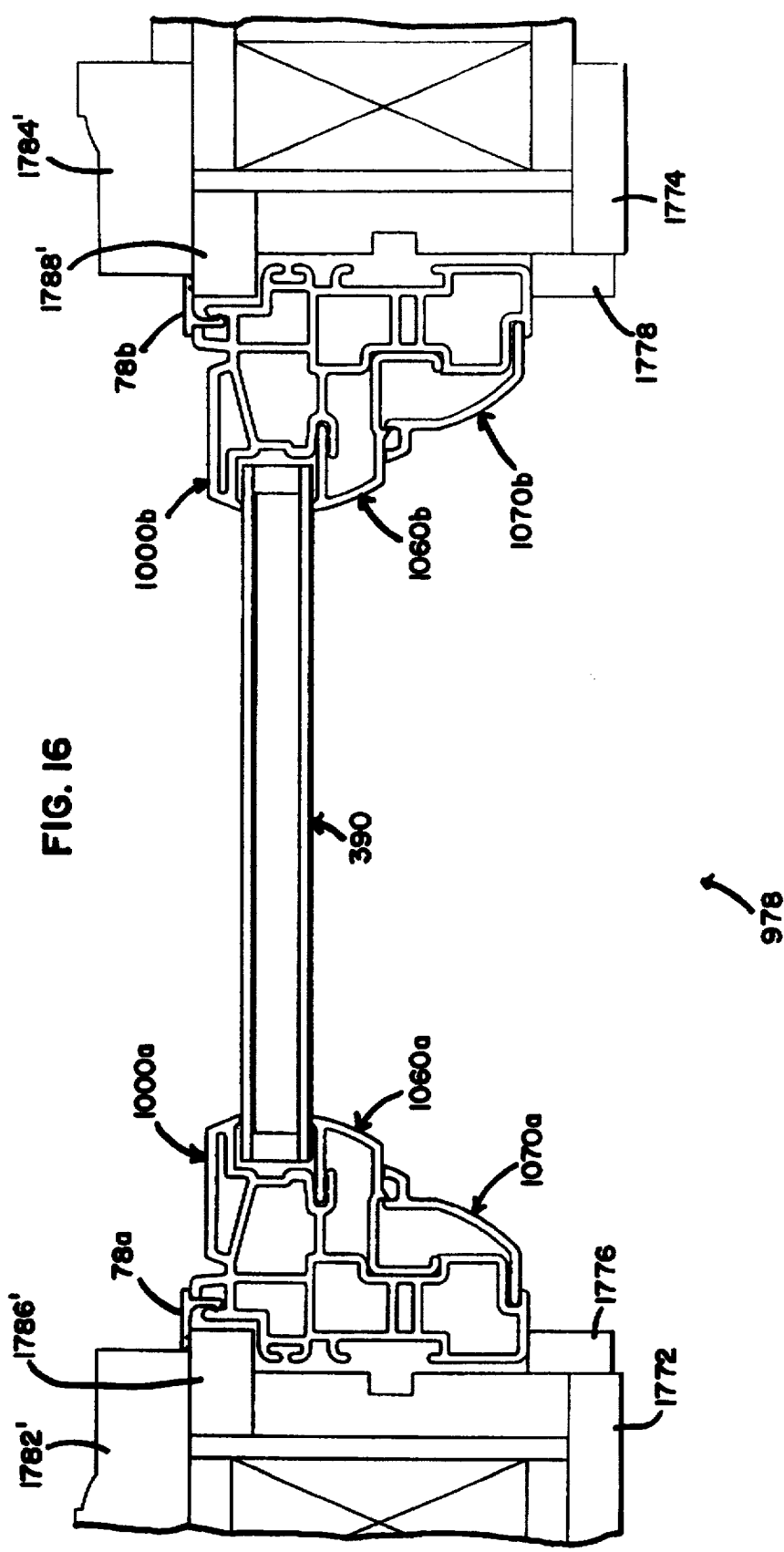

A preferred embodiment picture window unit constructed according to the principles of the present invention, and designed for pocket replacement installation, is designated as 978 in FIGS. 15–16. The window 978 generally includes a glass panel 390 mounted within a window frame.

The fully installed window 978 requires extruded components having three distinct profiles in addition to the thirteen profiles discussed above. A first of these additional profiles is present on the picture window jamb 1000 and is described with reference to FIG. 44. The profile of the picture window jamb 1000 includes an outwardly facing segment 1001, an inwardly facing segment 1002, and interconnecting structure integrally interconnected therebetween.

An inward end of a base segment 1010 integrally joins a frameward end of the inwardly facing segment 1002, and the base segment 1010 extends perpendicular thereto. The base segment 1010 extends outward to a distal end 1015, proximate which a leg 1021 extends from the base segment 1010, perpendicular thereto. An opposite end of the leg 1021 integrally joins an inward end of a intermediate segment 1020 which extends perpendicular thereto. The base segment 1010 is frameward from the intermediate segment 1020 and extends parallel thereto. The relatively outward, distal end 1015 of the base segment 1010, the leg 1021, and the intermediate segment 1020 cooperate to define a first, generally U-shaped channel 1016 that opens outward.

A first arcuate segment 1014 extends frameward proximate a relatively outward end of the intermediate segment 1020, generally perpendicular thereto, and curves inward and aligns with the base segment 1010. The first arcuate segment 1014 and the intermediate segment 1020 cooperate to define a second, generally U-shaped channel 1017 that opens inward. In other words, the first arcuate segment 1014, the intermediate segment 1020, the leg 1021, and the distal end 1015 of the base segment 1010 cooperate to define a relatively wide T-shaped channel 1018.

A relatively inward end of a nested segment 1019 integrally joins an outward end of the intermediate segment 1020. The nested segment 1019 is slightly frameward of the intermediate segment 1020 and extends parallel thereto. The nested segment 1019 extends outward and integrally joins the outwardly facing segment 1001 which extends perpendicular thereto. A second arcuate segment 1012 extends frameward from the juncture between a frameward end of the outwardly facing segment 1001 and the outward end of the nested segment 1019 and curves inward in much the same manner as the first arcuate segment 1014. A third arcuate segment 1013 extends frameward from an intermediate portion of the nested segment 1019 and curves outward toward the second arcuate segment 1012. Distal portions of the arcuate segments 1012–1014 are co-planar with the base segment 1010.

The third arcuate segment 1013 is a mirror image of the second arcuate segment 1012 and cooperates therewith to define a relatively small channel 1011 having a T-shaped profile. The third arcuate segment 1013 is also a mirror image of the first arcuate segment 1014 and cooperates therewith to define a relatively small channel 1038 having a profile that may be described as lamp shade-shaped. Both of the channels 1038 and 1011 open frameward.

An opposite end of the outwardly facing segment 1001 integrally joins an inward end of a first outwardly directed segment 1031 which extends perpendicular thereto. A connecting segment 1029 extends from an intermediate portion of the first outwardly directed segment 1031 and perpendicular thereto. An opposite end of the connecting segment 1029 integrally joins an inward end of a second outwardly directed segment 1032 which extends outward, perpendicular thereto. An opposite, outward end of the second outwardly directed segment 1032 integrally joins an outermost segment 1036 which extends frameward, perpendicular thereto. Also, a small tab 1035 extends from a distal, outward end of the first outwardly directed segment 1001 and generally toward the second outwardly directed segment 1032. The tab 1035, the first outwardly directed segment 1031, the connecting segment 1029, the second outwardly directed segment 1032, and the outermost segment 1036 cooperate to define a channel 1030 that is functionally similar to the channels 230 and 830 on the double hung window jamb 200 and the casement window jamb 800, respectively.

A stem 1033 extends from the juncture between the second outwardly directed segment 1032 and the connecting segment 1029 and is co-linear with the latter. An angled segment 1040 extends outward from an opposite end of the stem 1033 and in divergent fashion relative to the second outwardly directed segment 1032. The angled segment 1040, the stem 1033, and the second outwardly directed segment 1032 cooperate to define a substantially V-shaped channel 1039 that opens outward. An opposite end of the angled segment 1040 integrally joins a frameward end of another outwardly facing segment 1041 which extends parallel to the first-mentioned outwardly facing segment 1001. An opposite end of the outwardly facing segment 1041 integrally joins another angled segment 1042 which extends at a generally equal and opposite angle therefrom as the first-mentioned angled segment 1040. The angled segment 1042 terminates in a distal end 1043.

A sidewall 1044 extends frameward from the angled segment 1042, proximate the distal end 104, and parallel to the outwardly facing segment 1041. A frameward end of the sidewall 1044 integrally joins a first shoulder 1045 which extends inward, perpendicular thereto. The first shoulder 1045, the sidewall 1044, and the distal end 1043 cooperate to define a relatively shallow channel 1048 that opens inward. A nested segment 1046 extends inward from an inward end of the first shoulder 1045, slightly frameward thereof and parallel thereto. A first interior segment 1028 extends frameward and outward from the juncture between the first shoulder 1045 and the nested segment 1046 to the juncture between the angled segment 1040 and the stem 1033. The first interior segment 1028, the angled segment 1040, the outwardly facing segment 1041, the angled segment 1042, the sidewall 1044, and the first shoulder 1045 cooperate to form a closed curve about a first compartment 1008 that may be described as rudder-shaped.

An opposite, inward end of the nested segment 1046 integrally joins an outward end of a second shoulder 1047 which is co-linear with the first shoulder 1045. The shoulders 1045 and 1047 cooperate with the nested segment 1046 to define a relatively shallow, substantially U-shaped channel 1049 similar to the channel 334 on the double hung sash member 71d shown and described with reference to FIG. 31. An opposite, inward end of the second shoulder 1047 integrally joins an outward end of a U-shaped segment 1050 which extends frameward therefrom and perpendicular thereto. The U-shaped member 1050 defines a U-shaped channel 1052 and terminates in a relatively inward, distal end 1051.

Another stem 1053 extends frameward from a central, base portion of the U-shaped member 1050. An opposite, frameward end of the stem 1053 integrally joins a first plateau segment 1054 which extends in opposite directions, perpendicular thereto. An outward end of the first plateau segment 1054 is disposed just outward from the stem 1053 and integrally joins a second interior segment 1026 which extends frameward therefrom. A third interior segment 1027 extends outward from the second interior segment 1026, proximate its juncture with the first plateau segment 1054. An opposite, outward end of the third interior segment 1027 integrally joins the juncture between the stem 1033, the second outwardly directed segment 1032, and the connecting segment 1029. The third interior segment 1027, the stem 1033, the first interior segment 1028, the nested segment 1046, the second shoulder 1047, the U-shaped segment 1050, the stem 1053, the first plateau segment 1054, and the second interior segment 1026 cooperate to form a closed curve about a second compartment 1006 that is generally trapezoidal in profile.

An opposite, frameward end of the second interior segment 1026 integrally joins an outward end of the intermediate segment 1020 and forms a right angle therewith. Thus, the third interior segment 1027, the connecting segment 1029, the first outwardly directed segment 1031, the outwardly facing segment 1001, the nested segment 1019, and the second interior segment 1026 cooperate to form a closed curve about a third compartment 1007 having a generally L-shaped profile.

An opposite, inward end of the first plateau segment 1054 integrally joins an outward end of a recessed segment 1055, disposed frameward of and extending parallel to the first plateau segment 1054. A fourth interior segment 1025 and a fifth interior segment 1022 extend frameward from an intermediate portion of the recessed segment 1055 to an intermediate portion of the intermediate segment 1020, perpendicular to both and hence, parallel to one another. The fourth interior segment 1025, the intermediate segment 1020, the second interior segment 1026, the first plateau segment 1054, and the recessed segment 1055 cooperate to form a closed curve about a fourth compartment 1005 having a relatively modest L-shaped profile. Also, the fourth interior segment 1025 the recessed segment 1055, the fifth interior segment 1022, and the intermediate segment 1020 cooperate to form a closed curve about a fifth compartment 1004 that is rectangular in profile.

An opposite, inward end of the recessed segment 1055 integrally joins an outward end of a second plateau segment 1056 which is co-linear with the first plateau segment 1054. The plateau segments 1054 and 1056 cooperate with the recessed segment 1055 to define a substantially U-shaped channel 1034. An opposite, inward end of the second plateau segment 1056 integrally joins an end of another inwardly facing segment 1057 which extends frameward, perpendicular thereto. A bridge segment 1058 integrally interconnects an opposite, frameward end of the inwardly facing segment 1057 to an intermediate portion of the first-mentioned inwardly facing segment 1002 which extends beyond this juncture to a distal end 1059. The bridge segment 1058 serves as the base of a substantially J-shaped channel 1009 bordered on its sides by the inwardly facing segment 1057 and the relatively shorter distal end 1059. The inwardly facing segment 1002, the base segment 1010, the leg 1021, the intermediate segment 1020, the fifth interior segment 1022, the recessed segment 1055, the second plateau segment 1056, the inwardly facing segment 1057, and the bridge segment 1058 cooperate to form a closed curve about a sixth compartment 1003.

The second additional profile is present on the glass stop 1060 and is described with reference to FIG. 45. The profile of the glass stop 1060 includes a first distal end segment 1061 having a frameward end integrally joined to a base segment 1065 which extends perpendicular thereto and outward therefrom. An opposite, outward end of the base segment 1065 integrally joins a first central segment 1067 which extends perpendicular therefrom in the same direction as the first distal end segment 1061. A second central segment 1066 extends from an opposite end of the first central segment 1067, slightly inward thereof and parallel thereto. A pointed protrusion 1068 extends inward from the juncture between the central segments 1066 and 1067.

An opposite end of the second central segment 1066 integrally joins an inward end of an outwardly convex segment 1063 having curvature similar to that of the outwardly convex surfaces on the other types of windows. The outwardly convex segment 1063 extends generally away from the protrusion 1068 and terminates in a distal end 1064. Just inward of this distal end 1064, a second distal end segment 1062 extends frameward from the outwardly convex segment 1063, parallel to the central segments 1066 and 1067. The base segment 1065 inserts into the channel 1034 on the picture window jamb 1000, and the second distal end segment 1062 inserts into the channel 1052 on the picture window jamb 1000, and interengaging shoulders on these parts retain the glass stop 1060 in place.

The third additional profile is present on the fastener cover 1070 and is described with reference to FIG. 46. The profile of the fastener cover 1070 includes a first distal end segment 1079 which extends frameward. An opposite end of the first distal end segment 1079 integrally joins an outwardly convex segment 1075 which extends generally away from the distal end of the distal end segment 1079. A relatively outward end of the outwardly convex segment 1075 integrally joins an inward end of a linear segment 1074 which extends perpendicular to the distal end segment 1079 and itself, terminates in an outward, distal end 1073.

An arm 1072 extends between a frameward end integrally joined to an intermediate portion of the linear segment 1074, and an opposite end integrally joined to a second distal end segment 1071 which extends in the same general direction as the outwardly convex segment 1075. The second distal end segment 1071, the arm 1072, and the distal end 1073 of the linear segment 1074 cooperate to define a generally C-shaped channel 1078. The first distal end segment 1079 inserts into the channel 1009 on the picture window jamb 1000, and the distal end 1073 catches on the frameward side of the pointed protrusion 1068 on the glass stop 1060 to retain the fastener cover 1070 and the glass stop 1060 in place relative to the jamb 1000.

Assembly/Installation of the Picture Pocket Window

The jamb members 1000a–d are welded together to form the frame, and the glass panel 390 is placed therein. The first central member 1067 and the first distal segment 1061 on the glass stop 1060 are then snapped into the channel 1034 on the jamb 100, and the second distal end 1062 on the glass stop 1060 is snapped into the channel 1052 on the jamb 1000 to secure the glass panel in place. The glass panel is subsequently sealed in place. The fastener cover 1070 is snapped in place relative to the channel 1009 on the jamb 1000 and the protrusion 1068 on the glass stop 1060 once the window is secured within the framed opening 1702. The window 978 is installed with the same parts and in the same manner as the pocket replacement type casement window 988. Screws are directed through the base segments of the glass stops and into the compartments 1004 on the jambs 1000.

Picture Window for Window Out/Window In Replacement

Figure 17:
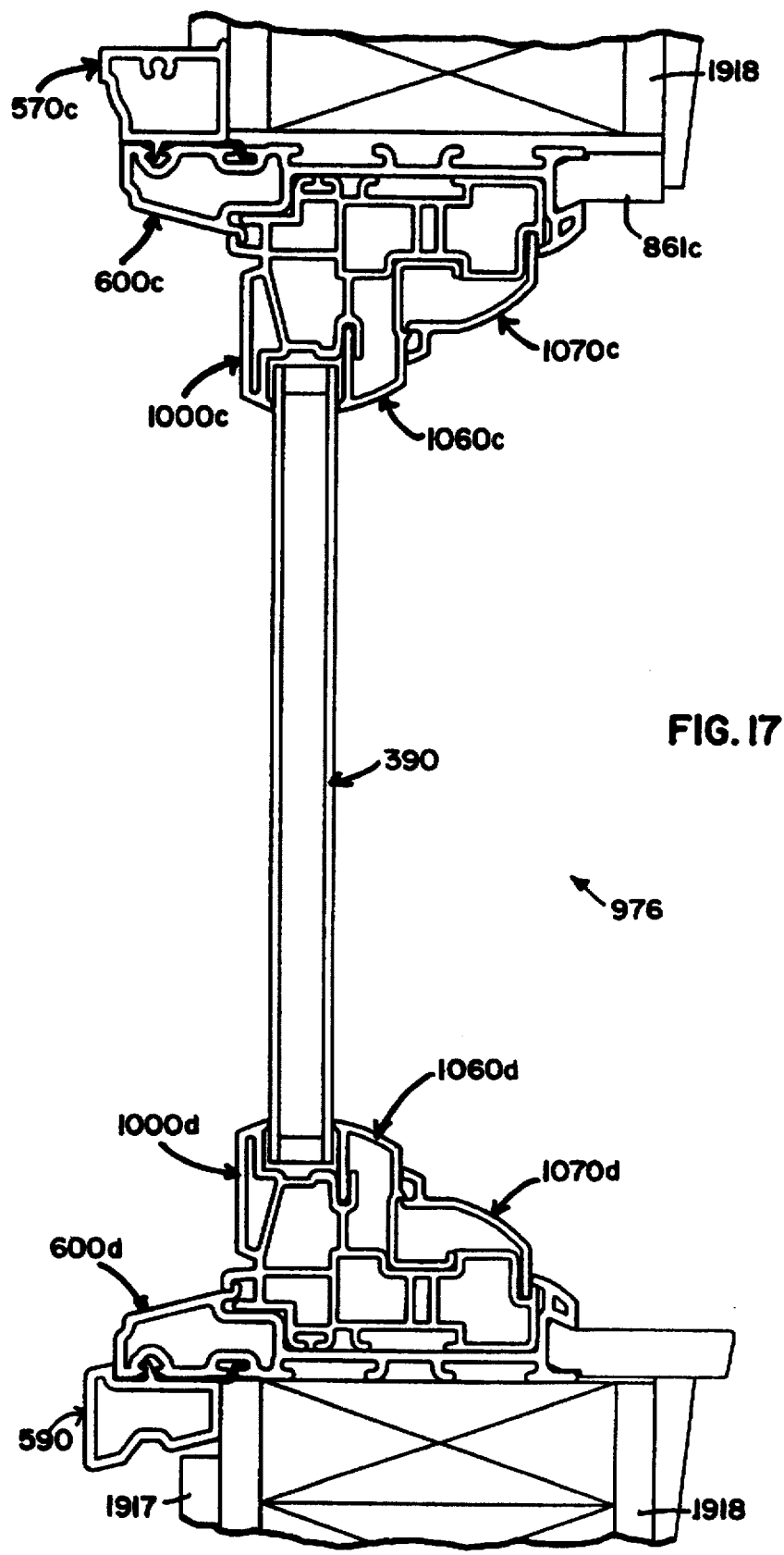
Figure 18:
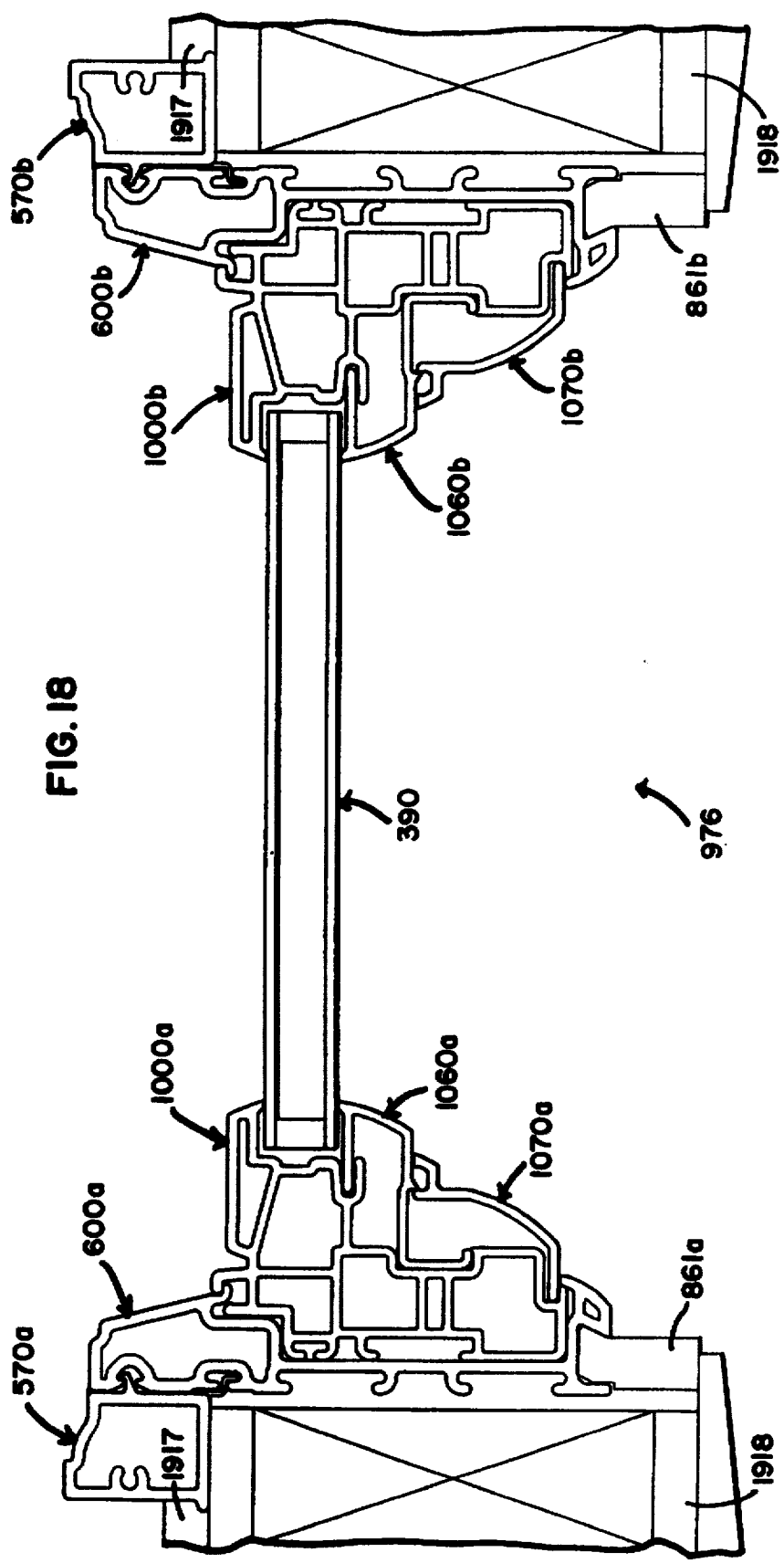

A preferred embodiment picture window unit constructed according to the principles of the present invention, and designed for window out/window in replacement installation, is designated as 976 in FIGS. 17–18. The initial stages of assembly of the picture WOWI window 976 are identical to the assembly of the picture pocket window 978. Subsequently, the picture WOWI window 976 is the result of modifications to the picture pocket window 978 which are identical to those undertaken to convert the double hung pocket window 70 into the double hung WOWI window 80, and to convert the casement pocket window 988 into the casement WOWI window 986, as described above. Thus, the fully assembled and installed picture WOWI window 976 does not require extruded components having any distinct profiles in addition to those discussed above. However, an optional sill trim member 590, having a distinct profile, is connected to the frame member 600d. This sill trim member 590 is desirable for use on windows in proximity to double hung windows because it conforms with the exterior portion of the double hung sill 500.

The profile of the sill trim member 590 includes a first, inwardly facing segment 591 and a second, outwardly facing segment 592. An angled segment 596 extends between and integrally interconnects frameward ends of the inwardly facing segment 591 and the outwardly facing segment 592. An intermediate portion of the angled segment 596 is interrupted by an elbow segment 597 which defines a generally U-shaped channel 598 that opens away from the frame to which the sill trim member 590 attaches. A frameward segment 593 extends perpendicularly between opposite ends of the inwardly facing segment 591 and the outwardly facing segment 592. A finger 594 protrudes from an intermediate portion of the frameward segment 593 to engage the channel 607. A shoulder 595 extends from the frameward segment 593 proximate the outwardly facing segment 592, and the shoulder 595 and the finger 594 capture the segment 641 on the frame 600 therebetween to secure the sill trim member 590 to the frame.

Picture Window for New Construction

Figure 19:
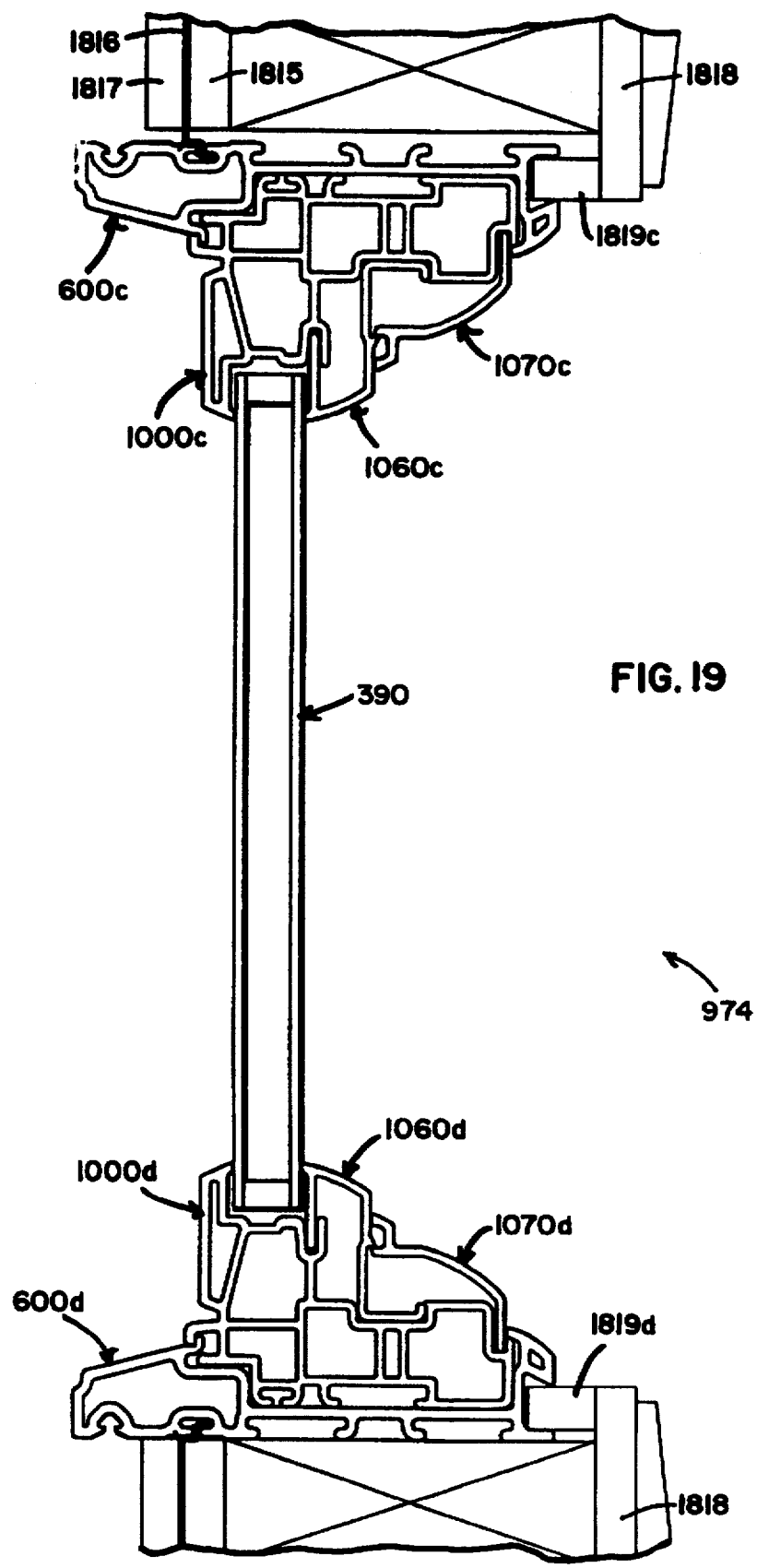
Figure 20:
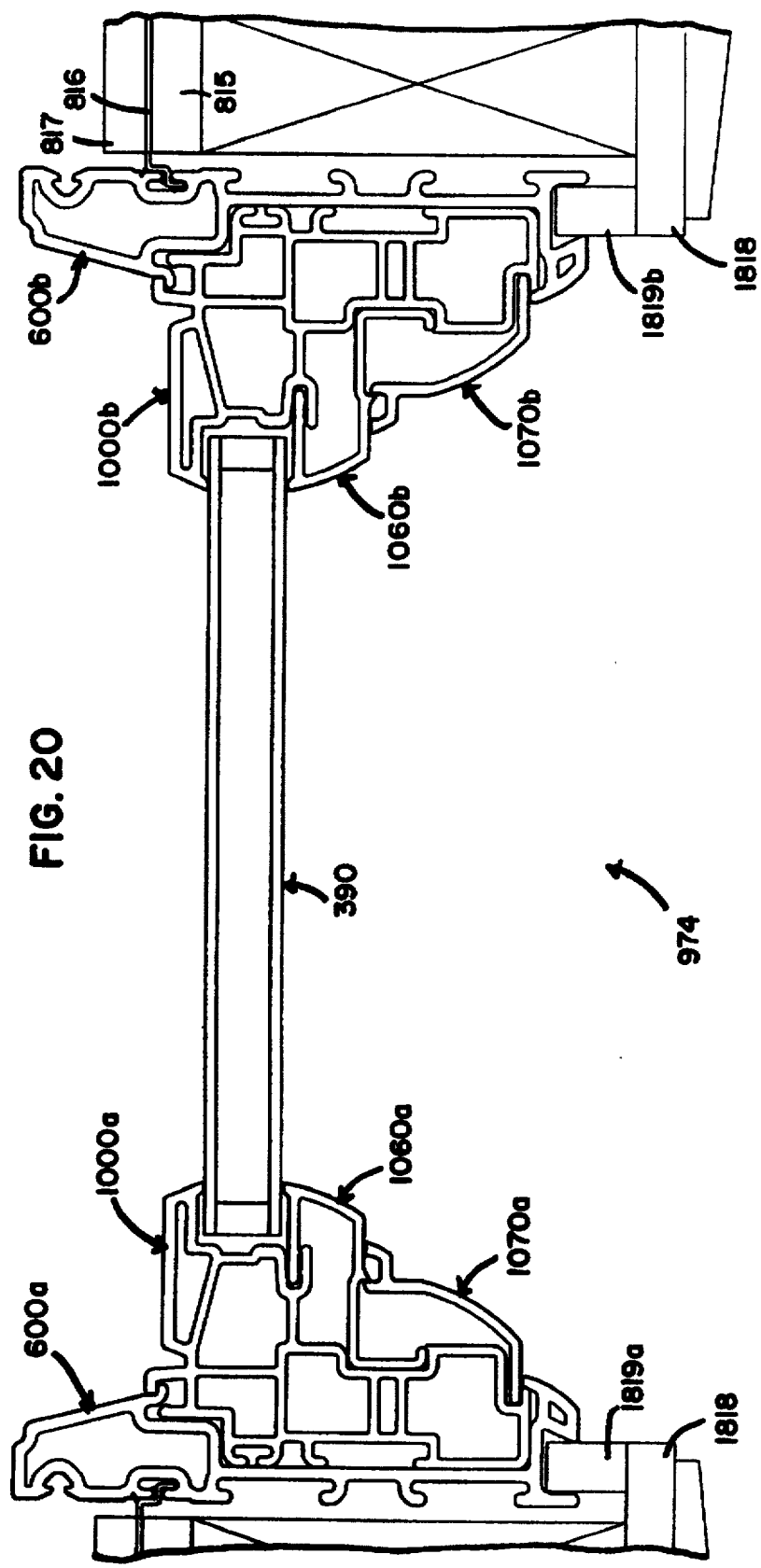

A preferred embodiment picture window constructed according to the principles of the present invention, and designed for new construction, is designated as 974 in FIGS. 19–20. The new construction picture window 974 is assembled in the same manner as the picture WOWI window 976. Also, differences between installation of the new construction picture window 974 and the WOWI picture window 976 are identical to those differences between installation of the double hung WOWI window 80 and the double hung new construction window 90, and the casement WOWI window 986 and the casement new construction window 986, as described above. Thus, the fully assembled and installed window 974 does not require extruded components having any profiles in addition to those already discussed above.

Gliding Window for Pocket Replacement

Figure 21:
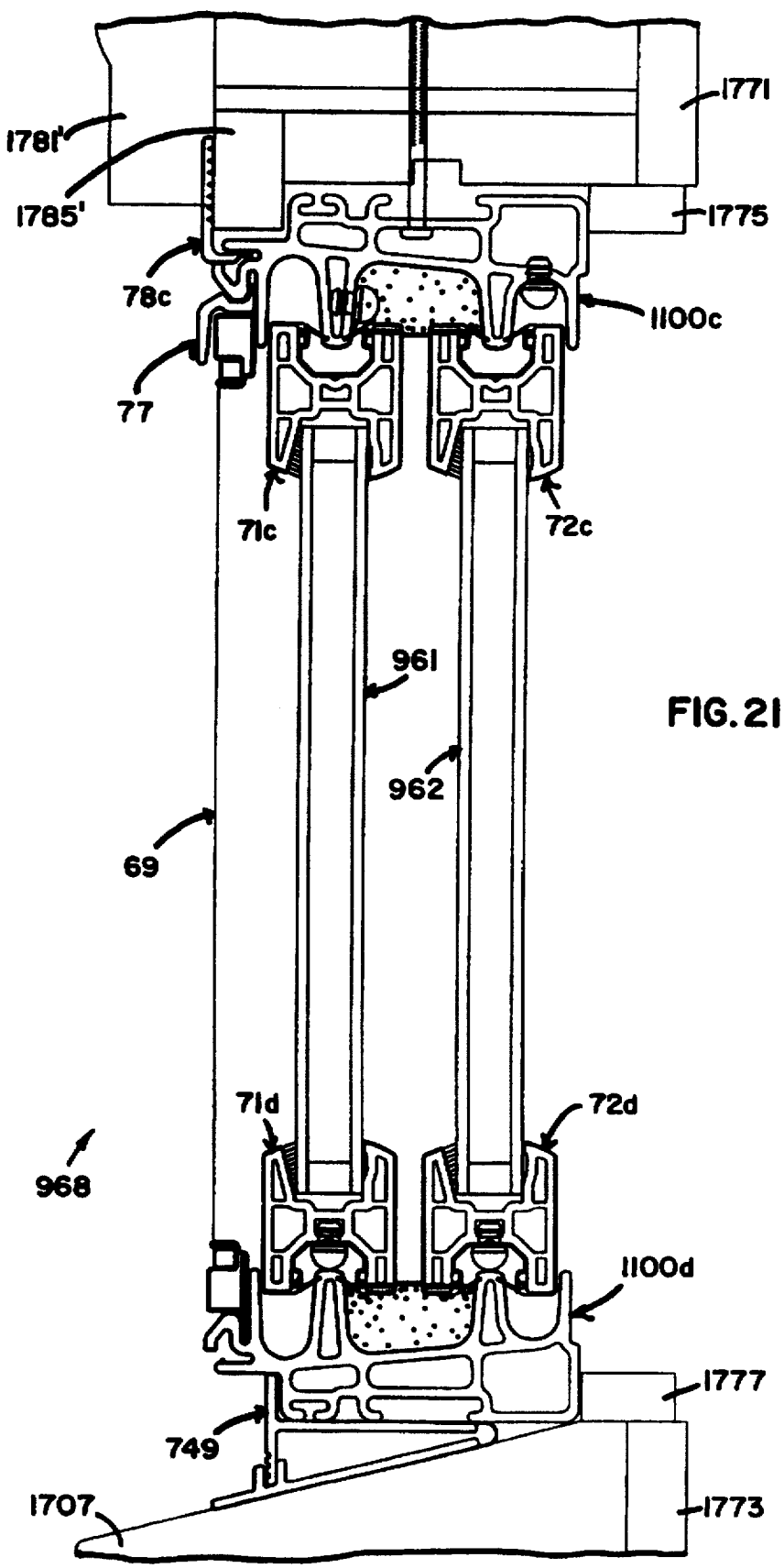
Figure 22:
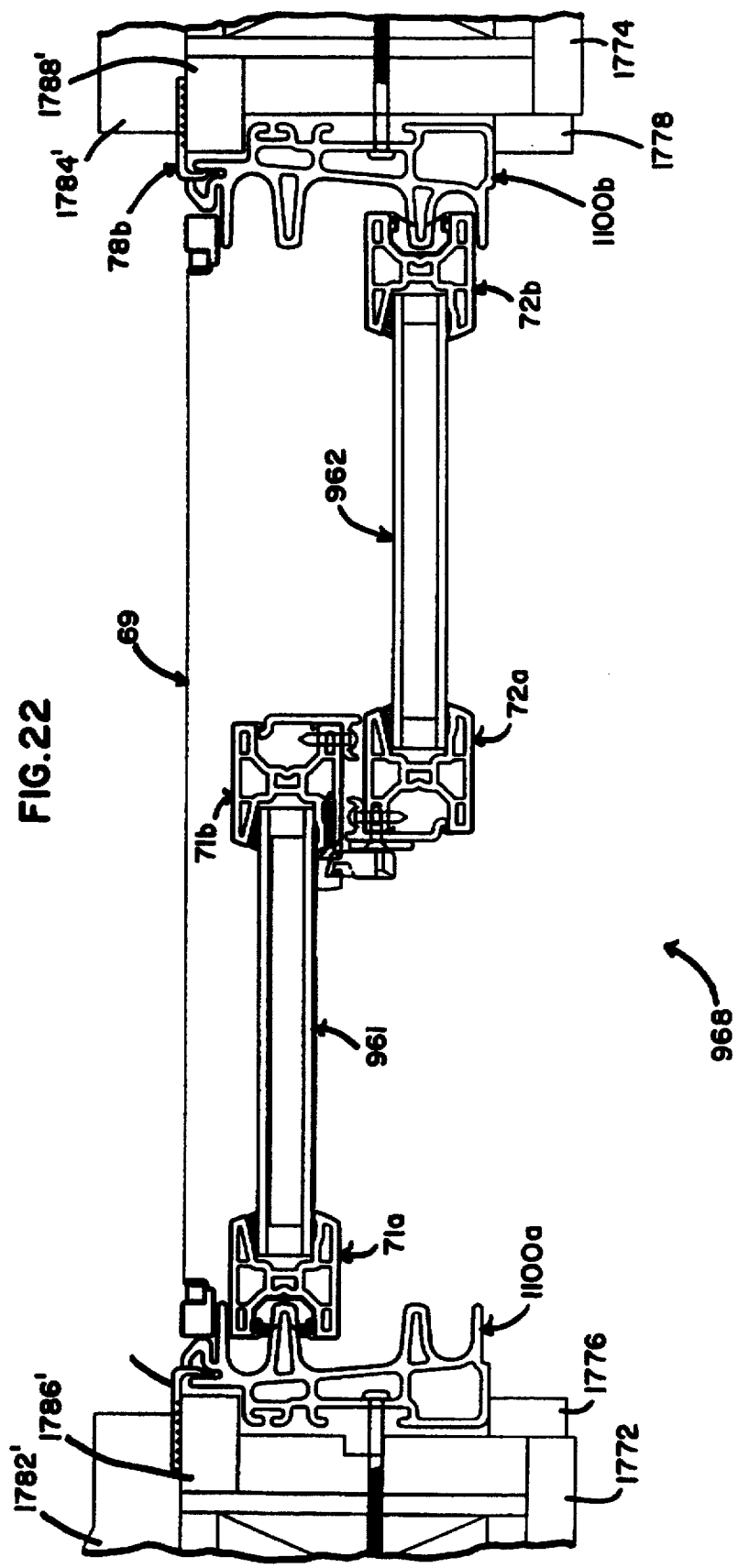

A preferred embodiment gliding window constructed according to the principles of the present invention, and designed for pocket replacement installation, is designated as 968 in FIGS. 21–22. The window 968 generally includes an outer sash 961 and an inner sash 962 slideably mounted within a frame.

Figure 47:
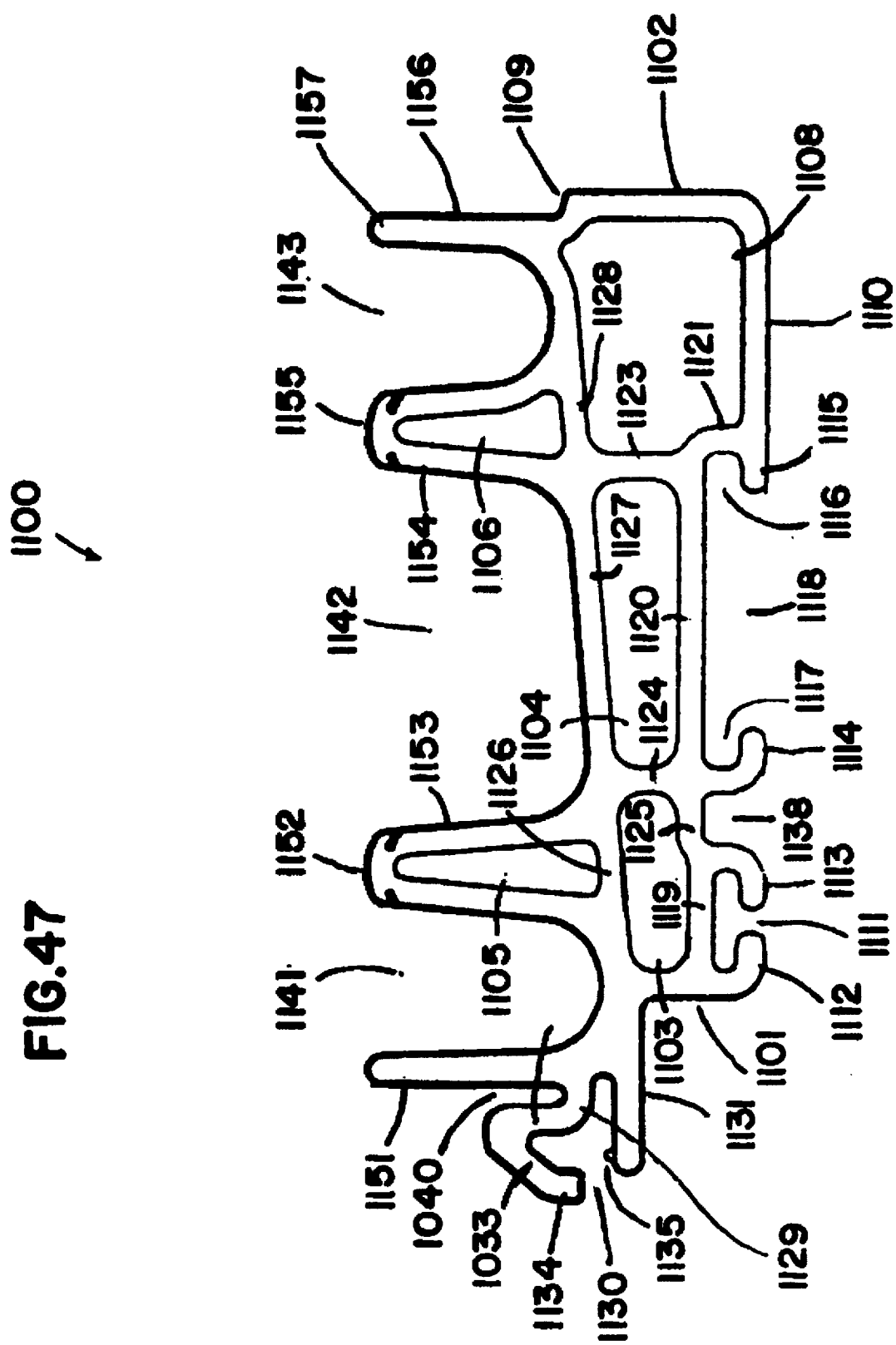
FIG. 47 is a sectioned side view of a preferred embodiment gliding window jamb constructed according to the principles of the present invention and forming a part of the window assemblies shown in FIGS. 21-26.

The fully installed window 968 requires extruded components having one distinct profiles in addition to the profiles discussed above. This additional profile is present on the glider jambs 1100a–d and is described with reference to FIG. 47. The profile of the glider jambs 1100a–d includes an outwardly facing segment 1101, an inwardly facing segment 1102, and interconnecting structure integrally interconnected therebetween.

An inward end of a base segment 1110 integrally joins a frameward end of the inwardly facing segment 1102, and the base segment 1110 extends perpendicular thereto. The base segment 1110 extends outward to a distal end 1115, proximate which a leg 1121 extends from the base segment 1110, perpendicular thereto. An opposite end of the leg 1121 integrally joins an inward end of a intermediate segment 1120 which extends perpendicular thereto. The base segment 1110 is frameward from the intermediate segment 1120 and extends parallel thereto. The relatively outward, distal end 1115 of the base segment 1110, the leg 1121, and the intermediate segment 1120 cooperate to define a first, generally U-shaped channel 1116 that opens outward.

A first arcuate segment 1114 extends frameward proximate a relatively outward end of the intermediate segment 1120, generally perpendicular thereto, and curves inward and aligns with the base segment 1110. The first arcuate segment 1114 and the intermediate segment 1120 cooperate to define a second, generally U-shaped channel 1117 that opens inward. In other words, the first arcuate segment 1114, the intermediate segment 1120, the leg 1121, and the distal end 1115 of the base segment 1110 cooperate to define a relatively wide T-shaped channel 1118.

A relatively inward end of a nested segment 1119 integrally joins an outward end of the intermediate segment 1120. The nested segment 1119 is slightly frameward of the intermediate segment 1120 and extends parallel thereto. The nested segment 1119 extends outward and integrally joins the outwardly facing segment 1101 which extends perpendicular thereto. A second arcuate segment 1112 extends frameward from the juncture between a frameward end of the outwardly facing segment 1101 and the outward end of the nested segment 1119 and curves inward in much the same manner as the first arcuate segment 1114. A third arcuate segment 1113 extends frameward from an intermediate portion of the nested segment 1119 and curves outward toward the second arcuate segment 1112. Distal portions of the arcuate segments 1112–1114 are co-planar with the base segment 1110.

The third arcuate segment 1113 is a mirror image of the second arcuate segment 1112 and cooperates therewith to define a relatively small channel 1111 having a T-shaped profile. The third arcuate segment 1113 is also a mirror image of the first arcuate segment 1114 and cooperates therewith to define a relatively small channel 1138 having a profile that may be described as lamp shade-shaped. Both of the channels 1138 and 1111 open frameward.

An opposite end of the outwardly facing segment 1101 integrally joins an inward end of an outwardly directed segment 1131 which extends perpendicular thereto. A first relatively large U-shaped segment 1151 is approximately centered relative to an opposite end of the outwardly facing segment 1101 and creates relatively larger junctures on either side thereof. The U-shaped segment 1151 defines a relatively large U-shaped channel 1141. A connecting segment 1129 extends from the relatively outward juncture and generally parallel to the outwardly directed segment 1131. An opposite end of the connecting segment 1129 integrally joins a frameward end of a lesser sidewall 1132 which extends parallel to an outward sidewall of the U-shaped segment 1151. The lesser sidewall 1132, the connecting segment 1129, and the outward side of the U-shaped segment 1151 cooperate to define a relatively narrow slot 1140.

An opposite end of the lesser sidewall 1132 integrally joins an angled segment 1133 which extends outward and frameward therefrom. A distal segment 1134 extends frameward from a frameward end of the angled segment 1133, perpendicular to the outwardly directed segment 1131. Also, a small tab 1135 extends from a distal, outward end of the outwardly directed segment 1131 and generally toward the angled segment 1133. The tab 1135, the outwardly directed segment 1131, the connecting segment 1129, the lesser sidewall 1132, the angled segment 1133, and the distal segment 1134 cooperate to define a channel 1130 that is functionally similar to the channels 230, 830, and 1030 on the double hung window jamb 200, the casement window jamb 800, and the picture window jamb 1000, respectively.

A first interior segment 1126 extends from the relatively inward juncture created by the U-shaped member 1151 to a frameward end of a first greater sidewall 1153. An opposite end of the first greater sidewall 1153 integrally joins an inward end of a first connecting segment 1152 which extends parallel to the nested segment 1119. An opposite, outward end of the first connecting segment 1152 integrally joins an inward end of the U-shaped segment 1151. The first connecting segment 1152, the inward sidewall of the U-shaped segment 1151, the first interior segment 1126, and the first greater sidewall 1153 cooperate to form a closed curve about a first compartment 1105 that is generally triangular in profile.

A frameward end of the first greater sidewall 1153 integrally joins an outward end of a base wall 1127 which extends generally perpendicular thereto. A second interior segment 1124 extends frameward from the base wall 1127, just inside its juncture with the first greater sidewall 1153, and substantially perpendicular thereto. An opposite, frameward end of the second interior segment 1124 integrally joins the intermediate segment 1120 at its juncture with the first arcuate segment 1114. The second interior segment 1124, the intermediate segment 1120, the nested segment 1119, the outwardly facing segment 1101, and the first interior segment 1126 cooperate to form a closed curve about a second compartment 1103 that is generally rectangular in profile.

An opposite, inward end of the base wall 1127 integrally joins a second greater sidewall 1154 which extends generally perpendicular thereto. The greater sidewalls 1153 and 1154 cooperate with the base wall 1127 to form a large, substantially U-shaped channel 1142. A third interior segment 1123 extends frameward from the juncture between the base wall 1127 and the second greater sidewall 1154. An opposite, frameward end of the third interior segment 1123 extends perpendicular to and integrally joins the intermediate segment 1120 just within its inward end. The third interior segment 1123, the intermediate segment 1120, the second interior segment 1124, and the base wall 1127 cooperate to form a closed curve about a third compartment 1104 that is generally rectangular in profile.

An opposite end of the second greater sidewall 1154 integrally joins another connecting segment 1155 which extends inward to an outward end of a second relatively large U-shaped segment 1156. The U-shaped segment 1156 defines another relatively large U-shaped channel 1143. A fourth interior segment 1128 extends outward from a base portion of the U-shaped segment 1156 to the juncture between the base wall 1127 and the second greater sidewall 1154. The fourth interior segment 1128, the second greater sidewall 1154, the connecting segment 1155, and the outward sidewall of the U-shaped segment 1156 cooperate to form a closed curve about a fourth compartment 1106 that is generally triangular in profile.

An opposite, inward sidewall of the U-shaped segment 1156 terminates in a distal end 1157. The inwardly facing segment 1102 extends frameward from the inward sidewall of the U-shaped segment 1156. The inwardly facing segment 1102 is slightly inward of the inward sidewall and extends generally parallel thereto, thereby creating an inwardly accessibly shoulder 1109. The opposite, frameward end of the inwardly facing segment 1102 integrally joins the inward end of the base segment 1110 at a right angle thereto. The inwardly facing segment 1102, the base segment 1110, the leg 1121, the third interior segment 1123, the fourth interior segment 1128, and the base of the U-shaped segment 1156 cooperate to form a closed curve about a fifth compartment 1108 that is generally rectangular in profile.

Assembly/Installation of the Gliding Pocket Window

Assembly of the gliding pocket window 968 is similar to assembly of the alternative embodiment double hung new construction window 990. Differences in the assembly process include the manner in which the sashes are mounted relative to the frame, and the fact that all of the gliding jambs are identical in profile and thus, welded to one another. Installation of the gliding pocket window 968 is similar, as well. Screws are directed through the compartments 1104.

Gliding Window for Window Out/Window In Replacement

Figure 23:
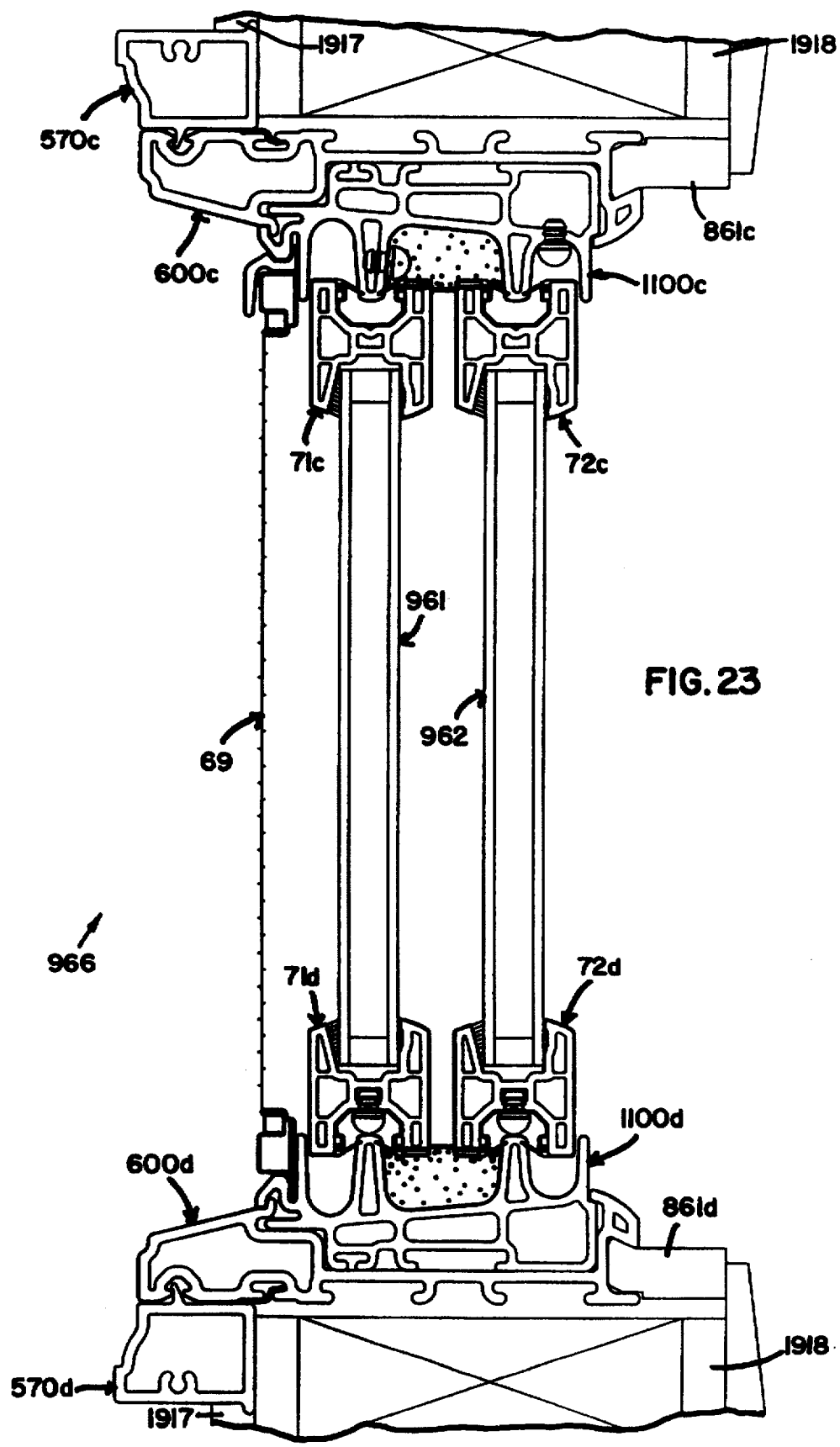
Figure 24:
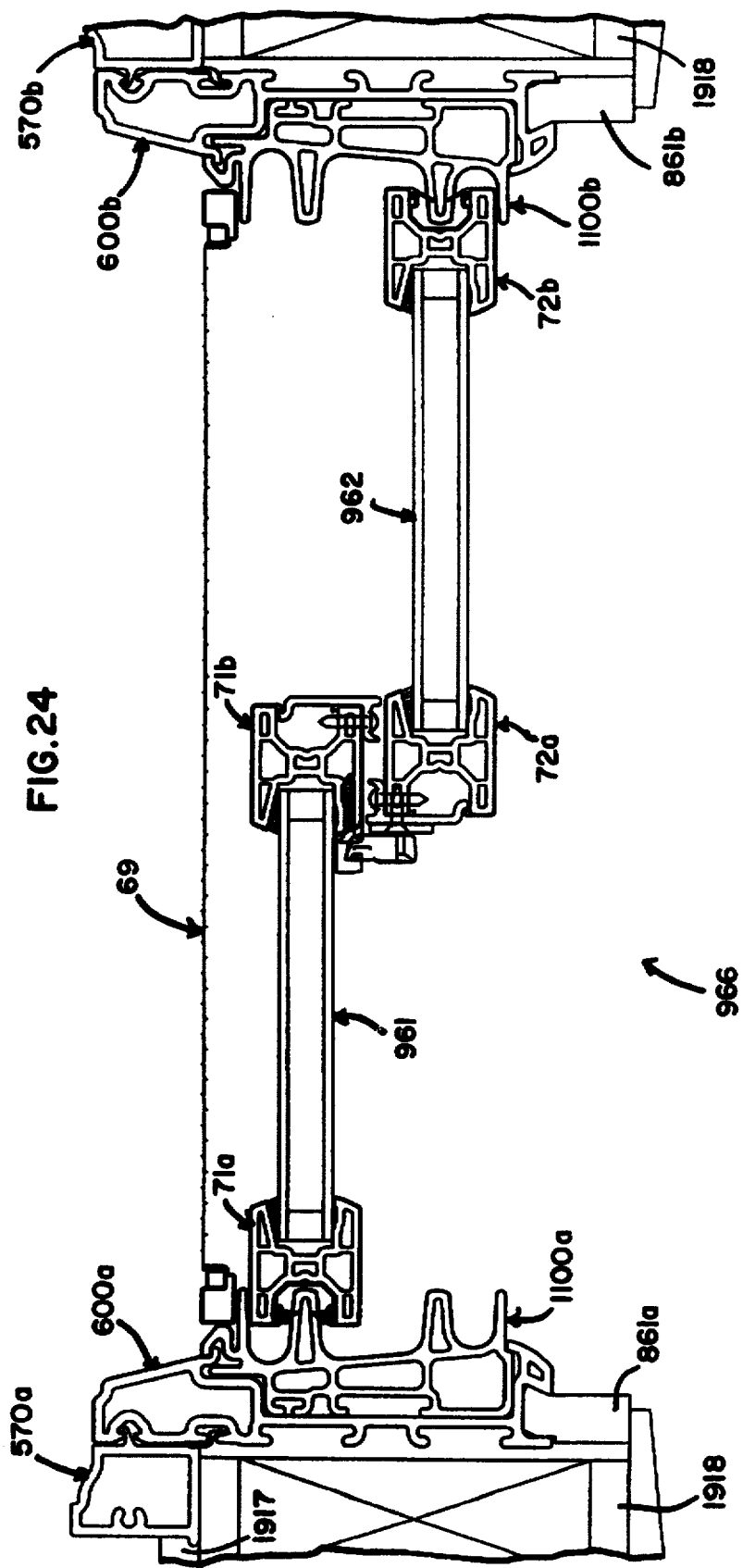

A preferred embodiment gliding window constructed according to the principles of the present invention, and designed for WOWI replacement installation, is designated as 966 in FIGS. 23-24. The initial stages of assembly of the gliding WOWI window 966 are identical to assembly of the gliding pocket window 968. The subsequent assembly steps are identical to those taken in converting the other types of window from pocket replacement configurations to WOWI replacement configurations. Thus, the fully assembled and installed window 966 does not require extruded components having any distinct profiles in addition to those discussed above. The same is true for installation vis-a-vis the other window sub-groups.

Gliding Window for New Construction

Figure 25:
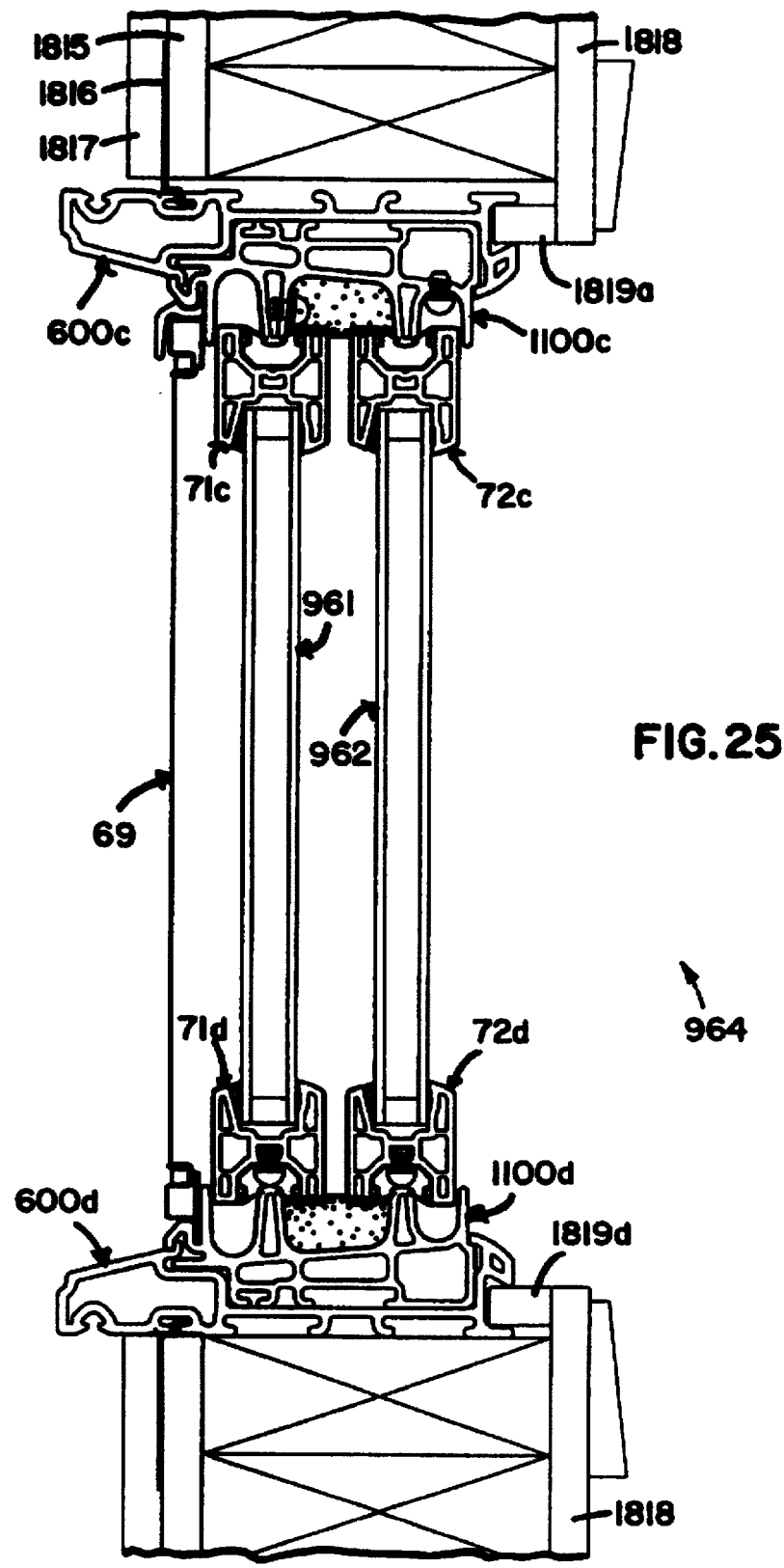
Figure 26:
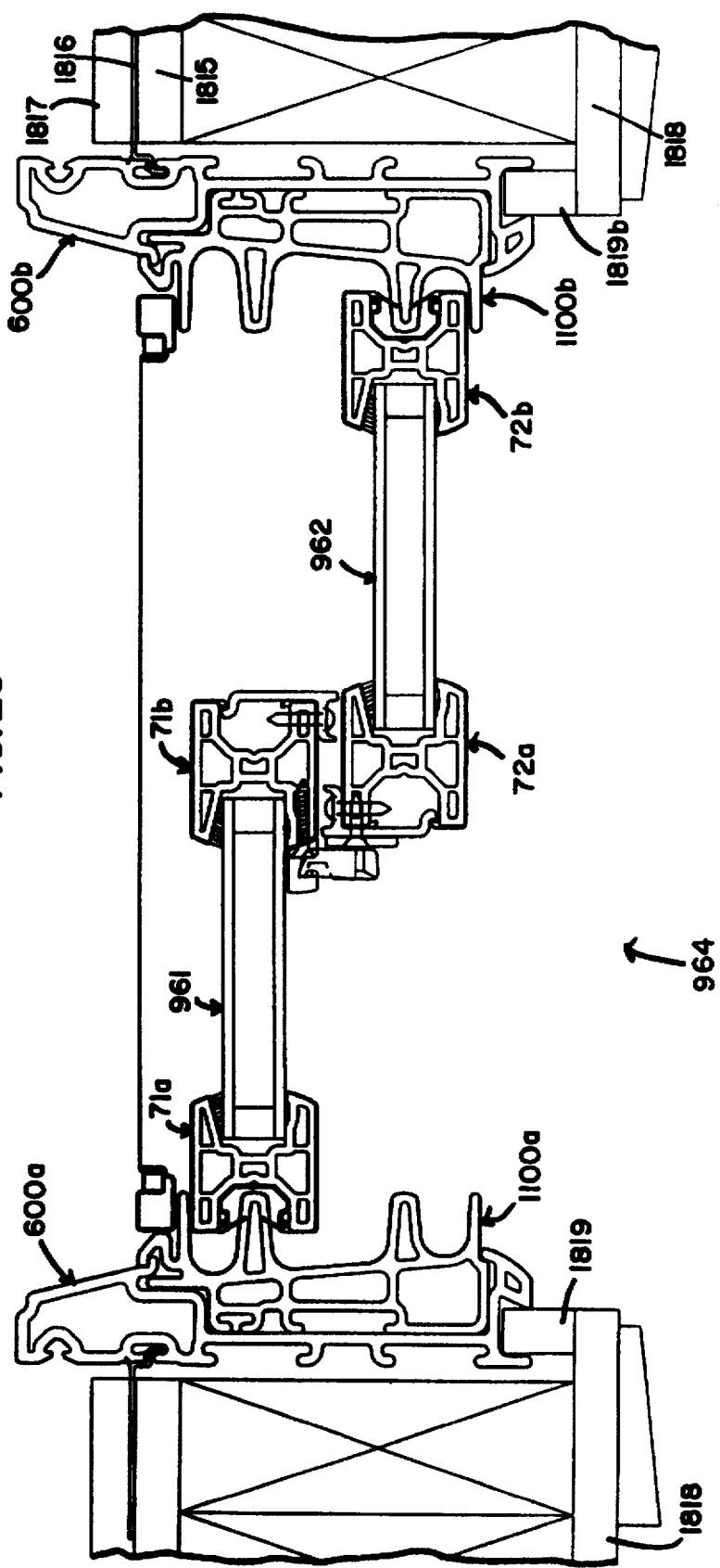

A preferred embodiment gliding window constructed according to the principles of the present invention, and designed for new construction, is designated as 964 in FIGS. 25-26. The fully assembled and installed window 964 requires the same types of modifications in assembly and installation and thus, does not require extruded components having any profiles in addition to those already discussed above.

Awning Windows

Awning windows may be constructed according to the principles of the present invention simply by rotating casement windows ninety degrees so that pivot axis for sash is upward.

Various aspects of the present invention are described beneath specific headings within the Detailed Description of the Preferred Embodiment. These headings are included simply to assist the Examiner and anyone else who may wish to read this disclosure and should not be construed to limit any aspect of the present invention. The present invention is also described with reference to particular embodiments and applications. However, those skilled in the art will recognize additional embodiments and applications of the present invention. Accordingly, the present invention is to be limited only to the extent of the following claims:

I claim:

1. A window frame of a type that may be used to convert a window suitable for pocket window installation into a window suitable for new construction installation, comprising:

a connecting means for connecting the window frame to the window, wherein the connecting means includes a channel on the frame into which the window is secured by snap fit, and the channel is defined by a base wall and opposing sidewalls, and the base wall is formed to be slightly convex, so that the sidewalls extend in convergent fashion therefrom; and a mounting means for mounting the window frame within rough opening.

2. A window frame according to claim 1, wherein the mounting means includes at least one opening on an exterior portion of the frame relative to which an exterior trim member may be secured by snap fit, and at least one opening on an interior portion of the frame relative to which an interior trim member may be secured by snap fit.

3. A method of manufacturing windows, comprising the steps of:

assembling a first type of window for pocket installation within an existing frame from which an existing window was removed, wherein the first type of window includes a first mounting means for mounting the first type of window within the existing frame;

assembling a second type of window for pocket installation within an existing frame from which an existing window was removed, wherein the second type of window includes a second mounting means for mounting the second type of window within the existing frame; and assembling a universal window frame designed and configured to receive and support either of the first type of window and the second type of window for installation within a rough opening, wherein the universal window frame mates with either of the first mounting means and the second mounting means.

4. An extruded window frame member, comprising:

a base portion sized and configured to rest against an edge of an opening;

a first sidewall connected to said base portion proximate a first end thereof, and extending generally away from said edge;

a second sidewall connected to said base portion proximate a second, opposite end thereof, and extending generally away from said edge;

a retaining means connected to at least one of said first sidewall and said second sidewall, for retaining a pocket window therebetween;

a first channel, proximate said first end, sized and configured to receive and retain a nailing flange extending in a generally opposite direction as said first sidewall; and a second channel, proximate the second end, sized and configured to receive an extension jamb extending in a direction generally perpendicular from said second sidewall.

5. An extruded window frame member according to claim 4, further comprising a third channel, proximate said first end, sized and configured to receive and retain an exterior trim member extending in a direction generally parallel to said nailing flange.

6. An extruded window frame member according to claim 4, further comprising divergent arcuate members connected to said base portion and extending toward said edge.

7. An extruded window frame member according to claim 4, wherein said retaining means includes a first lip, on said first sidewall, and a second lip, on said second sidewall, and resilient bending of at least one of said first sidewall, said second sidewall, and said base portion allows insertion of the pocket window between said first lip and said second lip, and the pocket window is retained therebetween by snap fit.

8. An extruded window frame member according to claim 7, wherein said first lip extends generally away from said edge.

9. An extruded window frame member according to claim 8, wherein said second lip extends generally toward said first lip.

10. A window that is convertible from a first configuration suitable for pocket window installation within an existing window frame, to a second configuration suitable for new construction installation within a framed opening, comprising:

a sash;

a plurality of liners joined into a first frame about said sash to define the first configuration, wherein said liners are adapted to engage inwardly facing portions of the existing window frame; and a plurality of frame members selectively joined into a second frame about said first frame to define the second configuration, wherein said frame members are adapted to engage outwardly facing portions of the first frame and inwardly facing portions of the framed opening.

11. The window of claim 10, wherein said first framed is disposed within a channel on said second frame, wherein said channel is defined by a base wall and opposing side walls, and said side walls extend in convergent fashion away from said base wall.

12. The window of claim 10, wherein said first frame is disposed within a channel on said second frame, wherein said channel is defined by a base wall and opposing side walls, and said base wall is formed to be outwardly convex prior to receiving said first frame.

13. The window of claim 10, wherein said first frame is disposed within a channel on said second frame, wherein said channel is defined by a base wall and opposing side walls, and said side walls define a channel width therebetween, and opposing tabs extend toward one another from respective side walls to define a channel opening therebetween, and said first frame and said channel width are wider than said channel opening.

14. A method, comprising the steps of:

providing a first type of window adapted for pocket installation within a relatively shallow framed opening;

providing a second type of window adapted for pocket installation within a relatively shallow framed opening; and providing a universal frame adapted to receive the first type of window for installation within a relatively deeper, rough opening, and adapted to receive the second type of window for installation within a relatively deeper rough opening.

15. The method of claim 14, wherein the universal frame is adapted to receive the first type of window by snap fit and to receive the second type of window by snap fit.

* * * * *